US008302205B2

(12) United States Patent
Kanai

(10) Patent No.: US 8,302,205 B2
(45) Date of Patent: Oct. 30, 2012

(54) ACCESS CONTROL DECISION SYSTEM, ACCESS CONTROL ENFORCING SYSTEM, AND SECURITY POLICY

(75) Inventor: Yoichi Kanai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 139 days.

(21) Appl. No.: 12/275,796

(22) Filed: Nov. 21, 2008

(65) Prior Publication Data

US 2009/0083831 A1 Mar. 26, 2009

Related U.S. Application Data

(62) Division of application No. 10/872,574, filed on Jun. 22, 2004, now abandoned.

(30) Foreign Application Priority Data

| Jun. 23, 2003 | (JP) | 2003-178033 |
| Sep. 8, 2003 | (JP) | 2003-315921 |
| Sep. 8, 2003 | (JP) | 2003-315996 |

(51) Int. Cl.
*G06F 7/04* (2006.01)
(52) U.S. Cl. ............... 726/27; 713/182; 713/176
(58) Field of Classification Search ............... 726/2, 27; 713/182
See application file for complete search history.

(56) References Cited

U.S. PATENT DOCUMENTS

| 5,715,403 | A | 2/1998 | Stefik |
| 6,105,027 | A | 8/2000 | Schneider et al. |
| 6,233,618 | B1 * | 5/2001 | Shannon ............ 709/229 |
| 6,233,684 | B1 * | 5/2001 | Stefik et al. .......... 713/176 |
| 6,236,971 | B1 | 5/2001 | Stefik et al. |
| 6,275,941 | B1 | 8/2001 | Saito et al. |
| 6,289,450 | B1 | 9/2001 | Pensak et al. |
| 6,320,947 | B1 | 11/2001 | Joyce et al. |
| 6,647,388 | B2 | 11/2003 | Numao et al. |
| 2001/0019604 | A1 | 9/2001 | Joyce et al. |

(Continued)

FOREIGN PATENT DOCUMENTS

EP 0 862 318 A2 9/1998

(Continued)

OTHER PUBLICATIONS

Office Action issued Aug. 31, 2010 in JP Application 2003-315996.

(Continued)

*Primary Examiner* — Cordelia Zecher
(74) *Attorney, Agent, or Firm* — Oblon, Spivak, McClelland, Maier & Neustadt, L.L.P.

(57) ABSTRACT

An access control enforcing system, method, and computer-readable storage medium, the system including an access control enforcing part enforcing an access control for subject information based on access control information, the access control information indicating a control of an access to the subject information in accordance with a security policy. The security policy regulates an access permit to the subject information, a requirement enforced when the access is allowed, and supplement information indicating character information or image information used to enforce the requirement. The access control enforcing part further includes a requirement capability determining part determining whether or not the requirement to execute the access can be executed, the requirement indicated by the access control information. The access control is enforced for the subject information based on a determination result by the requirement capability determining part to satisfy the requirement, by using the supplement information.

16 Claims, 55 Drawing Sheets

U.S. PATENT DOCUMENTS

| | | | |
|---|---|---|---|
| 2001/0023421 A1* | 9/2001 | Numao et al. | 707/9 |
| 2002/0029340 A1* | 3/2002 | Pensak et al. | 713/182 |
| 2002/0077803 A1 | 6/2002 | Kudoh et al. | |
| 2002/0174369 A1 | 11/2002 | Miyazaki et al. | |

FOREIGN PATENT DOCUMENTS

| | | |
|---|---|---|
| JP | 8-263438 | 10/1996 |
| JP | 8-263441 | 10/1996 |
| JP | 11-161672 | 6/1999 |
| JP | 11-338825 | 12/1999 |
| JP | 2000-122977 | 4/2000 |
| JP | 2000-231509 | 8/2000 |
| JP | 2001-142874 | 5/2001 |
| JP | 2001-184264 | 7/2001 |
| JP | 2002-318719 | 10/2002 |
| JP | 2003-69595 | 3/2003 |
| JP | 2003-122635 | 4/2003 |
| JP | 2003-157251 | 5/2003 |
| JP | 2004-94401 | 3/2004 |
| JP | 2004-102907 | 4/2004 |
| JP | 2004-280227 | 10/2004 |
| WO | WO 02/03215 A1 | 1/2002 |

OTHER PUBLICATIONS

Office Action issued Sep. 13, 2011, in Japanese Patent Application No. 2009-212493 with English translation.

Ryuichi Ozawa, et al., "Step of security policy realization", Interop Magazine, Softbank Publishing, vol. 10, No. 10, Oct. 1, 2000, pp. 152-156 with partial English translation.

Yoshiyasu Kawai, et al., "Approach to Policy Network: Easy realization of access control and zone control", Nikkei Internet Technology, Japan, Nikkei Business Publications, No. 27, Sep. 22, 1999, pp. 84-105 with partial English translation.

* cited by examiner

FIG.5

```
                                                                    ┌251
┌─────────────────────────────────────────────────┐
│ UserMapList {                          ┐         │
│         UserMap[ ] userMap;             ├252    │
│ };                                     ┘         │
│ UserMap {                                        │
│ 253-1 ~String principalId; // USER ID OR GROUP ID│
│ 253-2 ~String entryType;   // ENTRY TYPE (USER OR GROUP)│
│ 253-3 ~String levelId;     // SECURITY LEVEL    │
│ };                                               │
└─────────────────────────────────────────────────┘
```

FIG.6

```
                                                                    ┌261
┌─────────────────────────────────────────────────────────┐
│ DocProfileTable {                            ┐           │
│         DocProfile[ ] docProfiles;            ├262      │
│ };                                           ┘           │
│ DocProfile {                                             │
│   263-1 ~String docId;          // DOCUMENT ID           │
│   263-2 ~String docCategory;    // DOCUMENT CATEGORY     │
│   263-3 ~String docLevel;       // SENSITIVITY LEVEL     │
│   263-4 ~String[ ] relatedPersons; // RELATED PERSON LIST│
│   263-5 ~String[ ] zones;       // ZONE ID LIST          │
│   263-6 ~Date nondisclosure;    // NON-DISCLOSURE        │
│   263-7 ~Date retention;        // RETENTION EXPIRED DATE│
│   263-8 ~Date validity;         // VALIDITY EXPIRED DATE │
│ };                                                       │
└─────────────────────────────────────────────────────────┘
```

FIG.7

```
                                                    ┌271
┌─────────────────────────────────────────────────────────────────────┐
│ ZoneInfoTable {                    ┐                                │
│          ZoneInfo[ ]   zones;      ├ 272                            │
│ };                                 ┘                                │
│ ZoneInfo {                                                          │
│    273-1 ~ String id;              // ZONE ID                       │
│    273-2 ~ String name;            // ZONE NAME                     │
│    273-3 ~ AddressInfo[ ] addresses;  // ADDRESS LIST               │
│ };                                                                  │
│ AddressInfo {                                                       │
│    275-1 ~ String address;         // IP ADDRESS OR MAC ADDRESS     │
│    275-2 ~ String addressType;     // "IP" OR "MAC"                 │
│    275-3 ~ String netmask;         //SUB ADDRESS MASK SUCH AS       │
│                                    "255.255.255.0" WHEN IP ADDRESS  │
│ };                                                                  │
└─────────────────────────────────────────────────────────────────────┘
```

FIG.8

```
                                              ┌281
┌──────────────────────────────────────────────────────────┐
│ PrintProfileTable {                    ┐                 │
│          PrintProfile[ ] printProfiles; ├ 282            │
│ };                                     ┘                 │
│ PrintProfile {                                           │
│    283-1 ~ String printId;         // PRINT ID           │
│    283-2 ~ String docId;           // DOCUMENT ID        │
│    283-3 ~ Date printedDate;       // PRINTED DATE       │
│    283-4 ~ String printedUserId;   // PRINT USER ID      │
│    283-5 ~ String printedUserName; // PRINT USER NAME    │
│ };                                                       │
└──────────────────────────────────────────────────────────┘
```

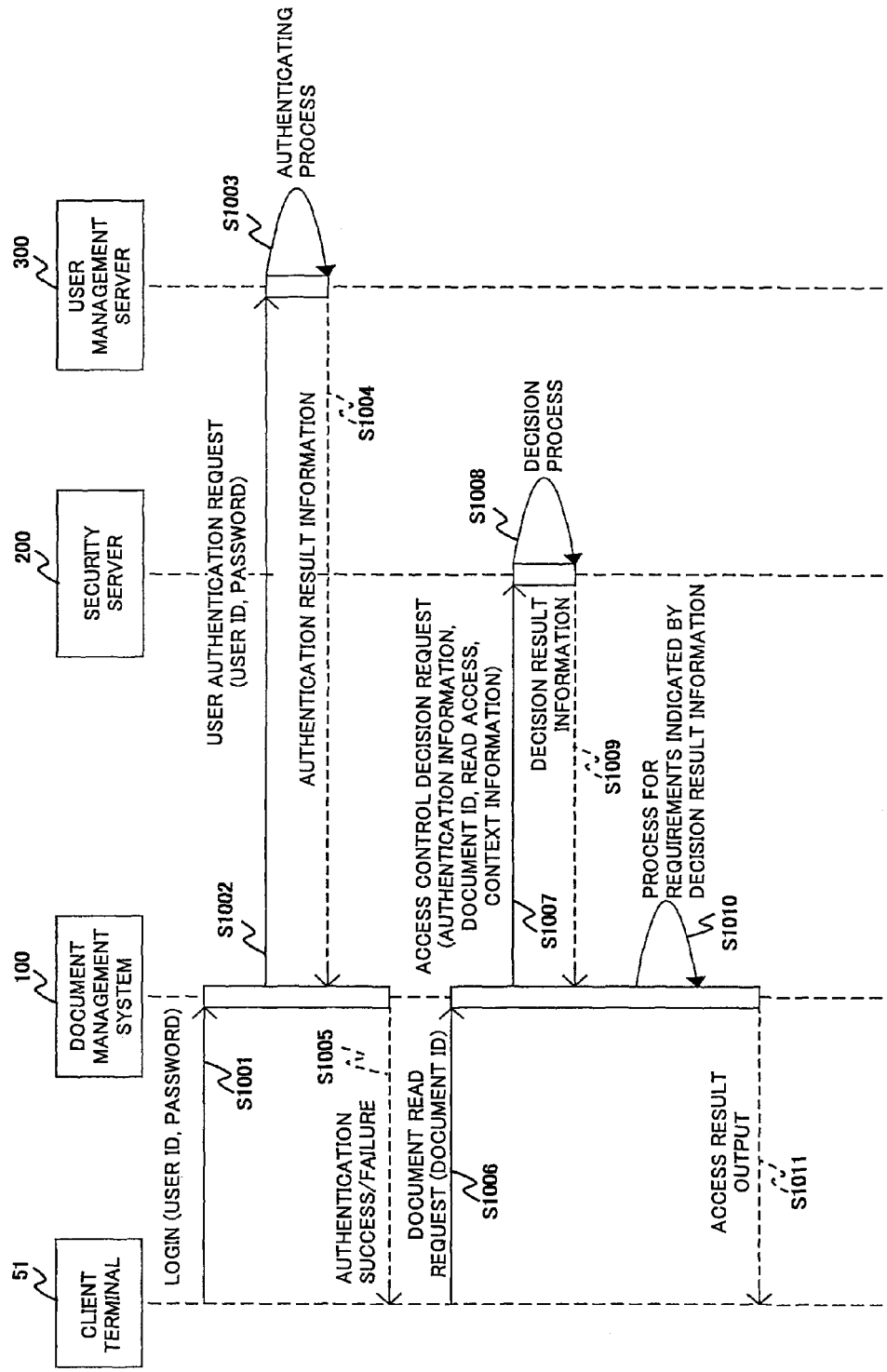

FIG.11

| L0011 | user management server checks user ID and password received from document management system with user management table to authenticate user |
|---|---|
| L0012 | if (user authentication is succeeded){ |
| L0013 | obtain list of group IDs to which user belongs |
| L0014 | create authentication result information by user ID, user name, and list of group IDs |
| L0015 | send authentication result information to document management system |
| L0016 | } |
| L0017 | else { |
| L0018 | create authentication result information showing failure of authentication and send authentication result information to document management system |
| L0019 | } |
| L0020 | terminate authenticating process |

FIG.12

```
                                              ┌501
AuthInfo {
503-1 ~ String userId;      // USER ID
503-2 ~ String userName;    // USER NAME
503-3 ~ String[ ] groups;   // GROUP IDs OF GROUPS TO
                               WHICH USER BELONGS
};
```

FIG.13

| | |
|---|---|
| L0031 | receive authentication result information, document ID, access type, context information from document management system conducting decision request; |
| L0032 | obtain document profile (docProfile) corresponding to document ID (docid) received from document management system, from document profile management table; |
| L0033 | obtain document category (docCategory) and sensitivity level (docLevel) by referring to document profile (docProfile); |
| L0034 | obtain related persons list by referring to document profile (docProfile); |
| L0035 | check whether or not related person list (relatedPersons) includes user IDs (userId) or position groups (groups) of authentication result information (authInfo); |
| L0036 | if (include) indicate related persons (RELATED_PERSONS) to user category (userCategory); |
| L0037 | else indicate any person (ANY) to user category (userCategory); |
| L0038 | refer to user security level table (UserMapTable) and stores level corresponding to user ID or group ID (principalId) to security level (userLevel); |
| L0039 | obtain zone ID list (zones) by referring to document profile (docProfile); |
| L0040 | refer to zone management table (ZneInfoTable), obtain IP address or MAC address corresponding to zone ID list (zones), and create allowed address list; |
| L0041 | check whether or not address included in context information is included in allowed address list; |
| L0042 | if (include) set "restricted (RESTRICTED)" to zone (zone); |
| L0043 | else set "any zone (ANY)" to zone (zone); |
| L0044 | load security policy file to memory unit and obtain array of access control rule (rule); |

FIG.14

```
L0045  for (each access control rule (rule)){
L0046      if (document category (docCategory) of access control rule shows "not restricted (ANY)"
               or corresponds to document category (docCategory) of document profile (docProfile))
L0047      and (document level (docLevel) of access control rule (rule) shows "not restricted (ANY)"
               or corresponds to document level (docLevel) of document profile (docProfile)){
L0048          for (each access control list (Ace) of access control rule (rule)){
L0049              if (user category (userCategory) of access control list (Ace) corresponds to "not restricted (ANY)"
                       or user category (usercategory))
L0050              and (user level (userLevel) of access control list (ace) corresponds to "not restricted (ANY)"
                       or user level (userLevel))
L0051              and (zone (zone) corresponds to "not restricted (ANY)"
                       or zone (zone)){
L0052                  for (each operation (Operation) of access control list (Ace)){
L0053                      if (operation ID (OperationId) corresponds to operation (operation) of
                               access control list (Ace)){
L0054                          store "allowed (true)" to allowed item of decision result information (decisionInfo);
L0055                          store all requirements (requirement) indicated by operation (operation) to
                                   decision result information;
L0056                          break;
L0058                      }
L0059                  }
L0060                  If (there is no respective operation (Operation)){
L0061                      store "not allowed (false)" to allowed item (allowed) of decision result information (decisionInfo);
L0062                  }
L0063                  break;
L0064              }
L0065          }
```

FIG.15

```
L0066    if (respective access control list (Ace)){
L0067        stores "not allowed (false)" to allowed item (allowed) of decision result information (decisioninfo);
L0068    }
L0069    break;
L0070    }
L0071    }
L0072    if (there is no respective access control rule (rule)){
L0073        stores "not allowed (false)" to allowed item (allowed) of decision result information (decisioninfo);
L0074    }
L0075    if (allowed item (allowed) of decision result information (decisioninfo) shows "not allowed (false)"){
L0076        send decision result information to document management system which sent decision request;
L0077    }
L0078    else{
L0079        conduct compensating process for requirements (resquirement) included in decision result
         information (decisioninfo);
L0080        send decision result information (decisioninfo) to document management system that sent decision
L0081    }
L0082    terminate allowing process;
```

FIG.16

```
                                                                ┌511
ContextInfo {
    513-1~String ipAddress;        // IP ADDRESS
    513-2~String macAddress;       // MAC ADDRESS
};
```

FIG.17

```
                                                                ┌521
DecisionInfo {
    523-1~Boolean allowed;          // TRUE OR FALSE
    523-2~Requirement[ ] requirements;
};
Requirement {
    525-1~String requirement;       // REQUIREMENT ID
    525-2~Property[ ] supplements;  // SUPPLEMENT INFORMATION
    525-3~byte[ ] data;             // SUPPLEMENT DATA
    525-4~Requirement[ ] alternatives; // ALTERNATIVE REQUIREMENT
};
Property {
    527-1~String name;              // NAME
    527-2~String value;             // KEY
};
```

FIG.18

| | |
|---|---|
| L1101 | for (each set of supplement information (supplement) included in requirement (requirement) of decision result information (decisionIsnfo)){ |
| L1102 | if (name (name) of property (Property) of supplement information indicates static image (static_image)){ |
| L1103 | read out data of stamp image file indicated in value (value) of property (Property) of supplement information from local hard disk, stores data of stamp image file as supplement data (data) of requirement (requirement); |
| L1104 | } |
| L1105 | if (dynamic image (dynamic_image) is indicated to name (name) of property (Property) of supplement information, and operation (operation) shows "print"){ |
| L1106 | create new print profile (printProfile); |
| L1107 | encode print ID (printId) of print profile (printProfile) to be identification image data; |
| L1108 | store identification image data to supplement data (data) of requirement (requirement) of identification image data; |
| L1109 | } |
| L1110 | } |

FIG.19

```
L1121  if (allowed item (allowed) of decision result information (decisioninfo) shows "not allowed (false)"){
L1122      deny access and terminate requirement process;
L1123  }
L1124  for (each requirement (requirement) of decision result information (decisionInfo)){
L1125      if (not-supported requirement (requirement), which is not supported by
           document management system , is indicated){
L1126          if (alternative requirement (alternative) of not-supported requirement (requirement) is
               alternative requirement, which is not supported (hereinafter, referred to not-supported
               alternative requirement), and is indicated){
L1127              deny access and terminates requirement process;
L1128          }
L1129          process alternative requirement (alternative) of requirement (requirement);
L1130      }
L1131      if (log record (record_audit_data) is indicated in requirement (requirement){
L1132          generate log data including user ID (userid), document ID (docid), operation (operation),
               date and time, context information (contextInfo)){
L1133          send log data to security server;
L1134          if (log data transmission is failed){
L1135              deny access and terminate requirement process;
L1136          }
L1137      }
L1138      if (encryption (encryption) is indicated to requirement (requirement)){
L1139          encrypt document being stored;
L1140  }
```

FIG.20

```
L1141  if (protection of integrity of original (integrity_protection) of digital document is indicated in
       requirement (requirement)){
L1142    transmit and store digital document to original document integrity protection supporting system;
L1143  }
L1144  if (requirement (requirement) indicates to allow multiple authentication (multi_authentication)
       for access to digital document){
L1145    require for user using client terminal to conduct strict user authentication (such as finger
         print recognition or like);
L1146    if (strict user authentication fails to authenticate user){
L1147      deny access and terminate requirement process;
L1148    }
L1149  }
L1150  if (requirement (requirement) indicates version management (versioning) of digital document){
L1151    store revised document as new version;
L1152  }
L1153  if (requirement (requirement) indicates complete deletion (complete_deletion) of digital document){
L1154    execute complete deleting process with respect to digital document being deleted;
L1155  }
L1156  if (requirement (requirement) indicates alarm display (show_alarm)){
L1157    create alarm character string in character string format indicated in supplement information
         (supplement) of requirement (requirement);
L1158    display alarm character string by dialog box to user;
L1159  }
L1160  }
L1161  conduct access process requested from client terminal;
L1162  terminate requirement process;
```

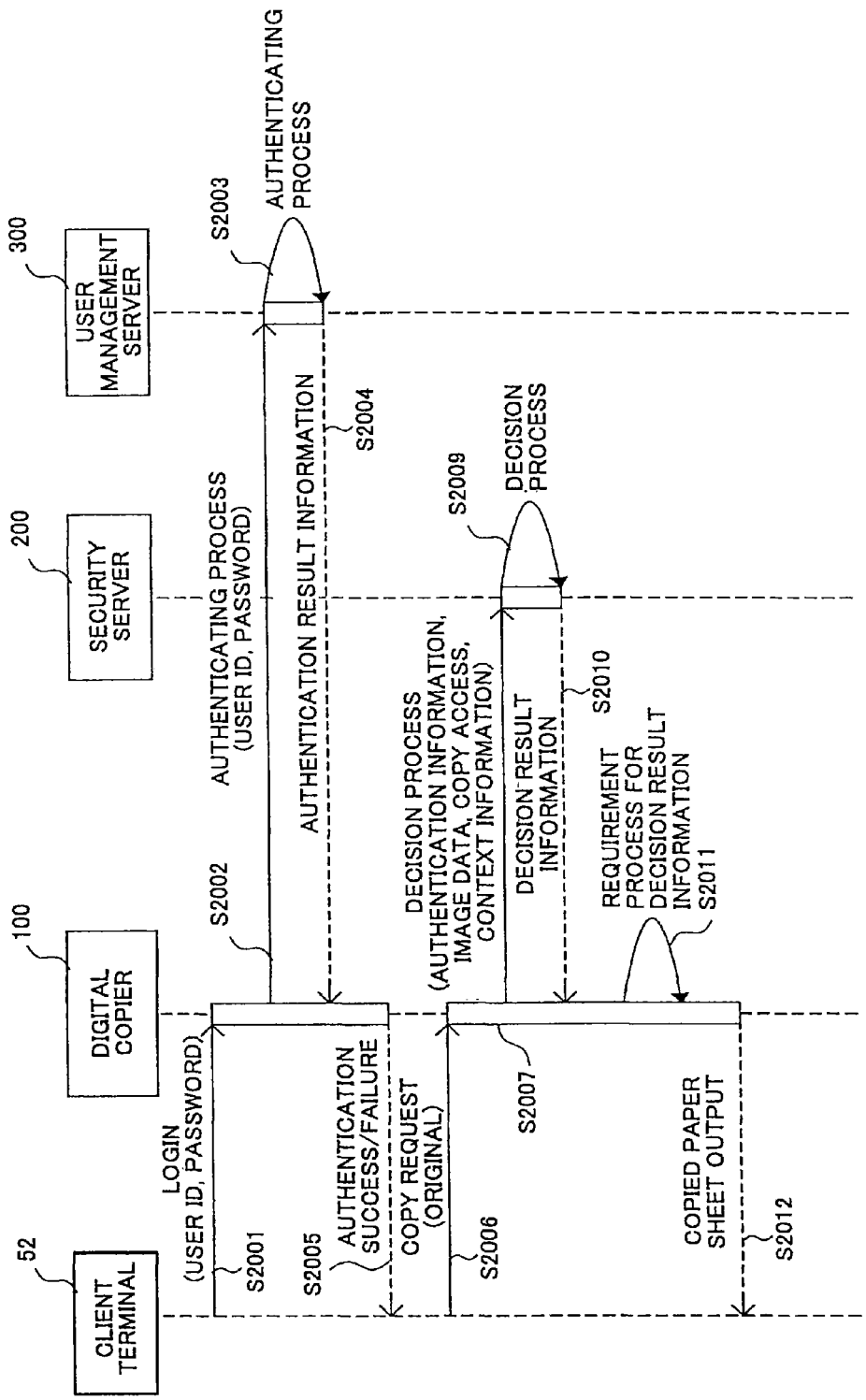

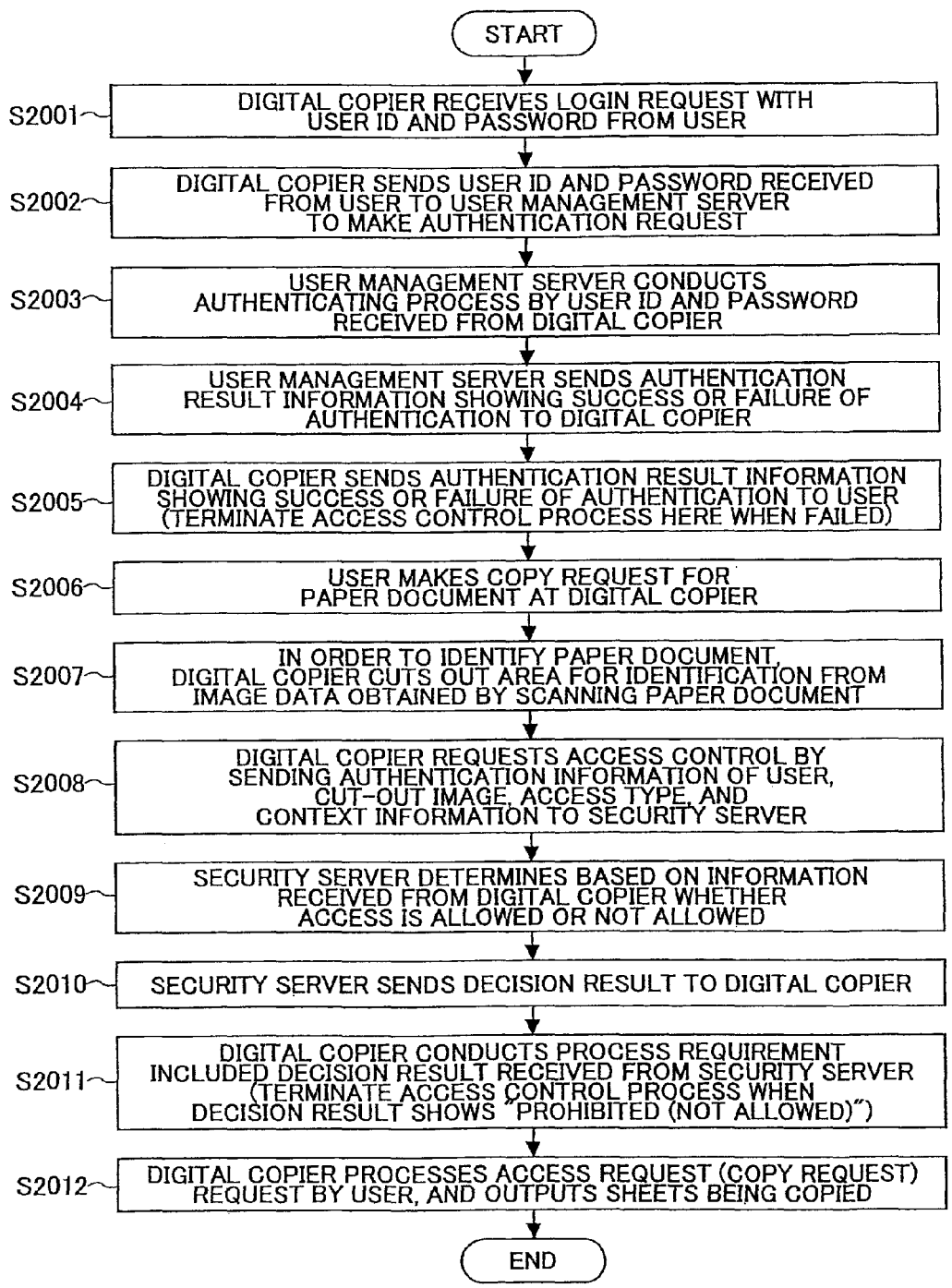

FIG.23

```
L2031  receive authentication result information, document ID, access type, context information from digital copier
       that sent decision request;
L2032  obtain print ID (printId) by decoding cut-out image received from digital copier;
L2033  if (cut-out image cannot be decoded){
L2034      set "unknown (UNKNOWN)" to document categtory (docCatetgory);
L2035      set "unknown (UNKNOWN)" to document level (docLevel);
L2036      sets "not restricted (ANY)" to user category (userCategory);
L2037      sets "not restricted (ANY)" to zone (zone);
L2038  }
L2039  else{
L2040      obtain print profile (printPofile) corresponding to print ID (printId) by referring to print profile management table;
L2041      if (print profile corresponding to print ID does not exists){
L2042          set "unknown (UNKNOWN)" to document category (docCategory)
L2043          set "unknown (UNKNOWN)" to document level (docLevel)
L2044          set "not restricted (ANY)" to user category (userCategory)
L2045          sets "not restricted (ANY)" to zone (zone)
L2046      }
L2047      else{
L2048          obtains document ID (docid) from print profile (printprofile)
L2049          obtain document profile (docProfile) corresponding to document ID (docId) by referring todocument
               management table;
L2050          obtain document category (docCategory) and sensitivity level (docLevel) by referring to document profile (docProfiel);
L2051          obtain related person list (relatedPersons) by referring to document profile (docProfile);
L2052          check whether or not related person list (relatedPersons) includes user IDs (userId) or
               position groups (groups) of authentication result information (authInfo);
L2053          if (include)       indicates related persons (RELATED_PERSONS) to user category (userCategory);
L2054          else               indicate any person (ANY) to user category (userCategory)
L2055          obtains zone id list (zones) by referring to document profile (docProfile)
L2056          obtains IP address or MAC address corresponding to zone ID list (zones) (allowed address list) by
               zone management table;
L2057          check whether or not address included in context information is included in allowed address list;
L2058          if (include)        set "restricted (RESTRICTED)" to zone (zone);
L2059          else                sets "any zone (ANY)" to zone (zone);
L2060      ]
L2061  ]
```

FIG.24

```
L2062   refer to user security level table (UserMapTable) and store level corresponding to user ID (userId) or position groups (groups) to
        user level (userLevel);
L2063   load security policy file to memory unit and obtain array of access control rule (rule);
L2064   for (each access control rule (rule)){
L2065       if (document category (docCategory) of access control rule shows "not restricted (ANY)"
                or corresponds to document category (docCategory) of document profile (docProfile))
L2066           and (document level (docLevel) of access control rule (rule) shows "not restricted (ANY)"
                or corresponds to document level (docLevel) of document profile (docProfile)){
L2067           for (each access control list (Ace) of access control rule (rule)){
L2068               if (user category (userCategory) of access control list (Ace) corresponds to
                        "not restricted (ANY)" or user category (userCategory))
L2069               and (user level (userLevel) of access control list (Ace) corresponds to
                        "not restricted (ANY)" or user level (userLevel))
L2070               and (zone (zone) corresponds to "not restricted (ANY)" or zone (zone)){
L2071                   for (each operation (Operation) of access control list (Ace){
L2072                       if (that operation corresponds to operation (Operation) of access control list (Ace)){
L2073                           store "allowed (true)" to allowed item of  decision result information (decisionInfo);
L2074                           store all requirements (requirement) indicated by operation (Operation) to decision
                                    result information (decisionInfo)
L2075                           break;
L2076                       }
L2077                   }
L2078                   if (there is no respective operation (Operation)){
L2079                       store "not allowed (false)" to allowed item (allowed) of
                                decision result information (decisionInfo)
L2080                   }
L2081                   break;
L2082               }
L2083           }
L2084           if (there is no respective access control list (Ace)){
L2085               store "not allowed (false)" to allowed item (allowed) of decision result information (decisionInfo);
L2086           }
L2087           break;
L2088       }
L2089   }
L2090   if (there is no access control rule (rule)){
L2091       store "not allowed (false)" to allowed item (allowed) of decision result information (decisionInfo);
```

FIG.25

```
L2093   if (allowed item (allowed) of decision result information(decisionInfo) shows "not allowed (false)"){
L2094       send decision result information to digital copier which sent decision request;
L2095   }
L2096   else{
L2097       conduct compensating process for requirements (resquirement) included in decision result information
(decisionInfo);
L2098       send decision result information (decisionInfo) to digital copier that sent decision request;
L2099   }
L2100   terminate decision process;
```

FIG.26

```
L2121  if (allowed item (allowed) of decision result information (decisionInfo) shows "not allowed (false)"){
L2122      deny access and terminate requirement process;
L2123  }
L2124  for (each requirement (requirement) of decision result information (decisionInfo)){
L2125      if (not-supported requirement (requirement), which is not supported by digital copier, is indicated){
L2126          if (not-supported alternative requirement is indicated as alternative requirement (alternative)
                   of not-supported requirement (requirement)){
L2127              deny access and terminates requirement process;
L2128          }
L2129          process alternative requirement (alternative) of not-supported requirement (requirement);
L2130      }
L2131      if (log record (record_audit_data) is indicated in requirement (requirement)){
L2132          generate log data including user ID (userId), document ID (docId), operation (operation),
                   date and time, context information (contextInfo);
L2133          send log data to security server;
L2134          if (log data transmission is failed){
L2135              deny access and terminate requirement process;
L2136          }
L2137      }
L2138      if (label print (show_label) is indicated to requirement (requirement)){
L2139          stamp image indicated by supplement information (supplement) of requirement (requirement)
                   is printed and embeded;
L2140      }
L2141      if (user name print (show_operator) is indicated){
L2142          print operator name (operator) is printed and embeded as user name to printed document;
```

FIG.27

```
L2144  if (record of image log (record_image_data) is indicated){
L2145      generate image log data including user id (userId), document id (docId), operation (operation),
L2146      date and time, contex information (contextInfo), and document data (scan data);
L2147      store image log data to internal hard disk of digital copier;
L2148  }
L2149  if (alarm display (show_alarm) is indicated){
L2150      create alarm character string in character string format indicated in supplement information
L2151      (supplement) of requirement (requirement);
L2152      display alarm character string to user;
L2153  }
L2154  if (alarm print (print_alarm) is indicated){
L2155      create alarm character string in character string format indicated in supplement information
L2156      (supplement) of requirement (requirement);
L2157      print alarm character string to embody to printed document;
L2158  }
L2159  if (receiver restriction (address_restriction) for fax transmission is indicated){
L2160      receiver address indicated by user is checked with receiver condition indicated in
L2161      supplement information (supplement) of requirement (requirement);
L2162      if (receiver address matches with receiver condition){
           display, at operation panel, message showing that receiver address does not
               match with receiver condition, to user;
           deny access and terminate requirement process;
       }
   }
```

FIG.28

```
L2163  if (confidential transmission mode (private_send) is indicated){
L2164      set confidential transmission mode to sender condition;
L2165      if (confidential transmission mode cannot be set){
L2166          display, at operation panel, message showing that receiver cannot receive
                   confidential transmission, to inform it to user;
L2167          deny access, and terminate requirement process;
L2168      }
L2169  }
L2170  if (visible watermark letter print (visible_watermark) is indicated){
L2171      create character string in character string format indicated by supplement information
               (supplement) of requirement (requirement);
L2172      embed character string as watermark to printed documents;
L2173  }
L2174  if (digital watermark (digital_watermark) is indicated){
L2175      create character string in character string format indicated by supplement
               (supplement) of requirement (requirement);
L2176      embody character string as digital watermark to scanned data;
L2177  }
L2178  }
L2179  conduct access process requested by user;
L2180  terminate requirement process;
```

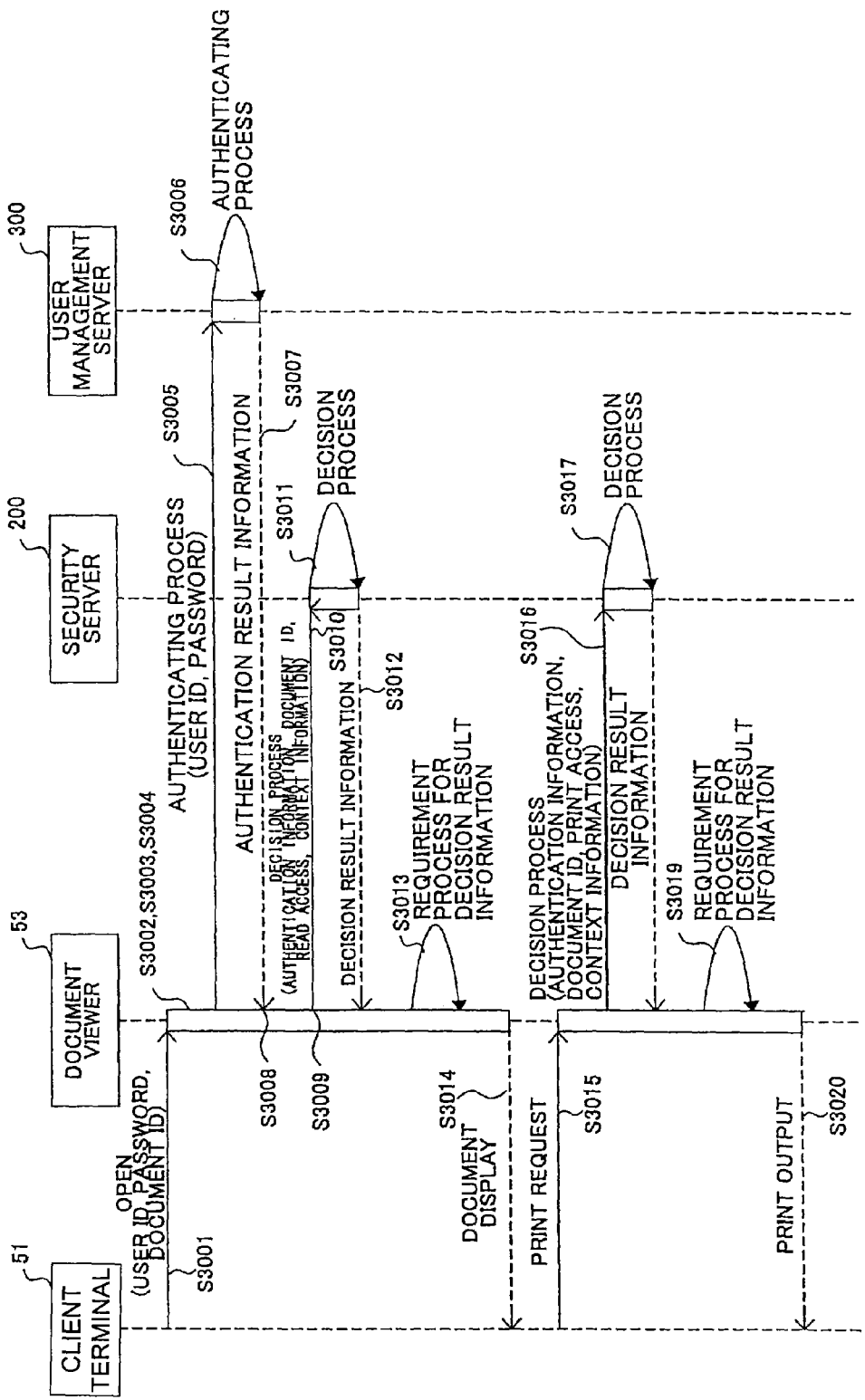

FIG.32

```
L3121  if (allowed item (allowed) of decision result information (decisionInfo) shows "false"){
L3122      deny access and terminate requirement process;
L3123  }
L3124  for (each requirement indicated in decision result information (decisionInfo)){
L3125      if (requirement which is not supported by document viewer is indicated){
L3126          if (alternative requirement which is not supported by document viewer is indicated){
L3127              deny access and terminate requirement process;
L3128          }
L3129          processes alternative requirement (alternative) for requirement (requirement);
L3130      }
L3131      if (log record (record_audit_data) is indicated in requirement (requirement)){
L3132          generate log data including user ID (userId), document id (docId), operation (operation),
                date and time, and context information (contextInfo);
L3133          send log data to security server;
L3134          if (log data transmission is failed){
L3135              deny access and terminate requirement process;
L3136          }
L3137      }
L3138      if (requirement indicates to allow multiple authentication for access to digital document){
L3139          require user of strict user authentication;
L3140          if (strict user authentication is failed){
L3141              deny access and terminate requirement process;
L3142          }
L3143      }
L3144      if (alarm display (show_alarm) is indicated){
L3145          create alarm character string in character string indicated in supplement information
                information (supplement) of requirement (requirement);
L3146          display alarm character string;
L3147      }
L3148      if (private print mode (private_access) is indicated);
L3149          if (printer to print out does not support private print mode){
L3150              process alternative requirement (alternative) of requirement (requirement);
L3151              if (alternative requirement cannot be processed){
```

FIG.33

```
L3152              deny access and terminate requirement process;
L3153          }
L3154      else{
L3155          display dialog for user to input password;
L3156          set password input by user to printer driver in order to set private print mode;
L3157      }
L3158  }
L3159  if (image log record (recrd_image_data) is indicated){
L3160      if (printer to print out does not support image log record){
L3161          process alternative requirement (alternative) of requirement (requirement);
L3162          if (alternative requirement cannot be processed){
L3163              deny access and terminate requirement process;
L3164          }
L3165      }
L3166      else{
L3167          generate log data including user ID (userId), document ID (docId), operation (operation),
L3168              date and time, and context information (contextInfo);
L3169          set image log bibliographic item to printer driver;
L3170          set image log record mode to printer driver;
L3171      }
L3172  }
L3173  if (requirement indicates to embed trace information (embed_trace_info)){
L3174      if (driver of printer to print out supports stamp print){
L3175          set barcode image indicated by supplement information of requirement to printer driver
                   to set stamp print mode
L3176      }
L3177      else if (document viewer supports document edit){
L3178          embed barcode indicated by supplement information (supplement) of requirement
                   (requirement) to each page to be printed by editing portable document;
L3179      }
L3180      else{
L3181          process alternative requirement (alternative) of requirement (requirement);
L3182          if (alternative requirement cannot be processed){
```

FIG.34

```
L3183            deny access and terminate requirement process;
L3184          }
L3185        }
L3186      }
L3187    if (requirement indicates to print label as stamp (show_label)){
L3188      if (driver of printer to print out supports stamp print){
L3189        set stamp image indicated by supplement requirement (supplement) of requirement
             (requirement) to printer driver to set stamp print mode (an embedding location is indicated by
             "embedding location" item in supplement information (supplement) of requirement
L3190      }
L3191      else if (document viewer supports document edit){
L3192        set stamp image indicated by supplement requirement (supplement) of requirement
             (requirement) to printer driver to set stamp print mode (an embedding location is indicated by
             "embedding location" item in supplement information (supplement) of requirement
L3193      }
L3194      else{
L3195        process alternative requirement (alternative) of requirement (requirement);
L3196        if (alternative requirement cannot be processed){
L3197          deny access and terminates requirement process;
L3198        }
L3199      }
L3200    }
L3201    if (visible watermark letter print (visible_watermark) is indicated){
L3202      create background character string in character string indicated by supplement requirement
           (supplement) of requirement (requirement);
L3203      if (driver of printer to print out supports combination print){
L3204        set background character string as combination character string to printer driver;
L3205      }
L3206      else if (documents viewer supports document edit){
L3207        embed background character string to background of portable document by
             editing portable document;
L3208      }
L3209      else{
```

FIG.35

```
L3210        process alternative requirement (alternative) of requirement (requirement);
L3211        if (lternative requirement (alternative) cannot be processed){
L3212            deny access and terminate requirement process;
L3213        }
L3214    }
L3215    if (requirement indicates to print embossed watermark letter (anti_copy_watermark)){
L3216        create pattern character string in character string format indicated by supplement information
L3217        (supplement) of requirement (requirement);
L3218        if (driver of printer to print out supports pattern print){
L3219            set pattern character string to printer driver;
L3220        }
L3221        else if (document viewer supports document edit){
L3222            generate pattern image based on pattern character string;
L3223            embed pattern image to background of portable document by editing portable document;
L3224        }
L3225        else{
L3226            process alternative requirement (alternative) of requirement (requirement);
L3227            if (alternative requirement cannot be processed){
L3228                deny access and terminate requirement process;
L3229            }
L3230        }
L3231    }
L3232    if (requirement indicates to print identification pattern (identifiable_bg_pattern)){
L3233        create pattern character string by identification pattern image indicated by supplement information
             (supplement) of requirement (requirement);
L3234        if (driver of printer to print out supports to repeat stamp print){
L3235            set identification pattern image indicated by supplement information (supplement) of
                 requirement (requirement) to printer driver to set repeating stamp print mode;
L3236        }
```

FIG.36

```
L3237      else if (document viewer supports document edit){
L3238        repeatedly embed identification pattern image indicated by supplement information
             (supplement) of requirement (requirement) to background of portable document
             by editing portable document;
L3239      }
L3240      else{
L3241        process alternative requirement (alternative) of requirement (requirement);
L3242        if (alternative requirement cannot be processed){
L3243          deny access and terminate requirement process;
L3244        }
L3245      }
L3246    }
L3247    if (alarm print is indicated);
L3248      create alarm character string in character string format indicated by supplement information
           (supplement) of requirement (requirement);
L3249      if (driver of printer to print out supports header/footer print){
L3250        set alarm character string as header/footer to printer driver;
L3251      }
L3252      else if (document viewer supports document edit){
L3253        process alternative requirement (alternative) of requirement (requirement);
L3254      }
L3255      else{
L3256        embed alarm character string at header/footer of portable document;
L3257        if (alternative requirement cannot be processed){
L3258          deny and terminates requirement process;
L3259        }
L3260      }
L3261    }
L3262    conduct access process requested by user;
L3263    terminate requirement process;
L3264
```

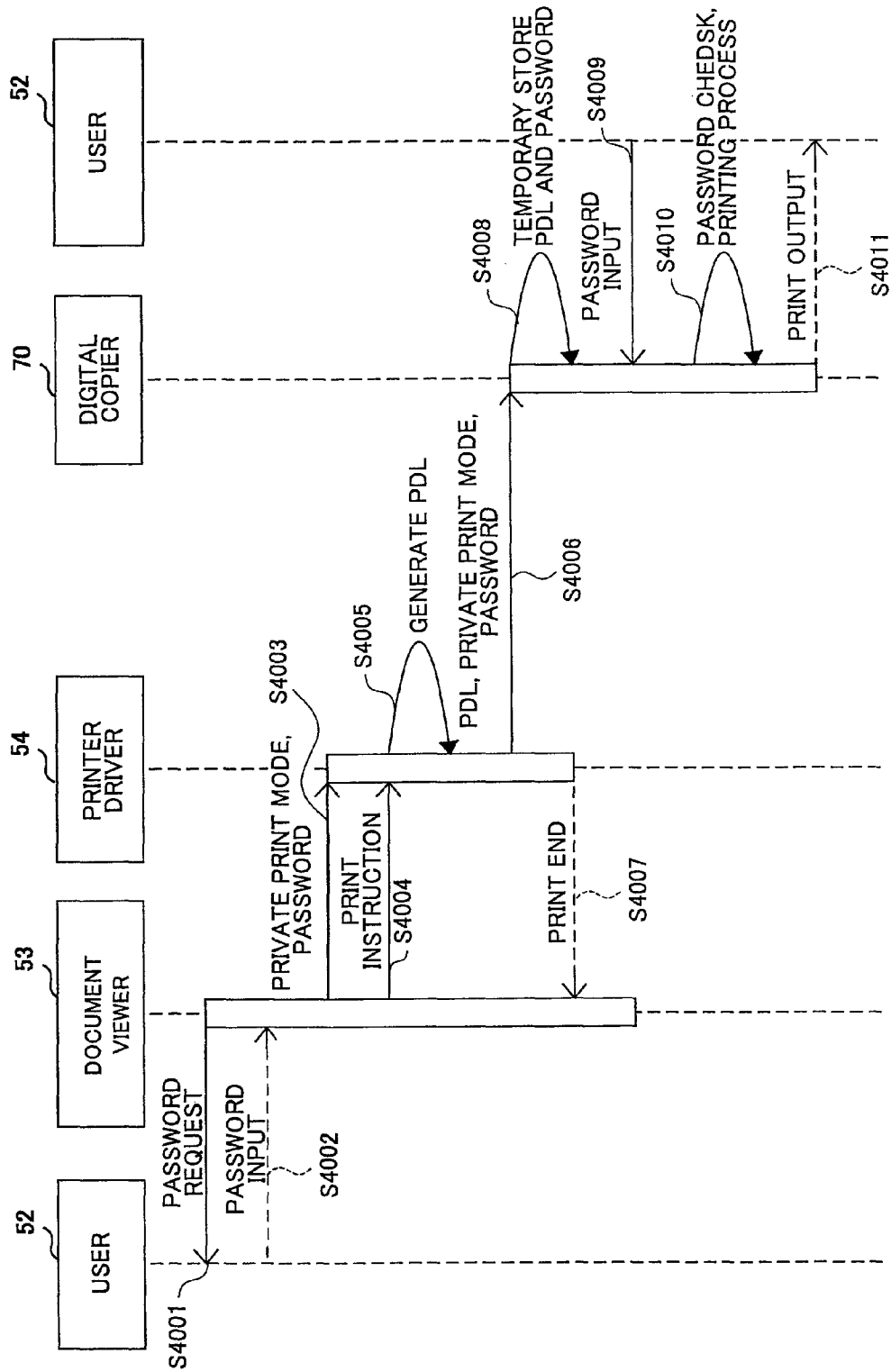

FIG.44

USER SECURITY LEVEL TABLE 250

| principalId | entryType | levelId |
|---|---|---|
| GroupLeaders/Sales/Com | group | manager |
| GroupLeaders/Dev/Com | group | manager |
| Jiro Tanaka/Com | user | manager |
| Employee/Com | group | regular |
| TemporaryStaff/Com | group | temporary |
| ... | | |

FIG.45

```xml
<?xml version="1.0" encoding="Shift_JIS" ?>
<UserMapList>
    <UserMap>
        <PrincipalId>GroupLeaders/Sales/Com</PrincipalId>
        <EntryType>group</EntryType>
        <LevelId>manager</LevelId>
    </UserMap>
    <UserMap>
        <PrincipalId>GroupLeaders/Dev/Com</PrincipalId>
        <EntryType>group</EntryType>
        <LevelId>manager</LevelId>
    </UserMap>
    <UserMap>
        <PrincipalId>Jiro Tnaka/Com</PrincipalId>
        <EntryType>user</EntryType>
        <LevelId>manager</LevelId>
    </UserMap>
    <UserMap>
        <PrincipalId>Employee/Com</PrincipalId>
        <EntryType>group</EntryType>
        <LevelId>regular</LevelId>
    </UserMap>
    <UserMap>
        <PrincipalId>TemporaryStaff/Com</PrincipalId>
        <EntryType>group</EntryType>
        <LevelId>temporary</LevelId>
    </UserMap>
        ...

<UserMapList>
```

FIG.46

DOCUMENT PROFILE MANAGEMENT TABLE  260

| docId | docCategory | docLevel | relatedPersons | zones | nondisclosure | retention | validity |
|---|---|---|---|---|---|---|---|
| 0000000001 | development | secret | Members/Dev/Com | ANY | 2005/04/01 | 2010/04/01 | |
| 0000000002 | sales | secret | Members/Sales/Com | ANY | 2005/04/01 | 2010/04/01 | |
| 0000000003 | sales | topsecret | Members/Sales/Com | saleszone01 saleszone02 | 2007/04/01 | 2010/04/01 | |
| ... | | | | | | | |

FIG.47

ZONE MANAGEMENT TABLE 270

| id | name | addressInfo | | |
|---|---|---|---|---|
| | | address | addressType | netmask |
| saleszone01 | Sales (Yokohama) | 192.207.138.1 | IP | 255.255.255.0 |
| saleszone02 | Sales (Mobile) | 192.207.139.1 | IP | 255.255.255.0 |
| devzone01 | Dev (Shinagawa) | 00-02-55-66-38-37 | MAC | |
| | | 192.207.155.1 | IP | 255.255.255.0 |
| | | 192.207.156.1 | IP | 255.255.255.0 |
| ... | | | | |

FIG.48

```
<?xml version="1.0" encoding="Shift_JIS" ?>
<ZoneInfoTable>
    <ZoneInfo>
        <Id>saleszone01</Id>
        <Name>Sales (Yokohama)</Name>
        <AddressInfo>
            <Address>192.207.138.1</Address>
            <AddressType>IP</AddressType>
            <Netmask>255.255.255.0</Netmask>
        </AddressInfo>
        <AddressInfo>
            <Address>192.207.139.1</Address>
            <AddressType> IP </AddressType>
            <Netmask>255.255.255.0</Netmask>
        </AddressInfo>
    </ZoneInfo>
    <ZoneInfo>
        <Id>saleszone02</Id>
        <Name>Sales (Mobile)</Name>
        <AddressInfo>
            <Address>00-02-55-66-38-37</Address>
            <AddressType>MAC</AddressType>
        </AddressInfo>
    </ZoneInfo>
    <ZoneInfo>
        <Id>devzone0</Id>
        <Name>Dev (Shinagawa)</Name>
        <AddressInfo>
            <Address>192.207.155.1</Address>
            <AddressType>IP</AddressType>
            <Netmask>255.255.255.0</Netmask>
        </AddressInfo>
        <AddressInfo>
            <Address>192.207.156.1</Address>
            <AddressType> IP </AddressType>
            <Netmask>255.255.255.0</Netmask>
        </AddressInfo>
    </ZoneInfo>
</ZoneInfoTable>
```

FIG.49

```xml
<?xml version="1.0" encoding="UTF-8" ?>
  <Policy> ~701
    <Rule> ~703
      <DocCategory>sales</DocCategory>  } 705
      <DocLevel>topsecret</DocLevel>
      <Ace>
        <UserCategory>RELATED_PERSON</UserCategory>  } 711
        <UserLevel>manager</UserLevel>
        <Zone>RESTRICTED</Zone>
        <Operation>
          <id>read</id>
        </Operation>
        <Operation>
          <id>print</id>
          <Requirement>
            <id>private_access</id>  } 714
          </Requirement>
          <Requirement>
            <id>print_alarm</id>  } 715
            <Supplement>"Printed by %u"</Supplement>
          </Requirement>
          <Requirement>
            <id>identifiable_bg_pattern</id>  } 716
            <Supplement>dynamic_image</Supplement>
          </Requirement>
        </Operation>
      </Ace>
      <Ace>
        <UserCategory>RELATED_PERSON</UserCategory>  } 721
        <UserLevel>ANY</UserLevel>
        <Operation>
          <id>read</id>
        </Operation>
      </Ace>
    </Rule> ~704
```

- 712: `<Operation> <id>read</id> </Operation>`
- 713: print Operation block
- 710: first Ace block
- 722: `<Operation> <id>read</id> </Operation>`
- 720: second Ace block
- RULE 1: entire Rule
- 240: container

FIG.50

```
<Rule>
    <DocCategory>sales</DocCategory>
    <DocLevel>secret</DocLevel>
    <Ace>
        <UserCategory>RELATED_PERSON</UserCategory>
        <UserLevel>ANY</UserLevel>
        <Zone>ANY</Zone>
        <Operation>
            <id>read</id>
        </Operation>
        <Operation>
            <id>print</id>
            <Requirement>
                <id>print_header</id>
                <Supplement>"Printed by %u"</Supplement>
            </Requirement>
        </Operation>
        <Operation>
            <id>copy</id>
            <Requirement>
                <id>write_log</id>
            </Requirement>
        </Operation>
    </Ace>
</Rule>
<Rule>
    <DocCategory>development</DocCategory>
    <DocLevel>secret</DocLevel>
    <Ace>
        <UserCategory>RELATED_PERSON</UserCategory>
        <UserLevel>ANY</UserLevel>
        <Zone>ANY</Zone>
        <Operation>
            <id>read</id>
        </Operation>
        <Operation>
            <id>print</id>
            <Requirement>
                <id>write_log</id>
            </Requirement>
        </Operation>
        <Operation>
            <id>copy</id>
            <Requirement>
                <id>write_log</id>
            </Requirement>
        </Operation>
    </Ace>
</Rule>
</Policy>        702
```

RULE 2 (first Rule block)

RULE 3 (second Rule block)

FIG.51

AUTHENTICATION RESULT INFORMATION (AuthInfo)

| userId | userName | groups |
|---|---|---|
| Taro Yamada/Sales/Com | Taro Yamada | Members/Sales/Com, Marketing/Sales/Com, Employee/Com, GroupLeaders/Sales/Com |

FIG.52

CONTEXT INFORMATION

| ipAddress | macAddress |
|---|---|
| 192.207.138.64 | 02-36-55-22-78-01 |

FIG.53

DOCUMENT IDENTIFICATION INFORMATION

| docId | printId | image |
|---|---|---|
| 0000000003 | | |

FIG.54

DECISION RESULT INFORMATION

| allowed | requirements | | | |
|---|---|---|---|---|
| | requirement | supplements | data | alternatives |
| true | private_access | | | |
| | print_alarm | "Printed by Taro Yamda" | | |
| | identifiable_bg_pattern | dynamic_image | [binary image data] | |

FIG.55

PRINT PROFILE MANAGEMENT TABLE 280

| printId | docId | printedDate | printedUserId | printedUserName |
|---|---|---|---|---|
| p000000001 | 0000000003 | 2003/07/10 | Taro Yamada/Sales/Com | Taro Yamada |
| ... | ... | ... | ... | ... |

FIG.57

AUTHENTICATION RESULT INFORMATION (AuthInfo)

| userId | userName | groups |
|---|---|---|
| Hanako Satoh/Sales/Com | Hanako Satoh | Members/Sales/Com, Marketing/Sales/Com, Employee/Com |

FIG.58A

DOCUMENT IDENTIFICATION INFORMATION

| docId | printId | image |
|---|---|---|
|  |  | [binary image data] |

FIG.58B

DOCUMENT IDENTIFICATION INFORMATION

| docId | printId | image |
|---|---|---|
|  | p000000001 |  | ns # ACCESS CONTROL DECISION SYSTEM, ACCESS CONTROL ENFORCING SYSTEM, AND SECURITY POLICY

CROSS-REFERENCE TO RELATED APPLICATIONS

This application is a divisional application of Ser. No. 10/872,574, filed Jun. 22, 2004, now abandoned the entire contents of which is incorporated herein by reference. U.S. Ser. No. 10/872,574 is based upon and claims benefit of priority from the prior Japanese Patent Application Numbers 2003-178033, filed on Jun. 23, 2003, 2003-315921, filed on Sep. 8, 2003, and 2003-315996, filed on Sep. 8, 2003.

BACKGROUND OF THE INVENTION

1. Field of the Invention

The present invention generally relates to an access control decision system, an access control enforcing system, and a security policy, in which an organizational security policy can be applied to an information processing system and an organizational security can be improved for not only digitalized documents but also a paper documents.

2. Description of the Related Art

While office works have been digitalized in business, importance of managing a digital document such as a confidential document has been increased. Thus, recently, an access control for the digital document is conducted in accordance with a predetermined security policy.

In a viewpoint in that the security for the digital document is secured by the security policy being uniformed over an organization, a describing method of a security policy and an apparatus for transmitting the security policy is proposed (for example, refer to Japanese Laid-open Patent Application No. 2004-102907). Moreover, for example, Japanese Laid-open Patent Application No. 2004-094401 discloses a method for distributing the security policy and an apparatus for operating based on the security policy. Furthermore, Japanese Patent Application No. 2002-299712 discloses a method and an apparatus for controlling printing a digital document by encrypting and decrypting the digital document in accordance with the security policy.

Moreover, since a system which object to sell digital contents mainly such as music data, image data, and the likes has a problem similar to a company secret management, similar technologies are applied to this system (for example, refer to Japanese Laid-open Patent Application No. 8-263441, U.S. Pat. No. 5,715,403, Japanese Laid-open Patent Application No. 8-263438, and U.S. Pat. No. 6,236,971). In particular, a system is provided in that a condition should be satisfied when digital data (such as the music data, the image data, and the like which are called digital work) relating to a copyright. A protocol is disclosed to confirm whether or not the condition for exercising a security is satisfied. By using this technology, it can be realized to use the music data and the image data being distributed under a condition of a payment of referring to and printing the music and the image, or a restriction of a term of using without any charge.

However, these inventions described above do not take the company secret management at an office into account but do aim at sales of the digital contents. Accordingly, these inventions do not consider an access control including a printed matter output by copying the confidential document.

Furthermore, a system for conducting various processes for a print (for example, refer to Japanese Laid-open Patent Application No. 2000-122977 and U.S. Pat. No. 6,233,684). For example, Glyphe code can be embedded into a printed matter. However, it is required to define information to be embedded for each document.

Furthermore, for example, Japanese Laid-open Patent Application No. 2001-184264 (FIG. 1 and FIG. 2) discloses an access control sub system configured by a policy evaluation module for determining an access allowed or not-allowed in accordance with a policy, an enforcement function verification module, and an enforcement module.

However, the above-described conventional technologies have the following problems such as a lack of flexibility of an operation and a like:

Conventional Technologies cannot manage related persons for each document since the related persons are variously changed for each document in a case in that a policy regulates "Available for Related Persons to Refer", cannot flexibly correspond to various stamps such as a confidential stamp, a top-secret stamp, an internal use only stamp, and a like in a case in that the policy regulates "Affix Confidential Stamp for Copy", cannot change a warning message (sentence) in response to a type of a document in a case in that the policy regulates "Warn Users to Handle with Care", cannot restrict to use within a zone even if the policy defines the zone to be "allowed zone" to handle a document, and cannot regulate and enforce a process in a case in that a paper document cannot be identified even if the paper document should be identified to control an operation with respect to the paper document.

Even if these above problems are solved, in order to uniformly conduct the access control in accordance with the organizational security policy, it is desired to completely separate a part for determining the access control in accordance with the policy from various application systems to share the part for determining the access control with the various application systems, and it is desired to separate the part for determining the access control from the part for actually enforcing the access control.

In addition, the conventional technologies cannot control an access in accordance with an abstract description such as the organizational security policy.

SUMMARY OF THE INVENTION

It is a general object of the present invention to provide an access control decision system, an access control enforcing system, and a security policy, in which the above-mentioned problems are eliminated.

A more specific object of the present invention is to provide an access control decision system, an access control enforcing system, and a security policy, in which an organizational security policy can be applied to an information processing system and securities can be secured for a paper document and a digital document.

The above objects of the present invention are achieved by an access control decision system including; an abstraction converting part converting first information indicated by an access decision request into second information being abstract higher than the first information when the access decision request for requesting an access control decision for subject information to be accessed is received; an access control decision part determining the access control for the subject information by referring a security policy being abstractly regulated based on the second information; and a decision result sending part sending a decision result showing the access control for the subject information by said access control decision part, to a request originator that sent the access decision request.

In the access control decision system according to the present invention, information for determining the access control can be converted into information having abstraction degree similar to an organizational security policy. Accordingly, it is possible to determine the access control in accordance with the security policy being abstract.

The above objects of the present invention are achieved by an access control enforcing system, including an access control enforcing part enforcing an access control for subject information based on access control information indicating a control concerning an access to the subject information in accordance with a security policy, wherein said access control enforcing part further includes a requirement capability determining part determining whether or not a requirement to execute the access can be executed, the requirement indicated by the access control information, and wherein the access control is enforced for the subject information based on a determination result by the requirement capability determining part so as to satisfy the requirement.

In the access control decision system according the present invention, it is determined whether or not the requirement to allow the access to the subject information is executable in accordance with the security policy. Accordingly, it is possible to enforce the access control for the subject information so as to satisfy the requirement.

The above objects of the present invention are achieved by a security policy, comprising a rule description showing a rule regulating whether or not an operation is allowed based on a first security attribute of subject information directed to the operation and a second security attribute of a user requesting the operation for the subject information, wherein the rule description regulates to allow the operation when a requirement is satisfied.

In the security policy according the present invention, it is possible to regulate to allow the operation by executing the requirement.

The above objects of the present invention can be achieved by a program code for causing a computer to conduct processes described above in the document processing apparatus or by a computer-readable recording medium recorded with the program code.

BRIEF DESCRIPTION OF THE DRAWINGS

In the following, embodiments of the present invention will be described with reference to the accompanying drawings.

FIG. 5 is a diagram showing a data structure of a user security level table according to the embodiment of the present invention;

FIG. 6 is a diagram showing a data structure of a document profile management table according to the embodiment of the present invention;

FIG. 7 is a diagram showing a data structure of a zone management table according to the embodiment of the present invention;

FIG. 8 is a diagram showing a data structure of a print profile management table according to the embodiment of the present invention;

FIG. 9 is a diagram showing an access control sequence in a document management system according to the embodiment of the present invention;

FIG. 11 is a diagram for explaining an authenticating process by a user management server according to the embodiment of the present invention;

FIG. 12 is a diagram showing a data structure of authentication result information according to the embodiment of the present invention;

FIG. 13 is a diagram for explaining the decision process by the security server in response to a request from the document management system according to the embodiment of the present invention;

FIG. 14 is a diagram for explaining the decision process by the security server in response to a request from the document management system according to the embodiment of the present invention;

FIG. 15 is a diagram for explaining the decision process by the security server in response to a request from the document management system according to the embodiment of the present invention;

FIG. 16 is a diagram showing the data structure of context information according to the embodiment of the present invention;

FIG. 17 is a diagram showing a data structure of decision result information according to the embodiment of the present invention;

FIG. 18 is a flowchart for explaining a compensating process for requirements by the document management system according to the embodiment of the present invention;

FIG. 19 is a flowchart for explaining a requirement process according to the embodiment of the present invention;

FIG. 20 is a flowchart for explaining the requirement process according to the embodiment of the present invention;

FIG. 21 is a diagram showing an access control sequence at a digital copier according to the embodiment of the present invention;

FIG. 22 is a flowchart for explaining the access control process by the digital copier according to the embodiment of the present invention;

FIG. 23 is a diagram for explaining the decision process in the security server in response to a request from the digital copier according to the embodiment of the present invention;

FIG. 24 is a diagram for explaining the decision process in the security server in response to a request from the digital copier according to the embodiment of the present invention;

FIG. 25 is a diagram for explaining the decision process in the security server in response to a request from the digital copier according to the embodiment of the present invention;

FIG. 26 is a flowchart for explaining the requirement process by the digital copier according to the embodiment of the present invention;

FIG. 27 is a flowchart for explaining the requirement process by the digital copier according to the embodiment of the present invention;

FIG. 28 is a flowchart for explaining the requirement process by the digital copier according to the embodiment of the present invention;

FIG. 29 is a diagram showing an access control sequence in a document viewer according to the embodiment of the present invention;

FIG. 32 is a flowchart for explaining the requirement process conducted the document viewer according to the embodiment of the present invention;

FIG. 33 is a flowchart for explaining the requirement process conducted the document viewer according to the embodiment of the present invention;

FIG. 34 is a flowchart for explaining the requirement process conducted the document viewer according to the embodiment of the present invention;

FIG. 35 is a flowchart for explaining the requirement process conducted the document viewer according to the embodiment of the present invention;

FIG. 36 is a flowchart for explaining the requirement process conducted the document viewer according to the embodiment of the present invention;

FIG. 42 is a diagram showing a requirement process sequence in a private print mode according to the embodiment of the present invention;

FIG. 44 is a diagram showing a data example managed by the user security level table according to the embodiment of the present invention;

FIG. 45 is a diagram showing a XML file of the user security level table according to the embodiment of the present invention;

FIG. 46 is a diagram showing a data example managed by the document profile management table according to the embodiment of the present invention;

FIG. 47 is a diagram showing a data example managed by the zone management table according to the embodiment of the present invention;

FIG. 48 is a diagram showing a XML file of the zone management table according to the embodiment of the present invention;

FIG. 49 is a diagram showing an access control rule described in the policy file according to the embodiment of the present invention;

FIG. 50 is a diagram showing the access control rule described in the policy file according to the embodiment of the present invention;

FIG. 51 is a diagram showing an example of the authentication result information;

FIG. 52 is a diagram showing an example of the context information according to the embodiment of the present invention;

FIG. 53 is a diagram showing an example of the document identification information according to the embodiment of the present invention;

FIG. 54 is a diagram showing an example of the decision result information according to the embodiment of the present invention;

FIG. 55 is a diagram showing an example of the print profile management table according to the embodiment of the present invention;

FIG. 57 is a diagram showing another example of the authentication result information according to the embodiment of the present invention; and FIG. 58A is a diagram showing an example of the document identification information in a case in that image data itself is actually sent to the security server according to the embodiment of the present invention, and FIG. 58B is a diagram showing another example of the document identification information in a case in that the image data is decoded and sent to the security server according to the embodiment of the present invention.

DESCRIPTION OF THE PREFERRED EMBODIMENT

In the following, an embodiment of the present invention according will be described with reference to the accompanying drawings.

Figure 1:
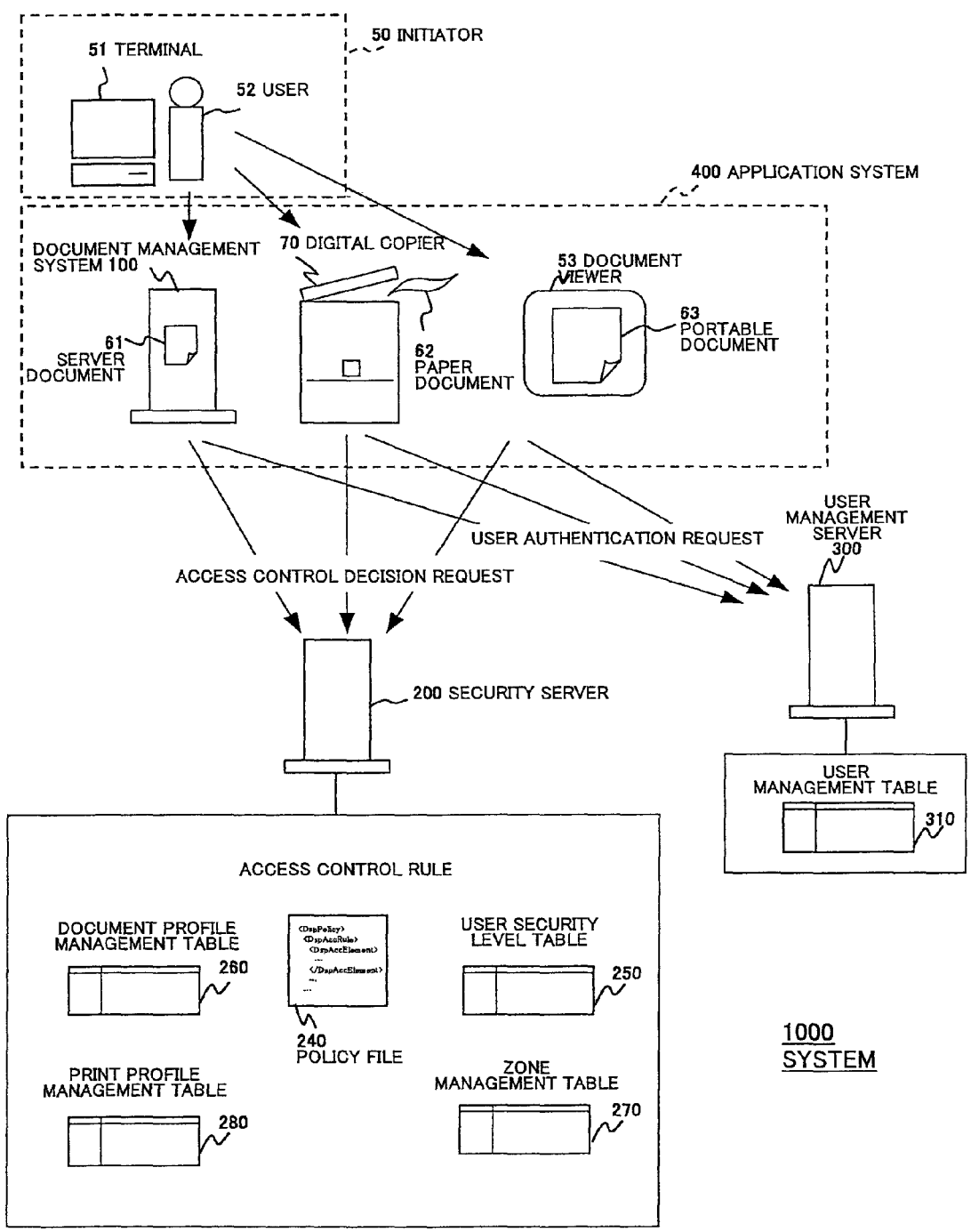
FIG. 1 is a diagram showing a configuration of a system according to an embodiment of the present invention.

A system applying an access control decision system according to an embodiment of the present invention is illustrated as shown in FIG. 1. FIG. 1 is a diagram showing a configuration of a system according to the embodiment of the present invention. In the system 1000 shown in FIG. 1, a security server 200 for conducting an access control with respect to a digital document and a paper document is connected through a network to a document management system 100 for managing digital documents, a digital copier 70 including a plurality of different image forming functions served as a copy, a fax, a scanner, and a like, and a document viewer 53 for displaying the digital document at a client terminal 51 of a user.

In FIG. 1, the document viewer 53 is a predetermined application running for the client terminal 51. The client terminal 51 accesses a target document maintained in the document management system 100. The user 52 may make copies of the paper document brought with the user by the digital copier 70. The system shown in FIG. 1 may include a plurality of client terminals 51 and users 52.

Hereinafter, the digital document, which is managed by the document management system 100 and to which an access is controlled, is referred to as a server document 61. The paper document, which is copied by the digital copier 70, is referred to as a paper document 62. The digital document, which is downloaded from the document management system 100 and stored in a local storage of the client terminal 51, and opened and referred to by the document viewer 53, is referred to as a portable document 53.

When the user 52 connects to the document management system 100 by using the client terminal 51 and attempts to access to the server document 61, the document management system 100 obtains authentication information from the user 52 and sends a request of a user authentication to the user management server 300. The document management system 100 sends an access control decision request to the security server 200 based on an authentication result received from the user management server 300. The document management system 100 accesses the server document 61 based on access control information received from the security server 200.

Similarly, when the user 52 copies the paper document 62 by the digital copier 70, the digital copier 70 obtains the authentication information from the user 52 and sends a request of the user authentication to the user management server 300. The digital copier 70 sends the access control decision request to the security server 200 based on the authentication result received from the user management server 300. The digital copier 70 copies the paper document 62 based on the access control information received from the security server 200.

Similarly, when the user 52 executes the document viewer 53 at the client terminal 51 and displays the portable document 63 at the client terminal 51, the document viewer 53 obtains the authentication information from the user 52 and sends the request of the user authentication to the user management server 300. The document viewer 53 sends the access control decision request to the security server 200 based on the authentication result received from the security server 200. The document viewer 53 displays the portable document 63 or further outputs the portable document 63 displayed at the client terminal 51 based on the access control information received form the security server 200.

When the user management server 300 receives the authentication information of the user 52 from the document management system 100, the digital copier 70, or the document viewer 53, the user management server 300 refers to a user management table 310 and authenticates the user 52. The user management server 300 sends the authentication result to the document management system 100, the digital copier 70, or the document viewer 53, which sent the request of the user authentication.

The security server 200 includes a policy file 240 in that access control rules are described for an organization, a user security level table 250 for managing a user security for each user 52, a document profile management table 260 for managing a profile for each document, a zone management table 270 for managing the access control for each zone, and a print profile management table 280 for managing information concerning a print for each print. The security server 200 corresponds to the access control requests from the document management system 100, the digital copier 70, and the document viewer 53 by using a policy file 240 and these tables 250 through 280.

In the policy file 240, a rule such as "Access Allowed for Related Persons Only" is regulated. However, a relationship showing who is a related person for which document should be managed. A table complimenting this policy showing this rule is managed in the security server 200 and separated from the policy. If this rule is described in the policy, the policy becomes lack of versatility. That is, a portion stipulating "rule" such as a company secret management regulation of the organization is stipulated as the policy, and portions being variously set corresponding to each document and for each user are managed by tables. Since a different "rule" for each organization is managed in a form of the policy file 240, a replacement of each "rule" becomes possible.

Figure 2:
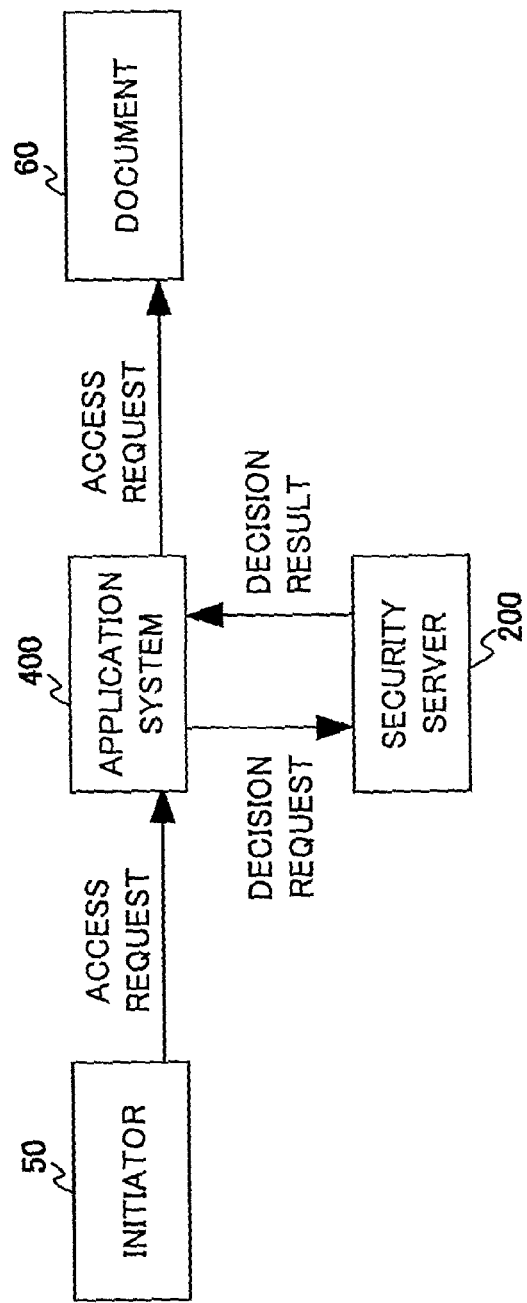
FIG. 2 is a block diagram showing an access control model according to the embodiment of the present invention.

Hereinafter, the server document 61, the paper document 62, and the portable document 63 are generically called as a document 60 (FIG. 2).

A user, who can be the client terminal 51 or the user 52 and accesses the document 60, is called as an initiator 50.

The document management system 100, the digital copier 70, and the document viewer 53 are generically called as an application system 400.

In the system 1000, the security server 200 is separated from the user management server 300. However, a function serving as the security server 200 and a function serving as the user management server 300 can be included in a single server computer.

An overview of the access control will be described with reference to FIG. 2 showing an access control model described in accordance with ISO/IEC 10181-3. FIG. 2 is a block diagram showing the access control model.

In FIG. 2, when the initiator 50 sends an access request for accessing the document 60 to the application system 400, the application system 400 sends a decision request to the security server 200 to have the security server 200 determined whether or not the access from the initiator 50 is allowed after the user authentication. In particular, in a case in that the user authentication is not required, an access permit can be requested for an anonymous user or a guest user.

The security server 200 determines in accordance with the access control rule (policy) described in the security file 240 internally maintained in the security server 200 whether or not the user as the initiator 50 has the security to access the document 60, that is, whether the user is allowed or prohibited to access the document 60. If the user is allowed to access the document 60, the security server 200 determines a requirement that should be satisfied to access the document 60. Then, the security server 200 sends information showing that the user is allowed or not allowed and the requirement is satisfied or not, as a decision result, to the application system 400.

The application system 400 receives the decision result and processes an access requested from the user if the user is allowed. In this case, if the requirement is indicated, the application system 400 processes document 60 so as to satisfy the requirement. If the user is not allowed or the requirement is not satisfied, the application system 400 denies this access to the document 60.

Figure 3:
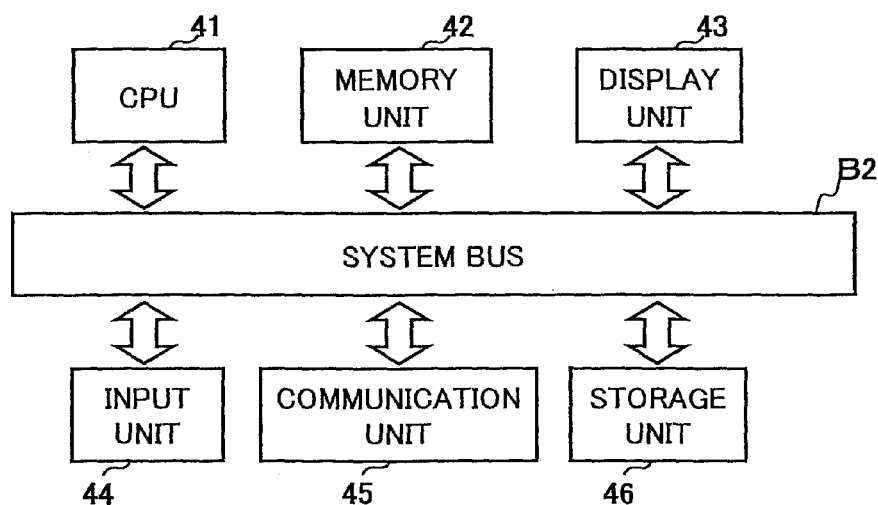
FIG. 3 is a block diagram showing a hardware configuration of a security server according to the embodiment of the present invention.

Next, a hardware configuration and a functional configuration of the security server 200 will be described with reference to FIG. 3 and FIG. 4. FIG. 3 is a block diagram showing the hardware configuration of the security server according to the embodiment of the present invention.

In FIG. 3, the security server 200 is a server computer and includes a CPU (Central Processing Unit) 41, a memory unit 42, a display unit 43, an input unit 44, a communication unit 45, and a storage unit 46, each of which is connected to a system bus B2.

The CPU 41 controls the security server 200 in accordance with a program stored in the memory unit 42. The memory unit 42 includes a RAM (Random Access Memory) and a ROM (Read-Only Memory), and stores the program to be executed by the CPU 41, data necessary to process by the CPU 41, and data obtained in the process by the CPU 41. In addition, the memory unit 42 is partially used as a work area used in the process by the CPU 41.

The display unit 43 displays necessary information by the control of the CPU 41. The communication unit 45 is a unit to communicate with the application system 400 when connecting to the application system 400, for example, through a LAN (Local Area Network) or a like. The storage unit 46 includes a hardware unit, and stores management tables including a policy file 240, a user security level table 250, a document profile management table 260, a zone management table 270, a print profile management table 290, and the like.

A program controlling the security server 200 is installed into a storage unit 46 beforehand.

Figure 4:
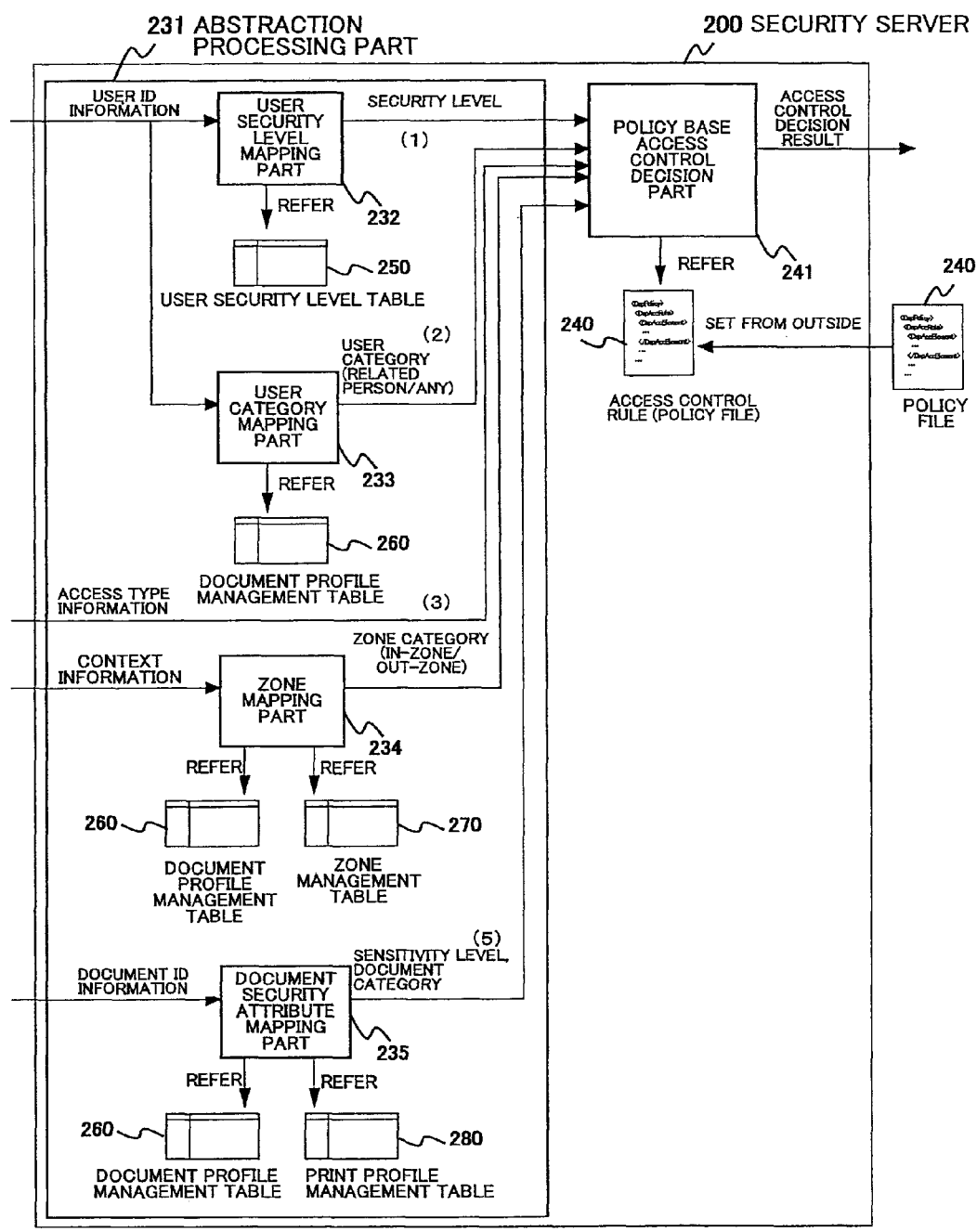
FIG. 4 is a block diagram showing a functional configuration of the security server according to the embodiment of the present invention.

FIG. 4 is a block diagram showing the functional configuration of the security server according to the embodiment of the present invention. In FIG. 4, the security server 200 mainly includes an abstraction processing part 231 for abstracting information received from the application system 400 by corresponding to the organizational security policy, and a policy base access control decision part 241.

The abstraction processing part 231 includes a user security level mapping part 232, a user category mapping part 233, a zone mapping part 234, and a document security attribute mapping part 235.

In the abstraction processing part 231, when user identification information, access type information, document identification information, and context information are received from the application system 400, the user security level mapping part 232 obtains an security level abstracted by referring to the user security level table 250 based on the user identification information (1), the user category mapping part 233 obtains a user category that is abstracted by referring to the document profile management table 260 based on the user identification information and shows a related person or any person (2), the access type information is maintained without any change (3), the zone mapping part 234 obtains a zone category that is abstracted by referring to the document profile management table 260 and the zone management table 270 based on the context information and shows in-zone or out-zone (4), and the document security attribute mapping part 235 obtains a sensitivity level and a document category that are abstracted by referring to the document profile management table 260 and the print profile management table 280 based on the document identification information (5).

In this embodiment, a term may be set in the context information so as to obtain a term segment showing in-term or out-term.

The mapping parts 232 through 235 may be included in a single abstraction processing part. In this case, this single abstraction processing part refers to more than one management table.

Alternatively, the security level and the user category can be categorized into a user security attribute, the sensitivity level and the document category can be categorized into the document security attribute, and the zone category can be categorized into an access environment attribute, so that three attributes are used to categorize. Accordingly, an abstraction processing part may be provided for each attribute. In this case, each abstraction processing part includes more than one mapping processing part and each mapping part refers to more than one table.

The policy base access control decision part 241 receives information being abstracted by the abstraction processing part 231 as a parameter, and determines the access control in accordance with the access control rule (policy) described in the policy file 240. The policy file 240 can be set from outside. Accordingly, it is possible to easily change in response to the organizational security policy.

In this embodiment, by processes in two steps of the abstraction processing part 231 and the policy base access control decision part 241, it is possible to determine the access control in accordance with general security policy and by flexibly corresponding to a change of the security policy.

In addition, by providing the abstraction processing part 231, it is not required to change a formation of information to provide to the application system 400 when the security policy is changed. Since it is not required to change software for the application system 400 in response to the change of the security policy, maintenance in response to the change of the security policy can be easily conducted.

The access control can be conducted so as to allow or prohibit what type of an access for which user by managing an ACL (Access Control List) for each document. And there is a conventional system (U.S. Pat. No. 6,289,450) in that this ACL is called a security policy. However, in the conventional system, since a policy is defined for each document, there is a problem in that it is difficult to know that the security policy is applied in accordance with a company secret management regulation (policy) of an "organization" such as "confidential matter is allowed only for related persons".

The security server 200 according to the present invention and determining the access control first separates a general decision rule for the access control and a security setting for details of each document, maps an attribute of a document or a user to an abstract security attribute, and then makes an access decision. In addition, since a general decision rule can be described as a policy file, the rule is not fixed but becomes replaceable.

There may be one example in that the decision rule may be programmed as one logic in software. However, There is no example in that the decision rule can be flexibly defined and set in accordance with the organizational security policy.

Data structures of tables managed by the security server 200 will be described.

FIG. 5 is a diagram showing a data structure of a user security level table according to the embodiment of the present invention. In FIG. 5, a data structure 251 of the user security level table 250 includes a UserMapList for managing a plurality of users by an array of userMap showing a security for each user by code 252 showing "UserMapList{userMap[ ] userMap;};"

The userMap includes a user ID or a group ID shown by a character string by code 253-1 showing "String principalId;", a type of each entry a character string showing a user, a group, or a like by code 253-2 showing "String entryType", a security level shown by a character string by code 253-3 showing "String levelId;".

An entry of userMap for each user 52 using the application system 400 is created in UserMapList and the user 52 is registered.

FIG. 6 is a diagram showing a data structure of the document profile management table according to the embodiment of the present invention. In FIG. 6, a data structure 261 of the document profile management table 260 includes DocProfileTable for managing a plurality of digital documents by an array of docProfile showing the security policy for each digital document by code 262 showing "DocProfileTable{DocProfile[ ] docProfiles;};".

The docProfile includes an digital document ID shown by a character string by code 263-1 showing "String docId;", a document category shown by a character string by code 263-2 showing "String DocCategory;", a sensitivity level shown by a character string by code 263-3 showing "String docLevel;", a list of a plurality of related persons shown by an array of related persons shown by a character string by code 263-4 showing "String[ ] relatedPersons;", a list of a plurality of zone IDs shown by an array of zone IDs shown by a character string by code 263-5 showing "String[ ] zones;", a nondisclosure date shown by a date by code 263-6 showing "Date nondisclosure", a retention date shown by a date by code 263-7 showing "Date retention", and a validity date shown by a date by code 263-8 showing "Date validity".

An entry of the DocProfile for each digital document subject for the access control is created in the DocProfileTale and the digital document is registered. The document ID is information to identify each digital document. The document category and the sensitivity level indicates identification information of the document category and the sensitivity level used by the security policy.

User IDs or group IDs of related persons for the digital document are shown in the related person list. Zone IDs specifying zones where an access to the digital document is allowed are indicated in the zone ID list.

FIG. 7 is a diagram showing a data structure of the zone management table according to the embodiment of the present invention. In FIG. 7, a data structure 271 of the zone management table 270 includes ZoneInfoTable for managing a plurality of zones by managing an array of ZoneInfo showing information specifying each zone by code 272 showing "ZoneInfo Table{ZoneInfo[ ] zones};".

The ZoneInfo includes a zone ID shown by a character string by code 273-1 showing "String id;", a zone name shown by a character string by code 273-2 showing "String name;", and an address of the zone shown by an array of AddressInfo[ ] by codes 273-3 showing "AddressInfo[ ] addresses;".

A data structure of the AddressInfo written in coded 273-3 includes an IP address or a MAC address shown by a character string by code 275-1 showing "String address;", "IP" or "MAC" shown by a character string by code 275-2 showing "String addressType;", and a subnet mask shown by a character string such as "255.255.255.0" when IP address by code 275-3 showing "String netmask;".

The zone management table 270 is a table for managing zones allowing an access by a list of zone addresses. A plurality of IP addresses or MAC addresses are assigned to one zone ID.

FIG. 8 is a diagram showing a data structure of the print profile management table according to the embodiment of the present invention. In FIG. 8, a data structure 281 of the print profile management table 280 includes PrintProfileTable for managing a plurality of print profiles by an array of PrintProfile showing a profile concerning each print by code 281 showing "PrintProfileTable{PrintProfile[ ] printprofiles;};".

The PrintProfile includes a print ID shown by a character string by code 283-1 showing "String printId;", a document ID of the digital document shown by a character string by code 283-2 showing "String docId;", a printed date shown by a date by code 283-4 showing "String printed UserId;", and a printed user name shown by a character string by code 283-5 showing "String printedUserName;".

Each time the digital document under the access control is printed, an entry of the PrintProfile is created and registered in the PrintProfileTable. The print ID is identification information to specify each print. The document ID is identification information showing a document being printed.

In the following, a sequence of the access control will be described in detail. The document management system 100, the digital copier 70, and the document viewer 53 will be described.

[Access Control in the Document Management System]

The access control in the document management system 100 will be described with reference to FIG. 9 and FIG. 10.

FIG. 9 is a diagram showing an access control sequence in the document management system according to the embodiment of the present invention. FIG. 10 is a flowchart for explaining an access control process in the document management system according to the embodiment of the present invention. In FIG. 9 and FIG. 10, each process in the access control sequence shown in FIG. 9 corresponds by the same numeral number to each process shown in FIG. 10.

Figure 10:
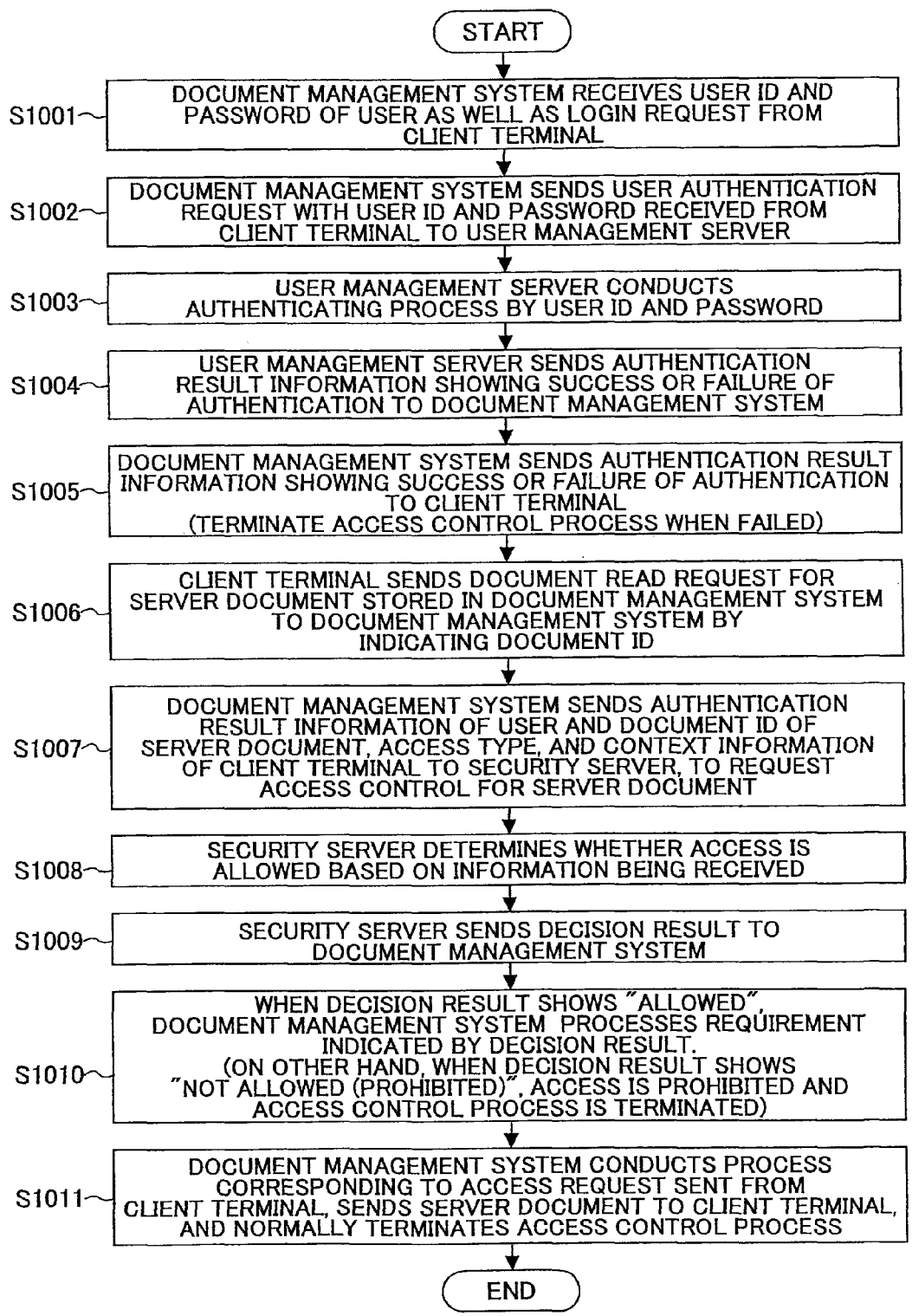
FIG. 10 is a flowchart for explaining an access control process in the document management system according to the embodiment of the present invention.

In FIG. 9 and FIG. 10, the document management system 100 receives a user ID and a password of the user 52 as well as a login request from the client terminal 51 (S1001).

The document management system 100 sends a user authentication request with the user ID and the password received from the client terminal 51 to the user management server 300 (S1002). The user management server 300 conducts an authenticating process by the user ID and the password (S1003). The user management server 300 sends authentication result information showing a success or failure of the authentication to the document management system 100 (S1004). The authentication result information includes user identification information identifying a user and information showing the success or failure of the authentication.

The document management system 100 conducts a process corresponding to the authentication result information (S1005). When the authentication result information shows the success of the authentication, the document management system 100 sends the authentication result information received from the user management server 300 to the client terminal 51 and goes to S1006. On the other hand, when the authentication result information shows the failure of the authentication, the documents management system 100 terminates the access control process.

The client terminal 51 sends a document read request for the server document 61 stored in the document management system 100 to the document management system 100 by indicating the document ID (S1006).

The document management system 100 sends the authentication result information of the user 52 and document ID of the server document 61, an access type, and context information of the client terminal 51 to the security server 200, to request the access control for the server document 61 (S1007). For example, the access type indicates a read access indicated by the document read request.

The security server 200 determines whether or the access is allowed based on information being received (S1008).

The security server 200 sends a decision result to the document management system 100 (S1009). The document management system 100 conducts a process corresponding to the decision result received from the security server 200 (S1009). When the decision result shows "Allowed", the document management system 100 processes a requirement indicated by the decision result and advances to S1011. On the other hand, when the decision result shows "Not Allowed (Prohibited)", the access is prohibited and the access control process is terminated (S1010).

The document management system 100 conducts a process corresponding to an access request sent from the client terminal 51, sends the server document 61 to the client terminal 51, and normally terminates the access control process (S1011).

The user authentication request in S1002 can be sent through the security server 200. A method for authenticating the user 52 is not limited to a method for authenticating by the user ID and the password. Alternatively, a higher technical authentication such as a biometric authentication, a challenge-response authentication using a master card, or a like can be applied.

Next, the authenticating process conducted by the user management server 300 will be described with reference to FIG. 11. FIG. 11 is a diagram for explaining the authenticating process by the user management server according to the embodiment of the present invention. In FIG. 11, the user management server 300 checks the user ID and the password received from the document management system 100 with the user management table 310 to authenticate the user 52 (L0011).

It is checked whether or not the user 52 is successfully authenticated (L0012). When the user 52 is successfully authenticated, the user management server 300 obtains a list of group IDs to which the user 52 belongs (L0013), and creates the authentication result information by the user ID, the user name, and the list of group IDs (L0014). The authentication result information includes user identification information identifying a user and information showing the success of the authentication.

The user management server 300 sends the authentication result information to the document management system 100 (L0015), and terminates a process conducted when the user 52 is successfully authenticated (L0016). Then, the authenticating process is terminated (L0020).

On the other hand, when the user 52 fails to be authenticated (L0017), the user management server 300 creates the authentication result information showing the failure of the authentication and sends the authentication result information to the document management system 100 (L0018). a process for the failure of the authentication for the user 52 is ended (L0019), and terminates the authenticating process (L0020).

FIG. 12 is a diagram showing a data structure of the authentication result information according to the embodiment of the present invention. In FIG. 12, for example, a data structure 501 of the authentication result information defines a structure AuthInfo and includes a user ID shown by a character string by code 503-1 showing "String userId;", a user name shown by a character string by code 503-2 showing "String username;", an array of group IDs of groups to which the user 52 belongs, shown by a character string by code 503-3 showing "String[ ] groups;".

Next, the decision process conducted by the security server 200 in S1008 will be described with reference to FIG. 13, FIG. 14, and FIG. 15. FIG. 13, FIG. 14, and FIG. 15 are diagrams for explaining the decision process by the security server in response to a request from the document management system according to the embodiment of the present invention.

In FIG. 13, FIG. 14, and FIG. 15, a process, in which an operation for reading the server document 61 of the document management system 100 is conducted at the client terminal 51 and a document read request is sent from the client terminal 51 to the document management system 100, is illustrated. For example, there are a property refer, an original refer, an update, a delete, and a store as other operations at the client terminal 51, and a property refer request, an original refer request, an update request, a delete request, and a store request are sent from the document management system 100 to the security server 200, respectively.

The original reference operation is an access for obtaining the server document 61 being an original managed in the document management system 100. In addition, the document read operation illustrated in FIG. 13 through FIG. 15 is an access for obtaining the server document 61, which is converted so that only the document viewer 53 being special can open the server document 61 being original.

Moreover, the decision process in the security system 100 is similarly conducted for each request.

In FIG. 13, the security server 200 receives the authentication result information, the document ID, the access type, the context information from the document management system 100 conducting the decision request (L0031). For example, the access type indicates "document read for the server document". A type of the document 60 (that is, server document 61) and a type of the operation (that is, document read) are specified by the access type.

The security server 200 obtains a document profile (docProfile) corresponding to the document ID (docid) received from the document management system 100, from the document profile management table 260 (L0032).

The security server 200 obtains the document category (docCategory) and the sensitivity level (docLevel) by referring to the document profile (docProfile) (L0033).

The security server 200 obtains the related persons list by referring to the document profile (docProfile) (L0034).

The security server 200 checks whether or not the related person list (relatedPersons) includes the user IDs (userId) or position groups (groups) of the authentication result information (authInfo) (L0035).

When the related person list (relatedPersons) includes the user IDs (userId) or position groups (groups) of the authentication result information (authInfo), the security server 200 indicates the related persons (RELATED_PERSONS) to the user category (userCategory) (L0036). On the other hand, when the related person list (relatedPersons) does not include the user IDs (userId) or position groups (groups) of the authentication result information (authInfo), the security server 200 indicates any person (ANY) to the user category (userCategory) (L0037).

The security server 200 refers to the user security level table (UserMapTable) and stores a level corresponding to the user ID or the group ID (principalId) to the security level (userLevel) (L0038).

The security server 200 obtains the zone ID list (zones) by referring to the document profile (docProfile) (L0039).

The security server 200 refers to the zone management table (ZoneInfoTable), obtains the IP address or the MAC address corresponding to the zone ID list (zones), and creates an allowed address list (L0040).

The security server 200 checks whether or not the address included in the context information is included in the allowed address list created in L0040 (L0041).

When the address is included in the allowed address list, the security server 200 sets "restricted (RESTRICTED)" to the zone (zone) (L0042). On the other hand, when the address is not included in the allowed address list, the security server 200 sets "any zone (ANY)" to the zone (zone) (L0043).

The security server 200 loads the security policy file to the memory unit 42 and obtains an array of the access control rule (rule) (L0044).

The security server 200 repeats processes by the following L0046 through L0071 for each access control rule (rule) (L0045).

The security server 200 checks whether or not the document category (docCategory) of the access control rule shows "not restricted (ANY)" or corresponds to the document category (docCategory) of the document profile (DocProfile), and the document level (docLevel) of the access control rule (rule) shows "not restricted (ANY)" or corresponds to the document level (docLevel) of the document profile (DocProfile) (L0046). When the document category (docCategory) of the access control rule (rule) shows "not restricted (ANY)" or corresponds to the document category (docCategory) of the document profile (DocProfile), and the document level (docLevel) of the access control rule (rule) corresponds to "not restricted (ANY)" or the document level (docLevel) of the document profile (DocProfile), the security server 200 further repeats processes in the following L0064 through L0064 for each access control list (Ace) of the access control rule (rule) (L0048).

On the other hand, when the above condition is not satisfied (L0070 and L0071), the security server 200 goes back to L0045 and repeats the above processes for a next access control rule (rule).

When the above condition is satisfied, the security server 200 checks whether or not the user category (userCategory) of the access control list (Ace) corresponds to "not restricted (ANY)" or the user category (userCategory) set in L0036 or L0037, and the user level (userLevel) of the access control list (Ace) corresponds to "not restricted (ANY)" or the user level (userLevel) set in L0038, and the zone (zone) corresponds to "not restricted (ANY)" or the zone (zone) set in L0042 or L0043 (L0049, L0050, and L0051). When the user category (userCategory) of the access control list (Ace) corresponds to "not restricted (ANY)" or the user category (userCategory) set in L0036 or L0037, and the user level (userLevel) of the access control list (Ace) corresponds to "not restricted (ANY)" or the user level (userLevel) set in L0038, and the user level (userLevel) of the access control list (Ace) corresponds to "not restricted (ANY)" or the user level (userLevel) set in L0038, and the zone (zone) of the access control list (Ace) corresponds to "not restricted (ANY)" or the zone (zone) set in L0042 or L0044, the security server 200 repeats the following L0053 through L0058 for each operation (Operation) of the access control list (Ace) (L0052).

On the other hand, when any one of conditions in L0049, L0050, and L0051 is not satisfied (L0064 and L0065), the security server 200 goes back to L0048 and repeats the above processes for a next access control list (Ace) of the access control rule (rule).

When the conditions in L0049, L0050, and L0051 are satisfied, the security server 200 checks whether or not an ID of the operation (Operation.Id) corresponds to an operation (operation) of the access control list (Ace) (L0053). When the ID of the operation (Operation.Id) corresponds to an operation (operation) of the access control list (Ace), "allowed (true)" is stored to an allowed item of the decision result information (decisionInfo) (L0054). In addition, the security server 200 stores all requirements (requirement) indicated by the operation (operation) to the decision result information (L0055) and advances to L0072 (L0056).

On the other hand, when a condition in L0053 is not satisfied (L0058 and L0059), the security server 200 goes back to L0052 and repeats the above processes for a next operation (Operation) of the access control list (Ace).

When the security server 200 ends the process for each operation (Operation) of the access control list (Ace), the security server 200 checks whether or not there is a respective operation (Operation) (L0060). When there is no respective operation, the security server 200 stores "not allowed (false)" to the allowed item (allowed) of the decision result information (decision Info) and goes to L0072 (L0061).

On the Other Hand, when there is a Respective operation, the security server 200 advances to L0072 (L0063).

When the security server 200 ends the process in L0048 for each access control list (Ace) of the access control rule (rule), security server 200 checks whether or not there is a respective access control list (Ace) (L0066). When there is no respective access control list (Ace), the security server 200 stores "not allowed (false)" to the allowed item (allowed) of the decision result information (decisionInfo) (L0067), and advances to L0072 (L0069).

On the other hand, when there is a respective access control list (Ace), the security server 200 advances to L0072 (L0069).

In L0045, when the process for each access control rule (rule), the security server 200 checks whether or not there is a respective access control rule (L0072). When there is no respective access control rule (rule), the security server 200 stores "not allowed (false)" to the allowed item (allowed) of the decision result information (decisionInfo) (L0073), and advances to L0075. On the other hand, when there is a respective access control rule (rule), the security server 200 advances to L0075.

The security server 200 checks whether or not the allowed item (allowed) of the decision result information (decisionInfo) shows "not allowed (false)" (L0075). When the allowed item (allowed) of the decision result information (decisionInfo) shows "not allowed (false)", the security server 200 sends the decision result information to the document management system 100 which sent the decision request (L0076) and terminates the decision process (L0082).

On the other hand, when the allowed item (allowed) of the decision result information (decisionInfo) does not show "not allowed (false)" (L0078), the security server 200 conducts a compensating process for requirements (requirement) included in the decision result information (decisionInfo) (L0079), sends the decision result information (decisionInfo) to the document management system 100 that sent the decision request (L0080), and then terminates the decision process (L0082).

A data structure of the context information, which is sent from the document management system 100 to the security server 20, will be described with reference to FIG. 16. FIG. 16 is a diagram showing the data structure of the context information according to the embodiment of the present invention.

In FIG. 16, the context information is information showing an address of the client terminal 51 used by the user 52. For example, the data structure 511 of the context information is defined by a structure ContextInfo, and includes an IP address shown by a character string by code 513-1 showing "String ipAddress;", and a MAC address shown by a character string by code 513-2 showing "String macAddress;".

The decision result information (decisionInfo), which is sent from the security server 200 to the document management system 100, will be described with reference to FIG. 17. FIG. 17 is a diagram showing a data structure of the decision result information according to the embodiment of the present invention.

In FIG. 17, the decision result information is information showing a decision result of the access control. For example, the data structure 521 of the decision result information is defined by a structure DecisionInfo, and includes allowance information shown by true or false by code 523-1 showing "Boolean allowed;", and a plurality of requirements shown by an array of requirements by code 523-2 showing "Requirement[ ] requirements;".

Moreover, each requirement is defined by a structure Requirement, and includes a requirement ID for identifying a requirement and being shown by a character string by code 252-1 showing "String requirement;", a plurality of sets of supplement information shown by an array of the supplement information by code 525-2 showing "Property [ ] supplements;", supplement data shown by an array of bytes by code 525-3 showing "Byte[ ] data;", and a plurality of alternative requirements shown by an array of the requirement by code 525-4 showing "Requirement[ ] alternatives;".

The supplement information is defines by a structure Property, and includes a name shown by a character string by code 527-1 showing "String name;", and a value shown by a character string by code 527-2 showing "String value;".

Next, the compensating process for requirements by the document management system 100 will be described with reference to FIG. 18. FIG. 18 is a flowchart for explaining the compensating process for requirements by the document management system according to the embodiment of the present invention.

In FIG. 18, the document management system 100 repeats from L1102 to L1110 for each set of the supplement information (supplement) included in the requirement (requirement) of the decision result information (decisionInfo) (L1101).

The document management system 100 checks whether or not the name (name) of a property (Property) of the supplement information indicates a static image (static_image) (L1102). When the static image (static_image) is indicated, the document management system 100 reads out data of a stamp image file indicated in a value (value) of the property (Property) of the supplement information from a local hard disk (storage unit 46), stores the data of the stamp image file as supplement data of the requirement (requirement) (L1103), and advances to L1105.

On the other hand, when the static image (static_image) is not indicated, the document management system 100 advance to L1105.

For example, the static image is a stamp image or a like.

The document management system 100 checks whether or not a dynamic image (dynamic_image) is indicated to the name (name) of the property (Property) of the supplement information, and the operation (operation) shows "print" (L1105). When the dynamic image (dynamic_image) is set to the name (name) of the property (Property) of the supplement information, and the operation (operation) shows "print", the document management system 100 creates a new print profile (printProfile1) (L1106). Moreover, the document management system 100 encodes a print ID (printId) of the print profile (printProfile) to be identification image data (L1107), and stores the identification image data to supplement data (data) of the requirement (requirement) of the identification image data (L1108). Then, the document management system 100 terminates the compensating process for the requirement.

On the other hand, the dynamic image (dynamic_image) is not indicated in the name (name) of the property (property) of the supplement information or the operation (operation) does not show "print", the document management system 100 terminates the compensating process for the requirement.

The dynamic image is a barcode image, identification pattern image, or a like.

Next, the requirement process conducted by the document management system 100 will be described with reference to FIG. 19 and FIG. 20. FIG. 19 and FIG. 20 are flowcharts for explaining the requirement process according to the embodiment of the present invention.

In FIG. 19, the document management system 100 checks whether or not the allowed item (allowed) of the decision result information (decisionInfo) shows "not allowed (false)" (L1121). When "not allowed (false)" is shown, the document management system 100 denies the access and terminates the requirement process (L1122).

On the other hand, when "not allowed (false)" is not shown, the document management system 100 repeats from L1125 to L1160 for each requirement (requirement) of the decision result information (decisionInfo) (L1124).

The document management system 100 checks whether or not a requirement (requirement) (hereinafter, referred to not-supported requirement), which is not supported by the document management system 100, is indicated (L1125). When the not-supported requirement is not indicated, the document management system 100 advances to L1131.

On the other hand, when the not-supported requirement is indicated, the document management system 100 further checks whether or not the alternative requirement (alternative) of the not-supported requirement (requirement) is an alternative requirement, which is not supported (hereinafter, referred to not-supported alternative requirement), and is indicated (L1126). When the not-supported alternative requirement (alternative) for the not-supported requirement (requirement) is indicated, the document management system 100 denies the access and terminates the requirement process (L1127).

On the other hand, when the not-supported alternative requirement (alternative) for the not-supported requirement (requirement) is not indicated, the document management system 100 processes the alternative requirement (alternative) of the not-supported requirement (requirement) (L1129).

Subsequently, the document management system 100 checks whether or not a log record (record_audit_data) is indicated in the requirement (requirement) (L1131). When the log record (record_audit_data) is indicated, the document management system 100 generates log data including the user ID (userId), the document ID (docid), the operation (operation), date and time, the context information (contextInfo) (L1132).

Then, the document management system 100 sends the log data to security server 200 (L1133). The document management system 100 checks whether or not the log data is successfully sent to the security server 200 (L1134). When the log data is failed to send, the document management system 100 denies the access and terminates the requirement process (L1135). On the other hand, when the log data is successfully sent to the security server 200, the document management system 100 advances to L1138.

Furthermore, the document management system 100 checks whether or not an encryption (encryption) is indicated to the requirement (requirement) (L1138). When the encryption (encryption) is indicated, the document management system 100 encrypts the document 60 stored therein (L1139). On the other hand, when the encryption (encryption) is not indicated, the document management system 100 advances to L1141.

Subsequently, the document management system 100 checks whether or not a protection of integrity of an original of the digital document is indicated in the requirement (requirement) (L1141). When the protection of integrity of the original of the digital document is indicated, the document management system 100 transmits and stores the digital document to an original document integrity protection supporting system (L1142). For example, the original document integrity protection supporting system may be a system disclosed in Japanese Laid-open Patent Application No. 2000-285024. Alternatively, this original document integrity protection supporting system can be provided within the document management system 100.

On the other hand, when the protection of the integrity of an original (integrity_protection) is indicated in the requirement (requirement), the document management system 100 advances to L1144.

Moreover the document management system 100 checks whether or not the requirement (requirement) indicates to allow a multiple authentication (multi_authentication) for an access to the digital document (L1144). When the requirement (requirement) does not indicate to allow the multiple authentication (multi_authentication), the document management system 100 advances to L1150.

On the other hand, when the requirement (requirement) indicates to allow the multiple authentication (multi_authentication), the document management system 100 requires for the user 52 using the client terminal 52 to conduct a strict user authentication (such as a finger print recognition or a like) (L1145). After this strict user authentication, the document management system 100 checks whether or not the strict user authentication fails to authenticate the user 52 (L1146). When the strict user authentication fails, the document management system 100 denies the access and terminates the requirement process (L1147). On the other hand, when the strict user authentication succeeds to authenticate the user 52, the document management system 100 advances to L1150.

Subsequently, the document management system 100 checks whether or not the requirement (requirement) indicates a version management (versioning) of the digital document (L1150). When the version management (versioning) is indicated, the document management system 100 stores a revised document as a new version (L1151) and advances to L1153.

Moreover, the document management system 100 checks whether or not the requirement (requirement) indicates a complete deletion of the digital document (L1153). When the complete deletion is indicated, the document management system 100 executes a complete deleting process with respect to the digital document being deleted (L1154), and advances to L1156. On the other hand, when the complete deletion is not indicated, the document management system 100 advances to L1156.

Subsequently, the document management system 100 checks whether or not the requirement (requirement) indicates an alarm display (show_alarm) (L1156). When the alarm display (show_alarm) is indicated, the document management system 100 creates an alarm character string in a character string format indicated in the supplement information (supplement) of the requirement (requirement) (L1157), and displays the alarm character string by a dialog box to the user 52 (L1158). Then, the document management system 100 goes back to L1124 to repeat the above same processes for a next requirement (requirement). On the other hand, when the alarm display (show_alarm) is not indicated, the document management system 100 advances to L1124.

After the above processes are conducted for all requirements (requirement), the document management system 100 conducts an access process requested from the client terminal 51 (L1161), and terminates the requirement process (L1162).

As described with reference to FIG. 19 and FIG. 20, the requirements (requirement) of the decision result information (decisionInfo) are processed in parallel. However, since requirements (requirement) to be processed are defined for each operation (operation), it is not required to process all requirements (requirement). For example, the complete deletion (complete_deletion) of the digital document is indicated only for the server document 61. For the sake of convenience, the above processes are illustrated in FIG. 19 and FIG. 20. The document management system 100 conducts the above same processes for the alternative requirement.

As described above, the document management system 100 can conduct the access control in accordance with the security policy set in the security server 200. In this case, it is possible to apply an allowable requirement regulated by the security policy. Moreover, by including the processes for the supplement information and alternative requirement necessary to satisfy the allowable requirement, the requirement process can be flexibly required.

[Access Control by Digital Copier]

The access control by the digital copier 70 will be described with reference to FIG. 21 and FIG. 22.

FIG. 21 is a diagram showing an access control sequence at the digital copier according to the embodiment of the present invention. FIG. 22 is a flowchart for explaining the access control process by the digital copier according to the embodiment of the present invention. In FIG. 21 and FIG. 22, each process in the access control sequence shown in FIG. 21 corresponds by the same numeral number to each process shown in FIG. 22.

In FIG. 21 and FIG. 22, the digital copier 70 receives the login request with the user ID and the password from the user 52 (S2001).

The digital copier 70 sends the user ID and the password received from the user 52 to the user management server 300 to make an authentication request (S2002). The user management server 300 conducts the authenticating process by the user ID and the password received from the digital copier 70 (S2003). The user management server 300 sends authentication result information showing success or failure of the authentication to the digital copier 70 (S2004).

The digital copier 70 conducts a process corresponding to the authentication result information (S2005). When the authentication result information shows that the user 52 is successfully authenticated, the digital copier 70 sends the authentication result information received from the user management server 300 to the client terminal 51, and advances to S2006. On the other hand, when the authentication result information shows that the user 52 is failed to authenticate, the digital copier 70 terminates the access control process.

The user 52 makes a copy request for a paper document 62 at the digital copier 70 (S2006).

When the digital copier 70 receives the copy request for the paper document 62, in order to identify the paper document 62, the digital copier 70 cuts out an area for identification from image data obtained by scanning the paper document 62 (S2007).

The authentication information of the user 52, a cut-out image, the access type, and the context information are sent to the security server 200 to request the access control (S2008). For example, a copy access for the copy request is indicated as the access type.

The security server 200 determines based on the information received from the digital copier 70 whether the access is allowed or not allowed (S2009). The security server 200 sends a decision result to the digital copier (S2010).

The digital copier 70 conducts a process corresponding to the decision result received from the security server 200 (S2011). When the decision result shows "Allowed", the digital copier 70 processes a requirement included in the decision result. On the other hand, when the decision result shows "Prohibited", the digital copier 70 terminates the access control process without any access.

The digital copier 70 processes the access request (copy request) request by the user 52, outputs sheets being copied, and terminates the access control process (S2012).

In this example, a case in that the access request is the copy request is described. The same process can be conducted for a scan request, a fax transmission request, and a like. For example, when the access request is the scan request, image data being scanned is stored in a predetermined storage area.

When the access request is the fax transmission request, the image data being scanned are sent to a destination indicated by the user 52.

The user authentication request in S2009 can be sent through the security server 200. A method for authenticating the user 52 is not limited to a method for authenticating by the user ID and the password. Alternatively, a higher technical authentication such as a biometric authentication, a challenge-response authentication using a master card, or a like can be applied.

An authenticating process by the user management server 300 in S2003 is the same as the authenticating process in the access control of the document management system 100, and then explanation thereof will be omitted. In addition, a data structure of the authentication result information generated by the user management server 300 is the same as the data structure in the access control of the document management system 100, and then explanation thereof will be omitted.

The decision process conducted by the security server 200 in S2009 will be described with reference to FIG. 23, FIG. 24, and FIG. 25. FIG. 23, FIG. 24, and FIG. 25 are diagrams for explaining the decision process in the security server in response to a request from the digital copier according to the embodiment of the present invention.

In FIG. 23, FIG. 24, and FIG. 25, a case, in which the user 52 conducts the copy request to copy the paper document 62 by the digital copier 70, is illustrated. For example, as other operations at the digital copier 70, there are a fax transmission, a scan, and a like and respective requests are sent from the digital copier 70 to the security system 100 as a fax transmission request, a scan request, and a like are An operation for the fax transmission is to send the paper document 62 being scanned by the digital copier 70 to a destination indicated by the user 52 by fax. An operation for a scan is to scan the paper document 62 and store image data in a predetermined storage area.

The decision process in the security server 200 is the same for respective requests.

In FIG. 23, the security server 200 receives the authentication result information, the document ID, the access type, the context information from the digital copier 70 that sent the decision request (L2031). For example, "copy for the paper document" is indicated in the access type. A type of the document 60 (that is, paper document 62) and an type of operation (that is, copy) are specified.

The security server 200 obtains a print ID (printId) by decoding the cut-out image received from the digital copier 70 (L2032).

The security server 200 determines whether or not the cut-out image can be decoded (L2033). When the cut-out image cannot be decoded, the security server 200 sets "unknown (UNKNOWN)" to the document category (docCategory) (L2034), sets "unknown (UNKNOWN)" to the document level (docLevel) (L2035), sets "not restricted (ANY)" to the user category (userCategory) (L2036), and sets "not restricted (ANY)" to the zone (zone) (L2037).

On the other hand, when the cut-out image can be decoded, the security server 200 obtains a print profile (printProfile) corresponding to the print ID (printId) by referring to the print profile management table 280 (L2040).

The security server 200 checks whether or not the print profile corresponding to the print ID exists (L2041). When the respective print profile corresponding to the print ID does not exist, the security server 200 sets "unknown (UNKNOWN)" to the document category (docCategory) (L2042), sets "unknown (UNKNOWN)" to the document level (docLevel) (L2043), sets "not restricted (ANY)" to the user category (userCategory) (L2044), and sets "not restricted (ANY)" to the zone (zone) (L2045).

On the other hand, when the print profile corresponding to the print ID exists (L2047), the security server 200 obtains the document ID (docid) from the print profile (printProfile) (L2048), obtains the document profile (docProfile) corresponding to the document ID (docid) by referring to the document profile management table (L2049), obtains the document category (docCategory) and the sensitivity level (docLevel) by referring to the document profile (docProfile) (L2050), and obtains the related person list (relatedPersons) by referring to the document profile (docProfile) (L2051).

The security server 200 further checks whether or not the related person list (relatedPersons) includes the user IDs (userId) or position groups (groups) of the authentication result information (authInfo) (L2052). When the related person list (relatedPersons) includes the user IDs (userId) or position groups (groups) of the authentication result information (authInfo), the security server 200 indicates the related persons (RELATED_PERSONS) to the user category (userCategory) (L2053). On the other hand, when the related person list (relatedPersons) does not include the user IDs (userId) or position groups (groups) of the authentication result information (authInfo), the security server 200 indicates any person (ANY) to the user category (userCategory) (L2054), and advances to L2055.

The security server 200 obtains the zone ID list (zones) by referring to the document profile (docProfile) (L2055). The security server 200 refers to the zone management table (ZoneInfoTable), obtains the IP address or the MAC address corresponding to the zone ID list (zones), and creates an allowed address list (L2056).

The security server 200 checks whether or not the address included in the context information is included in the allowed address list created in L2056 (L2057). When the address is included in the allowed address list, the security server 200 sets "restricted (RESTRICTED)" to the zone (zone) (L2058), and advances to L2062. On the other hand, when the address is not included in the allowed address list, the security server 200 sets "any zone (ANY)" to the zone (zone) (L2059), advances to L2062.

The security server 200 refers to the user security level table (UserMapTable) and stores a level corresponding to the user ID (userId) or position groups (groups) to the user level (userLevel) (l2062).

The security server 200 loads the security policy file to the memory unit 42 and obtains an array of the access control rule (rule) (L2063).

The security server 200 repeats processes by the following L0046 through L0071 for each access control rule (rule) (L0064).

The security server 200 checks whether or not the document category (docCategory) of the access control rule shows "not restricted (ANY)" or corresponds to the document category (docCategory) of the document profile (DocProfile), and the document level (docLevel) of the access control rule (rule) shows "not restricted (ANY)" or corresponds to the document level (docLevel) of the document profile (DocProfile) (L20065 and L2066). When the document category (docCategory) of the access control rule (rule) shows "not restricted (ANY)" or corresponds to the document category (docCategory) of the document profile (DocProfile), and the document level (docLevel) of the access control rule (rule) corresponds to "not restricted (ANY)" or the document level (docLevel) of the document profile (DocProfile), the security server 200 further repeats processes in the following L2068 through L2083 for each access control list (Ace) of the access control rule (rule) (L2067).

On the other hand, when the above condition is not satisfied (L2088 and L2089), the security server 200 goes back to L2064 and repeats the above processes for a next access control rule (rule).

When the above condition is satisfied, the security server 200 checks whether or not the user category (userCategory) of the access control list (Ace) corresponds to "not restricted (ANY)" or the user category (userCategory) set in L2053 or L2054, and the user level (userLevel) of the access control list (Ace) corresponds to "not restricted (ANY)" or the user level (userLevel) set in L2062, and the zone (zone) corresponds to "not restricted (ANY)" or the zone (zone) set in L2058 or L2059 (L2068, L2069, and L2070). When the user category (userCategory) of the access control list (Ace) corresponds to "not restricted (ANY)" or the user category (userCategory) set in L2053 or L2054, and the user level (userLevel) of the access control list (Ace) corresponds to "not restricted (ANY)" or the user level (userLevel) set in L2062, and the zone (zone) corresponds to "not restricted (ANY)" or the zone (zone) set in L2058 or L2059, the security server 200 repeats the following L2072 through L2077 for each operation (Operation) of the access control list (Ace) (L2071).

On the other hand, when any one of conditions in L2068, L2069, and L2070 is not satisfied (L2082 and L2083), the security server 200 goes back to L2067 and repeats the above processes for a next access control list (Ace) of the access control rule (rule).

When the conditions in L2068, L2069, and L2070 are satisfied, the security server 200 checks whether or not an ID of the operation (Operation.Id) corresponds to an operation (operation) of the access control list (Ace) (L2072). When the ID of the operation (Operation.Id) corresponds to an operation (operation) of the access control list (Ace), "allowed (true)" is stored to an allowed item of the decision result information (decisionInfo) (L2073). In addition, the security server 200 stores all requirements (requirement) indicated by the operation (operation) to the decision result information (L2074) and advances to L0072 (L2081).

On the other hand, when a condition in L0053 is not satisfied (L2076 and L2077), the security server 200 goes back to L2071 and repeats the above processes for a next operation (Operation) of the access control list (Ace).

When the security server 200 ends the process for each operation (Operation) of the access control list (Ace) in L2071, the security server 200 checks whether or not there is a respective operation (Operation) (L2078). When there is no respective operation, the security server 200 stores "not allowed (false)" to the allowed item (allowed) of the decision result information (decisionInfo) (L2079) and goes to L2090 (L2081).

On the other hand, when there is a respective operation, the security server 200 advances to L2090 (L2081).

When the security server 200 ends the process in L2067 for each access control rule (rule), security server 200 checks whether or not there is an access control rule (rule) (L2090). When there is no respective access control rule (rule), the security server 200 stores "not allowed (false)" to the allowed item (allowed) of the decision result information (decisionInfo) (L2091), and advances to L2093. On the other hand, when there is a respective access control rule (rule), the security server 200 advances to L2093.

The security server 200 checks whether or not the allowed item (allowed) of the decision result information (decisionInfo) shows "not allowed (false)" (L2093). When the allowed item (allowed) of the decision result information (decisionInfo) shows "not allowed (false)", the security server 200 sends the decision result information to the digital copier 70 which sent the decision request (L2094) and terminates the decision process (L2100).

On the other hand, when the allowed item (allowed) of the decision result information (decisionInfo) does not show "not allowed (false)" (L2096), the security server 200 conducts a compensating process for requirements (requirement) included in the decision result information (decisionInfo) (L2097), sends the decision result information (decisionInfo) to the digital copier 70 that sent the decision request (L2098), and then terminates the decision process (L2100).

A data structure of the context information sent from the digital copier 70 to the security server 200 is the same as the data structure of the context information sent from the document management system 100 to the security server 200, and explanation thereof will be omitted.

A data structure of the decision result information sent from the security server 200 to the digital copier 70 is the same as the data structure of the decision result information sent from the security server 200 to the document management system 100, and explanation thereof will be omitted.

The compensating process of the requirement by the digital copier 70 is the same as the compensating process for the requirement by the document management system 100, and explanation thereof will be omitted.

Next, the requirement process conducted by the digital copier 70 will be described with reference to FIG. 26, FIG. 27, and FIG. 28. FIG. 26, FIG. 27, and FIG. 28 are flowcharts for explaining the requirement process by the digital copier according to the embodiment of the present invention.

In FIG. 26, the digital copier 70 checks whether or not the allowed item (allowed) of the decision result information (decisionInfo) shows "not allowed (false)" (L2121). When "not allowed (false)" is shown, the digital copier 70 denies the access and terminates the requirement process (L2122).

On the other hand, when "not allowed (false)" is not shown, the digital copier 70 repeats from L2125 to L2178 for each requirement (requirement) of the decision result information (decisionInfo) (L2124).

The digital copier 70 checks whether or not a requirement (requirement) (hereinafter, referred to not-supported requirement), which is not supported by the digital copier 70, is indicated (L2125). When the not-supported requirement is not indicated, the digital copier 70 advances to L2131.

On the other hand, when the not-supported requirement is indicated, the digital copier 70 further checks whether or not the alternative requirement (alternative) of the not-supported requirement (requirement) is an alternative requirement, which is not supported (hereinafter, referred to not-supported alternative requirement), and is indicated (L2126). When the not-supported alternative requirement (alternative) for the not-supported requirement (requirement) is indicated, the digital copier 70 denies the access and terminates the requirement process (L2127).

On the other hand, when the not-supported alternative requirement (alternative) for the not-supported requirement (requirement) is not indicated, the digital copier 70 processes the alternative requirement (alternative) of the not-supported requirement (requirement) (L2128).

Subsequently, the digital copier 70 checks whether or not a log record (record_audit_data) is indicated in the requirement (requirement) (L2131). When the log record (record_audit_data) is indicated, the digital copier 70 generates log data including the user ID (userId), the document ID (docid), the operation (operation), date and time, the context information (contextInfo) (L2132).

Then, the digital copier 70 sends the log data to security server 200 (L2133). The digital copier 70 checks whether or not the log data is successfully sent to the security server 200 (L2134). When the log data is failed to send, the digital copier 70 denies the access and terminates the requirement process (L2135). On the other hand, when the log data is successfully sent to the security server 200, the digital copier 70 advances to L2138.

Furthermore, the digital copier 70 checks whether or not a label print (show_label) is indicated to the requirement (L2138). When the label print (show_label) is indicated, the digital copier 70 embeds a stamp image indicated by the supplement information (supplement) of the requirement by printing to a printed document (L2139). On the other hand, when the label print (show_label) is not indicated, the digital copier 70 advances to L2141.

Subsequently, the digital copier 70 checks whether or not a user name print (show_operator) is indicated (L2141). When the user name print (show_operator) is indicated, the digital copier 70 prints an operator name (operator) as the user name to a printed document (L2142). On the other hand, when the user name print (show_operator) is not indicated, the digital copier 70 advances to L2144.

Moreover, the digital copier 70 checks whether or not a record of an image log (record_image_data) is indicated (L2144). When the record of the image log (record_image_data) is indicated, the digital copier 70 generates image log data including the user ID (userId), the document ID (docid), the operation (operation), the date and time, the context information (contextInfo), and document data (scan data) (L2145). Subsequently, the digital copier 70 stores the image log data to an internal hard disk (L2146) On the other hand, when the record of the image log (record_image_data) is not indicated, the digital copier 70 advances to L2148.

Subsequently, the digital copier 70 checks whether or not an alarm display (show_alarm) is indicated (L2148). When the alarm display (show_alarm) is indicated, the digital copier 70 creates an alarm character string in a character string format indicated in the supplement information (supplement) of the requirement (requirement) (L2149), and displays the alarm character string at the operation panel to the user 52 (L2150). On the other hand, when the alarm display (show_alarm) is not indicated, digital copier 70 advances to L2152.

Furthermore, the digital copier 70 checks whether or not an alarm print (print_alarm) is indicated (L2152). When the alarm print (print_alarm) is indicated, the digital copier 70 creates an alarm character string in a character string format indicated in the supplement information (supplement) of the requirement (requirement) (L2153), and prints the alarm character string to embody to the printed document (L2154). On the other hand, when the alarm print (print_alarm) is not indicated, the digital copier 70 advances to L2156.

Subsequently, the digital copier 70 checks whether or not a receiver restriction (address_restriction) for the fax transmission is indicated (L2156). When the receiver restriction (address_restriction) is indicated, the digital copier 70 checks a receiver address indicated by the user 52 with a receiver condition indicated in the supplement information (supplement) of the requirement (requirement) (L2157). Moreover, the digital copier 70 checks whether or not the receiver address matches with the receiver condition (L3258). When the receiver address does not match with the receiver condition, the digital copier 70 displays, at an operation panel, a message showing that the receiver address does not match with the receiver condition, to inform it to the user 52 (L2159), denies the access by the user 52, and terminates the requirement process (L2160). On the other hand, when the receiver address matches with the receiver condition, the digital copier 70 advances to L2162.

When the digital copier 70 determines in L2156 that the receiver restriction (address_restriction) is not indicated, the digital copier 70 advances to L2162.

Moreover, the digital copier 70 decides whether or not a confidential transmission mode (private_send) is indicated (L2163). When the confidential transmission mode (private_send) is indicated, the digital copier 70 sets the confidential transmission mode to a sender condition (L2164). Then, the digital copier 70 checks whether or not the confidential transmission mode cannot be set (L2165). When the confidential transmission mode cannot be set, the digital copier 70 displays, at the operation panel, a message showing that a receiver cannot receive the confidential transmission, to inform it to the user 52 (L2166), denies the access, and terminates the requirement process (L2167). On the other hand, when the confidential transmission can be set, the digital copier 70 advances to L2170.

When the digital copier 70 determines in L2163 that the confidential transmission mode (private_send) is not indicated, the digital copier 70 advances to L2170.

Subsequently, the digital copier 70 checks whether or not a visible watermark letter print (visible_watermark) is indicated (L2170). When the visible watermark letter print is indicated, the digital copier 70 creates a character string in a character string format indicated by the supplement information (supplement) of the requirement (requirement) (L2171), and embeds the character string as a watermark to the printed documents (L2172). On the other hand, when the visible watermark letter is not indicated, the digital copier 70 advances to L2174.

Furthermore, the digital copier 70 checks whether or not a digital watermark (digital_watermark) is indicated (L2174). When the digital watermark is indicated, the digital copier 70 creates a character string in a character string format indicated by the supplement (supplement) of the requirement (requirement) (L2175), and embeds the character string as the digital watermark to scanned data (L2176). Then, the digital copier 70 goes back to L2124 and repeats the above processes for a next requirement (requirement). On the other hand, when the digital watermark is not indicated, the digital copier 70 advances to L2124.

After the above process is conducted for all requirement (requirement), the digital copier 70 conducts a process corresponding to the access by the client terminal 51 (L2179) and terminates the requirement process (L2180).

As described above, the digital copier 70 can conduct the access control in accordance with the security policy set in the security server 200. In this case, it is possible to apply the allowable requirement regulated by the security policy. Moreover, it is possible to process for the supplement information necessary to satisfy the allowable requirement, and apply the process for the alternative requirement.

Since the recognition of the paper document 62 is not perfect at 100 percent, a recognition error may be occurred. When the digital copier 70 cannot recognize the paper document 62 when copying the paper document 62, basically the paper document 62 is required to be copied as a regular paper document. For this reason, it is required to conduct some kind of security protection in a case in that the paper document 62 cannot be recognized. Accordingly, in this embodiment, the paper document 62, which is not recognized (categorized into "UNKNOWN" of the document category), can be processed in accordance with the security policy.

[Access Control by Document Viewer]

An access control conducted by the document viewer 53 will be described with FIG. 29, FIG. 30, and FIG. 31.

FIG. 29 is a diagram showing an access control sequence in the document viewer according to the embodiment of the present invention. FIG. 30 and FIG. 31 are flowcharts for explaining the access control process by the document viewer according to the embodiment of the present invention. In FIG. 29, FIG. 30, and FIG. 31, each process in the access control sequence shown in FIG. 29 corresponds by the same numeral number to each process shown in FIG. 30 and FIG. 31.

Figure 30:
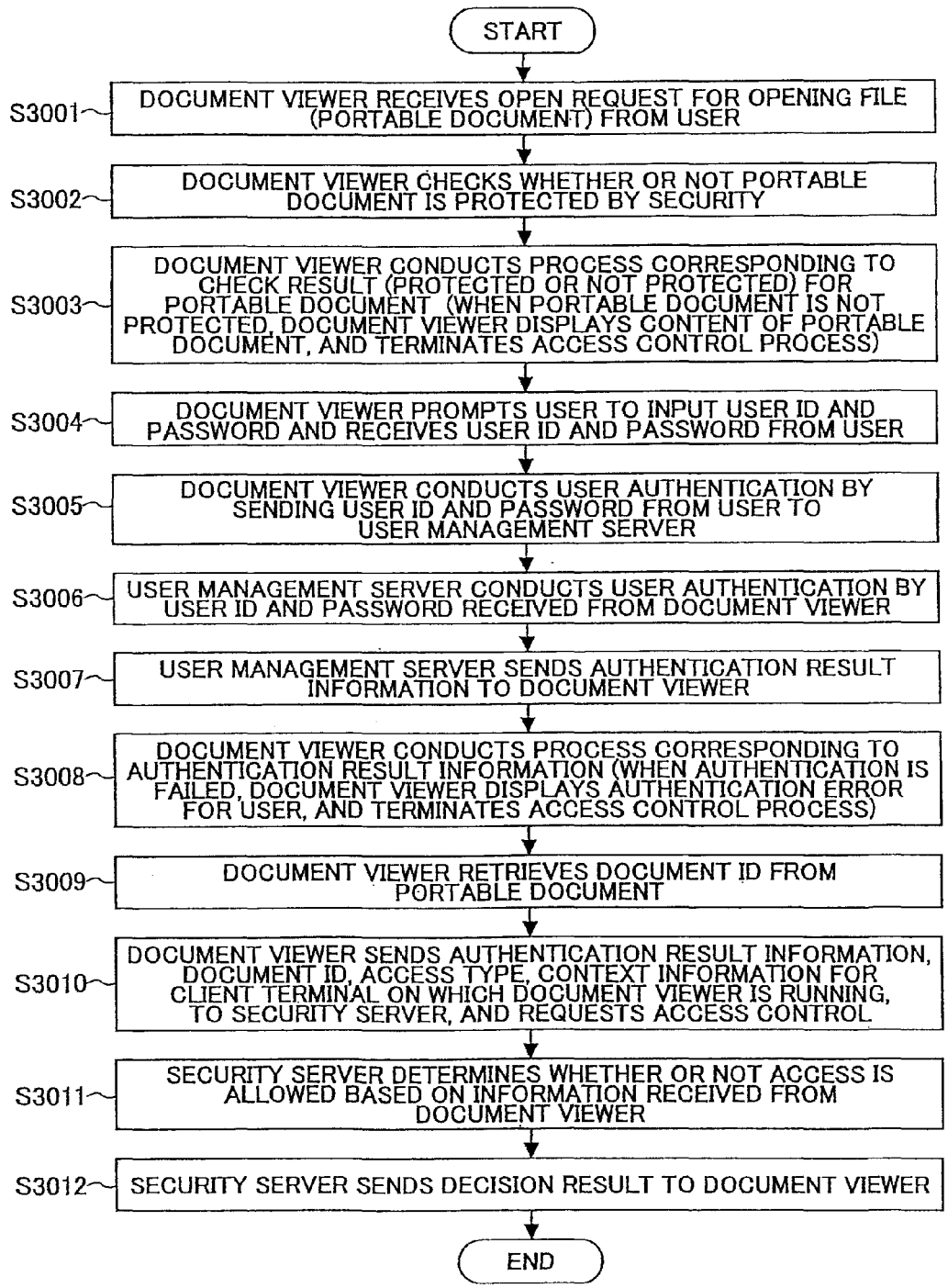
FIG. 30 is a flowchart for explaining the access control process by the document viewer according to the embodiment of the present invention.
Figure 31:
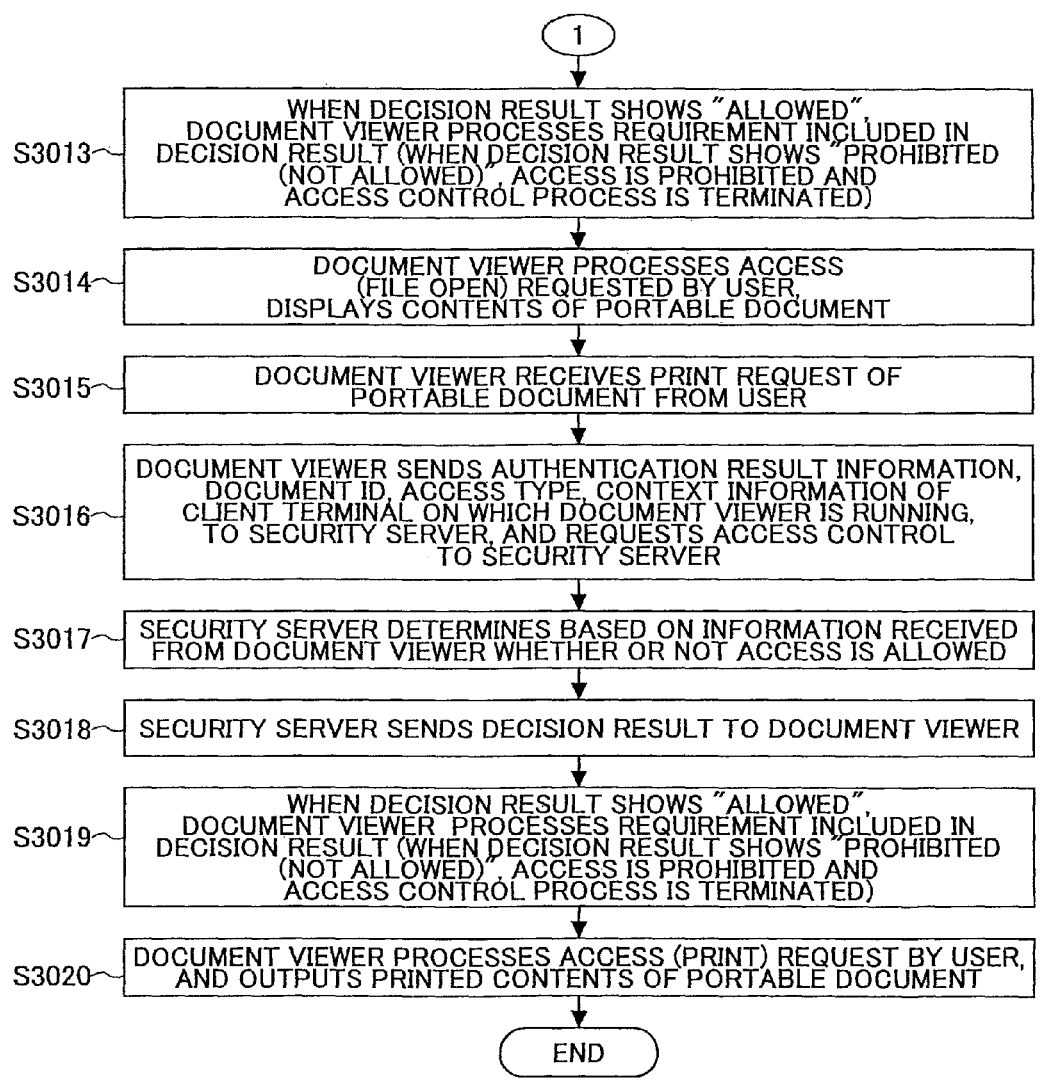
FIG. 31 is a flowchart for explaining the access control process by the document viewer according to the embodiment of the present invention.

In FIG. 29 and FIG. 30, the document viewer 53 receives an open request for opening a file (portable document 63) from the user 52 (S3001).

The document viewer 53 checks whether or not the portable document 63 is protected by a security (S3002). The document viewer 53 conducts a process corresponding to a check result in S3002 (protected or not protected) for the portable document 63 (S3003). When the portable document 63 is not protected, the document viewer 53 displays a content of the portable document 63, and terminates the access control process. On the other hand, when the portable document 63 is protected, the document viewer 53 advances to S3004.

The document viewer 53 prompts the user 52 to input the user ID and the password and receives the user ID and the password from the user 52 (S3004).

The document viewer 53 conducts a user authentication by sending the user ID and the password from the user 52 to the user management server 300 (S3005).

The user management server 300 conducts the user authentication by the user ID and the password received from the document viewer 53 (S3006), and sends authentication result information to the document viewer 53 (S3007).

When the document viewer 53 receives the authentication result information from the user management server 300, the document viewer 53 conducts a process corresponding to the authentication result information (S2008). When the authentication is failed, the document viewer 53 displays an authentication error for the user 52, and terminates the access control process. When the authentication is succeeded, the document viewer 53 advances to S3009.

The document viewer 53 retrieves the document ID from the portable document 63 (S3009). Then, the document viewer 53 sends the authentication result information, the document ID, an access type, context information for the client terminal 51 on which the document viewer 53 is running, to the security server 200, and requests the access control (S3010). For example, a read access is indicated as the access type for the open request.

The security server 200 determines whether or not the access is allowed based on information received from the document viewer 53 (S3011). The security server 200 sends a decision result to the document viewer 53 (S3012).

When the decision result shows "allowed", the document viewer 53 processes a requirement included in the decision result (S3013). When the decision result shows "prohibited (not allowed)", the document viewer 53 denies the access and terminates the access control process.

The document viewer 53 processes the access (file open) requested by the user 52, displays the contents of the portable document 63 (S3014).

The document viewer 53 receives a print request of the portable document 63 from the user 52 (S3015).

The document viewer 53 sends the authentication result information, the document ID, the access type, the context information of the client terminal 51 on which the document viewer 53 is running, to the security server 200, and requests the access control to the security server 200 (S3016). For example, a print access corresponding to the print request is indicated as the access type.

The security server 200 determines based on information received from the document viewer 53 whether or not the access is allowed (S3017), and sends a decision result to the document viewer 53 (S3018).

When the decision result shows "allowed", the document viewer 53 processes a requirement included in the decision result (S3019). When the decision result shows "prohibited (not allowed)", the document viewer 53 denies the access, and terminates the access control process.

The document viewer 53 processes the access (print) request by the user 52, and outputs printed contents of the portable document 63 (S3020).

The user authentication in S3005 may be requested through the security server 200. A method for authenticating the user 52 is not limited to a method for authenticating by the user ID and the password. Alternatively, a higher technical authentication such as a biometric authentication, a challenge-response authentication using a master card, or a like can be applied.

An authenticating process conducted by the user management server 300 in S3006 is the same as the authenticating process in the access control conducted by the document management system 100, and explanation thereof will be omitted. In addition, a data structure of the authentication information in the access control conducted by the document management system 100, and explanation thereof will be omitted.

An decision process conducted by the security server 200 in S3001 and S3017 is the same as the decision process in the access control conducted by the document management system 100. In addition, a data structure of the decision result information is the same as the data structure of the decision result information in the access control conducted by the document management system 100, and explanation thereof will be omitted.

A compensating process for the requirement conducted by the document viewer 53 is the same as the compensating process for the requirement conducted by the document management system 100, and explanation thereof will be omitted.

Next, a requirement process conducted by the document viewer 53 will be described with reference to FIG. 32 through FIG. 36. FIG. 32, FIG. 33, FIG. 34, FIG. 35, and FIG. 36 are flowcharts for explaining the requirement process conducted the document viewer according to the embodiment of the present invention.

In FIG. 32, the document viewer 53 checks whether or not the "allowed" item of the decision result information shows "false" (L3121). When the "allowed" item shows "false", the document viewer 53 denies the access and terminates the requirement process (L3122).

On the other hand, when the "allowed" item does not show "false", the document viewer 53 repeats L3125 through L3124 for each requirement indicated in the decision result information (decisionInfo) (L3124).

The document viewer 53 checks whether or not a requirement, which is not supported by the document viewer 53 (hereinafter, called not-supported requirement), is indicated (L3125). When the not-supported requirement is not indicated, the document viewer 53 advances to L3131.

On the other hand, when the not-supported requirement is indicated, the document viewer 53 further checks whether or not an alternative requirement, which is not supported by the document viewer 53 (hereinafter, called not-supported alternative requirement), is indicated (L3126). When the not-supported alternative requirement is indicated, the document viewer 53 denies the access and terminates the requirement process (L3127).

On the other hand, the not-supported alternative requirement is not indicated, the document viewer 53 processes the alternative requirement (alternative) for the requirement (requirement) (L3128)

Subsequently, the document viewer 53 checks whether or not a log record (record_audit_data) is indicated in the requirement (requirement) (L3131). When the log record (record_audit_data), the document viewer 53 generates log data including the user ID (userId), the document ID (docid), the operation (operation), date and time, and the context information (contextInfo) (L3132).

Then, the document viewer 53 sends the log data to the security server 200 (L3133). The document viewer 53 determines whether or not the log data is successfully sent to the security server 200 (L3134). When the log data is failed to send, the document viewer 53 denies the access and terminates the requirement process (L3136). On the other hand, when the log data is successfully sent, the document viewer 53 advances to L3136.

Furthermore, the document viewer 53 checks whether or not the requirement indicates to allow the multiple authentication for the access to the digital document (L3138). When the multiple authentication is indicated to allow, the document viewer 53 requires the user 52 of a strict user authentication (such as the finger print recognition or the like) (l3139). The document viewer 53 further determines whether or not the strict user authentication is failed (L3140). When the strict user authentication is failed, the document viewer 53 denies the access and terminates the requirement process (L3141). On the other hand, when the authentication is not indicated or when the string user authentication is succeeded, the document viewer 53 advances to L3144.

Subsequently, the document viewer 53 checks whether or not the alarm display (show_alarm) is indicated (L3144). When the alarm display is indicated, the document viewer 53 creates an alarm character string in a character string indicated in the supplement information (supplement) of the requirement (requirement) (L3145), and displays the alarm character string (L3146). On the other hand, when the alarm display is not indicated, the document viewer 53 advances to L3148.

Moreover, the document viewer 53 checks whether or not a private print mode (private_access) is indicated (L3148). When the private print mode is indicated, the document viewer 53 advances to L3160.

On the other hand, the document viewer 53 determines whether or not a printer to print out supports the private print mode (L3149). When the private print mode is not supported, the document viewer 53 processes the alternative requirement (alternative) of the requirement (requirement) (L3150). Then, the document viewer 53 determines whether or not the alternative requirement is processed (L3151). When the alternative requirement cannot be processed, the document viewer 53 denies the access and terminates the requirement process (L3152). On the other hand, when the alternative requirement can be processed, the document viewer 53 advances to L3160.

On the other hand, when the private print mode is supported (L3155), the document viewer 53 displays a dialog for the user 52 to input the password (L3156), sets the password input by the user 52 to a printer driver in order to set the private print mode (L3157). After that, the document viewer 53 advances to L3160.

Subsequently, the document viewer 53 checks whether or not the image log record (record_image_data) is indicated (L3160). When the image log record is indicated, the document viewer 53 further determines whether or not the printer to print out supports the image log record (L3161). When the printer does not support the image log record, the document viewer 53 processes the alternative requirement (alternative) of the requirement (requirement) (L3162). Then, the document viewer 53 determines whether or not the alternative requirement cannot be processed (L3163). when the alternative requirement cannot be processed, the access is denied and the requirement process is terminated (L3164). On the other hand, when the alternative requirement (alternative) can be processed, the document viewer 53 advances to L3173.

On the other hand, when the image log record is supported (L3167), the document viewer 53 generates log data including the user ID (userid), the document ID (docid), the operation (operation), the date and time, and the context information (contextInfo) (L3168). The document viewer 53 sets an image log bibliographic item to the printer driver (L3169), and sets an image log record mode to the printer driver (L3170). Then, the document viewer 53 advances to L3173.

Moreover, the document viewer 53 checks whether or not the requirement indicates to embed trace information (embed_trace_info) (L3173). When the requirement does not indicate to embed the trace information, the document viewer 53 advances to L3187.

When the requirement indicates to embed the trace information, the document viewer 53 further determines whether or not a driver of the printer to print out supports a stamp print (L3174). When the driver of the printer supports the stamp print, the document viewer 53 sets a barcode image indicated by the supplement information of the requirement to the printer driver to set a stamp print mode (L3176). Then, the document viewer 53 advances to L3187.

On the other hand, when the driver of the printer to print out does not support the stamp print, the document viewer 53 further determines whether or not the document viewer 53 supports a document edit (L3177). When the document edit is supported, the document viewer 53 embeds the barcode indicated by the supplement information (supplement) of the requirement (requirement) to each page to be printed by editing the portable document 53 (L3178). On the other hand, when the document edit is supported (L3180), the document viewer 53 processes the alternative requirement (alternative) of the requirement (requirement) (L3181). The document viewer 53 determines whether or not the alternative requirement cannot be processed (L3182). When the alternative requirement cannot be processed, the document viewer 53 denies the access, and terminates the requirement process (L3183). When the alternative requirement can be processed, the document viewer 53 advances to L3187.

Subsequently, the document viewer 53 checks whether or not the requirement indicates to print a label as a stamp (show_label) (L3187). When the requirement does not indicate to print a label as a stamp, the document viewer 53 advances to L3201. When the requirement indicates to print a label as a stamp, the document viewer 53 further checks whether or not the driver of the printer to print out supports the stamp print (L3188). When the stamp print is supported, the document viewer 53 sets the stamp image indicated by the supplement requirement (supplement) of the requirement (requirement) to the printer driver to set the stamp print mode (an embedding location is indicated by "embedding location"

item in the supplement information (supplement) of the requirement (requirement)) (L3189). After that, the document viewer 53 advances to L3201.

On the other hand, when the stamp print is not supported the document viewer 53 determines whether or not the document viewer 53 supports the document edit (L3191). When the document edit is supported, the document viewer 53 sets the stamp image indicated by the supplement requirement (supplement) of the requirement (requirement) to the printer driver to set the stamp print mode (an embedding location is indicated by "embedding location" item in the supplement information (supplement) of the requirement (requirement)) (L3192).

On the other hand, when the document edit is supported, the document viewer 53 processes the alternative requirement (alternative) of the requirement (requirement) (L3195). Then, the document viewer 53 determines whether or not the alternative requirement cannot be processed (L3196). When the alternative requirement cannot be processed, the document viewer 53 denies the access and terminates the requirement process (L3197). On the other hand, the document viewer 53 advances to L3201.

Furthermore, the document viewer 53 checks whether or not the visible watermark letter print (visible_watermark) is indicated (L3201). When the visible watermark letter print is not indicated, the document viewer 53 advances to L3216.

On the other hand, when the visible watermark letter print is indicated, the document viewer 53 creates a background character string in a character string indicated by the supplement requirement (supplement) of the requirement (requirement) (L3202). Then, the document viewer 53 further determines whether or not the driver of the printer to print out supports a combination print (L3203). When the combination print is supported, the document viewer 53 sets the background character string as the combination character string to the printer driver (L3204). After that, the document viewer 53 advances to L3216.

On the other hand, when the driver of the printer to print out does not support the combination print, the document viewer 53 determines whether or not the documents viewer 53 supports the document edit (L3206). When the document edit is supported, the document viewer 53 embeds the background character string to a background of the portable document 63 by editing the portable document 63 (L3207).

On the other hand, when the document edit is not supported, the document viewer 53 processes the alternative requirement (alternative) of the requirement (requirement) (L3210). Then, the document viewer 53 further determines whether or not the alternative requirement (alternative) cannot be processed (L3211). When the alternative requirement (alternative) cannot be processed, the document viewer 53 denies the access and terminates the requirement process (L3212). On the other hand, when the alternative requirement can be processed, the document viewer 53 advances to L3216.

Subsequently, the document viewer 53 determines whether or not the requirement indicates to print an embossed watermark letter (anti_copy_watermark) (L3216). When the requirement does not indicate to print the embossed watermark letter, the document viewer 53 advances to L3232.

On the other hand, when the requirement indicates to print the embossed watermark letter, the document viewer 53 creates a pattern character string in a character string format indicated by the supplement information (supplement) of the requirement (requirement) (L3217). The document viewer 53 further determines whether or not the driver of the printer to print out supports a pattern print (L3218). When the pattern print is indicated, the document viewer 53 sets the pattern character string to the printer driver (L3219). After that, the document viewer 53 advances to L3232.

On the other hand, when the pattern print is not supported, the document viewer 53 determines whether or not the document viewer 53 supports the document edit (L3221). When the document edit is supported, the document viewer 53 generates a pattern image based on the pattern character string (L3222), and embeds the pattern image to the background of the portable document 63 by editing the portable document 63 (L3223).

On the other hand, when the document edit is not supported (L3225), the document viewer 53 processes the alternative requirement (alternative) of the requirement (requirement) (L3226). Then, the document viewer 53 determines whether or not the alternative requirement cannot be processed (L3227). When the alternative requirement cannot be processed, the document viewer 53 denies the access and terminates the requirement process (l3228). On the other hand, when the alternative requirement can be processed, the document viewer 53 advances to L323.

Moreover, the documents viewer 53 determines whether or not the requirement indicates to print an identification pattern (identifiable_bg_pattern) (L3232). When the requirement does not indicate to print an identification pattern, the document viewer 53 advances to L3247.

When the requirement indicates to print an identification pattern, the document viewer 53 creates the pattern character string by an identification pattern image indicated by the supplement information (supplement) of the requirement (requirement) (L3233). Then, the document viewer 53 further determines whether or not the driver of the printer to print out supports to repeat the stamp print (L3234). When the driver of the printer supports to repeat the stamp print, the document viewer 53 sets the identification pattern image indicated by the supplement information (supplement) of the requirement (requirement) to the printer driver to set a repeating stamp print mode (L3235). After that, the document viewer 53 advances to L3247.

On the other hand, when the driver of the printer does not support to repeat the stamp print, the document viewer 53 further determines whether or not the document viewer 53 supports the document edit (L3237). When the document edit is supported, the document viewer 53 repeatedly embeds the identification pattern image indicated by the supplement information (supplement) of the requirement (requirement) to the background of the portable document 63 by editing the portable document 63 (L3238). After that, the document viewer 53 advances to L3247.

On the other hand, when the document edit is not supported (L3240), the document viewer 53 processes the alternative requirement (alternative) of the requirement (requirement) (L3241). Then, the document viewer 53 determines whether or not the alternative requirement cannot be processed (L3242). When the alternative requirement cannot be processed, the document viewer 53 denies the access and terminates the requirement process (L3243). On the other hand, when the alternative requirement can be processed, the document viewer 53 advances to L3247.

Subsequently, the document viewer 53 determines whether or not the alarm print is indicated (L3247). When the alarm print is not indicated, the document viewer 53 goes back to L3124.

On the other hand, when the alarm print is indicated, the document viewer 53 creates an alarm character string in a character string format indicated by the supplement information (supplement) of the requirement (requirement) (L3248).

Then, the document viewer 53 further whether or not the driver of the printer to print out supports a header/footer print (L3249). When the header/footer print is supported, the document viewer 53 sets the alarm character string as a header/footer to the printer driver (L3250).

On the other hand, when the header/footer print is not supported, the document viewer 53 further determines whether or not the document viewer 53 supports the document edit (L3252). When the document edit is supported, the document viewer 53 embeds the alarm character string at the header/footer of the portable document 63 (L3253).

On the other hand, when the document edit is supported (L3255), the document viewer 53 processes the alternative requirement (alternative) of the requirement (requirement) (L3256). Then, the document viewer 53 further determines whether or not the alternative requirement cannot be processed (L3257). When the alternative requirement cannot be processed, the document viewer 53 denies and terminates the requirement process (L3258).

On the other hand, when the alternative requirement can be processed, the document viewer 53 goes back to L2124 to repeat the above same process for a next requirement (requirement).

After the above process is conducted for all requirements (requirement), the document viewer 53 conducts an access process requested by the user 62 (L3263), and terminates the requirement process (L3264).

As described above, the document viewer 53 can conduct the access control in accordance with the security policy set in the security server 200. In this case, it is possible to apply the allowable requirement regulated in the security policy. In addition, since the process for the supplement information necessary to satisfy the allowable requirement and the process for the alternative requirement can be conducted, it is possible to realize a flexible process in accordance with the organizational security policy.

As described above, even if the requirement can not be realized, in the requirement process that determines whether or not the documents viewer 53 supports the document edit, it is possible to temporarily edit the contents of the portable document 63, embed necessary information in the portable document 63, and then conduct a process requested by the user 52.

It is required to encrypt the portable document 63 so that the portable document 63 can be opened only by using the document viewer 53 that realize the access control as described above.

A key for using an encryption/decryption may be included in a special document viewer that can realize the above access control. Only if it confirms that the document viewer 53 is a special document viewer capable of enforcing the access control, the security server 200 allows transmitting a decryption key to the document viewer 53.

Accordingly, it is possible to protect the portable document 63 from being opened by a regular document viewer that cannot realize the access control.

As described above, screen examples for displaying the document viewer 53 at the client terminal 51 will be described with reference to FIG. 37A through FIG. 41C. The user 52 can know by screens described in the following which requirements will be processed.

Figure 37A:
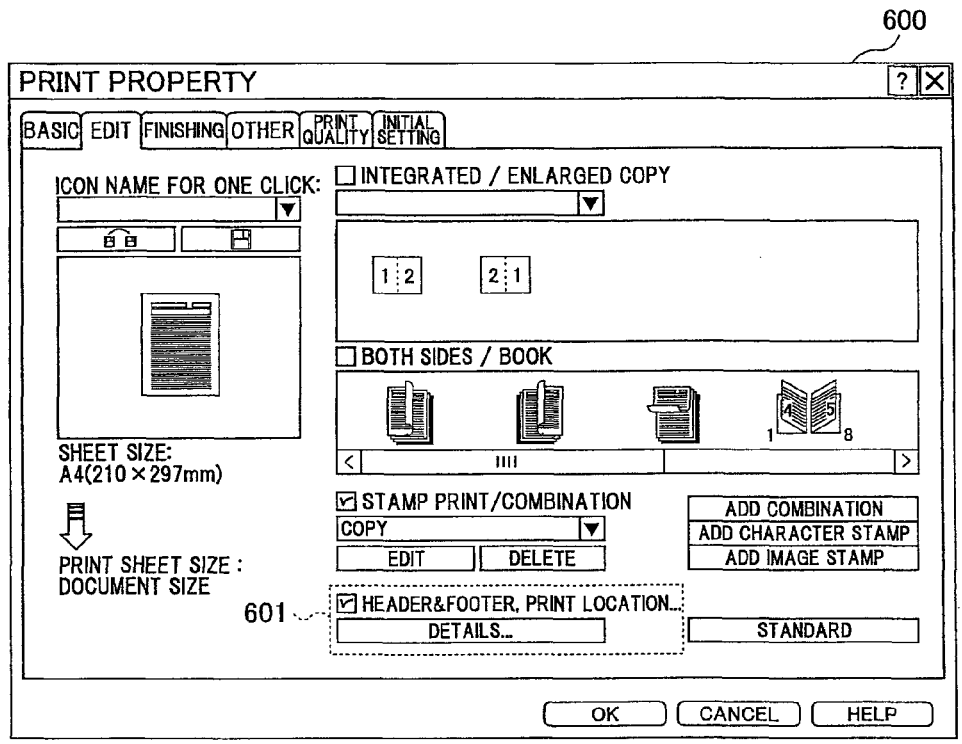
FIG. 37A is a diagram showing a screen example for displaying settings for an alarm print according to the embodiment of the present invention.
Figure 37B:
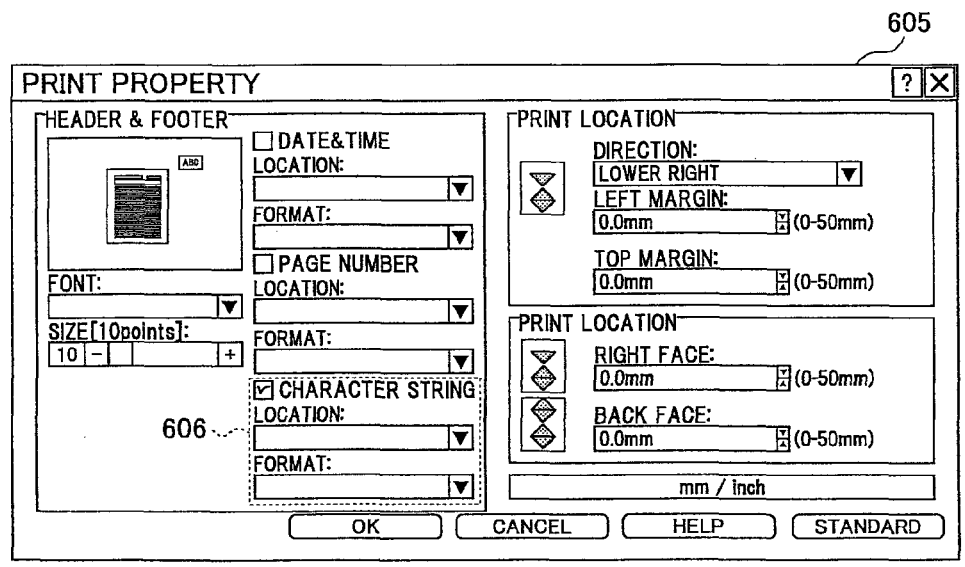
FIG. 37B is a diagram showing a screen example for displaying detail settings for the alarm print according to the embodiment of the present invention.

Screen examples in a case in that the alarm print is indicated as the requirement will be described with reference to FIG. 37A and FIG. 37B. FIG. 37A is a diagram showing a screen example for displaying settings for the alarm print according to the embodiment of the present invention. FIG. 37B is a diagram showing a screen example for displaying detail settings for the alarm print according to the embodiment of the present invention.

In FIG. 37A, a screen 600 is a screen showing a state in that the alarm print is indicated as the requirement. In the screen 600, a setting area 601 is originally used as an area for a setting to print at a header or footer. In a case in that the alarm print is processed as the requirement to conduct the print request, the header/footer print is compulsory set and displayed in gray to prohibit the user 52 from changing the setting, by the requirement process conducted by the document viewer 53.

When the user 52 clicks a detail button in the setting area 601, a screen 605 as shown in FIG. 37B is displayed at the client terminal 51.

In FIG. 37B, the screen 605 is a screen for setting details in a case in that the alarm print is indicated as the requirement, In the screen 605, the setting are 606 is originally used for user 52 to set an arrangement location and a format of a character string to print at the header or the footer. In a case in that the alarm print is processed as the requirement to conduct the print request, the header/footer print is compulsory set and displayed in gray to prohibit the user 52 from changing the setting, by the requirement process conducted by the document viewer 53.

Accordingly, the user 52 is prohibited from changing the setting but can confirm that the alarm print is the requirement before printing the portable document 63. By this confirmation, the user 52 determines to actually execute to print the portable document 63 or cancel to the print request.

Figure 38A:
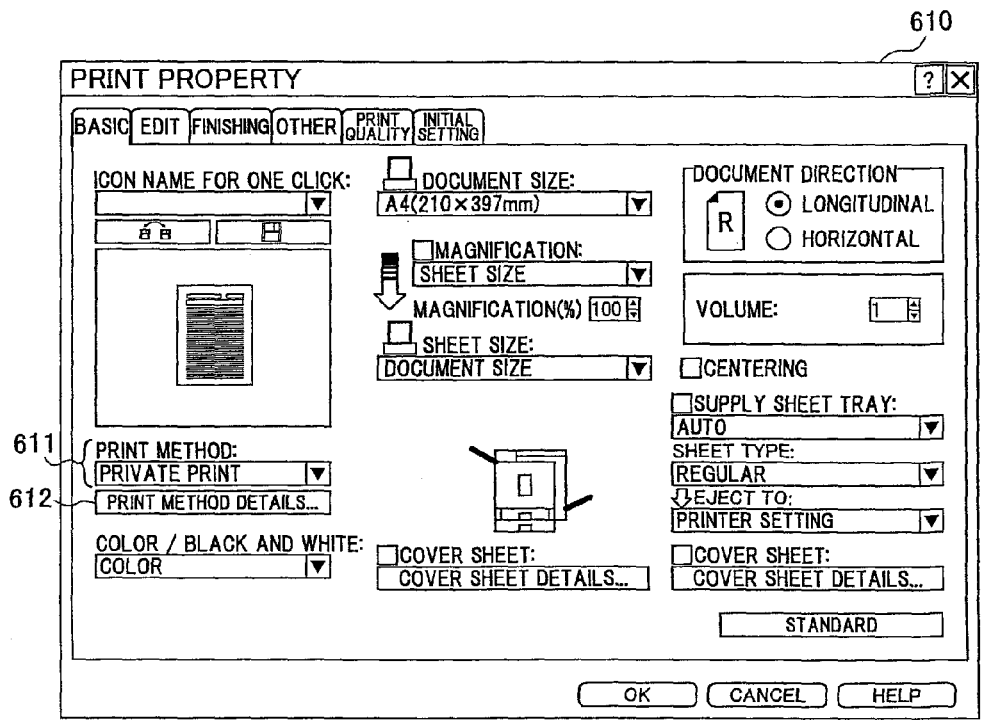
FIG. 38A is a diagram showing a screen example in that the private print is set according to the embodiment of the present invention.
Figure 38B:
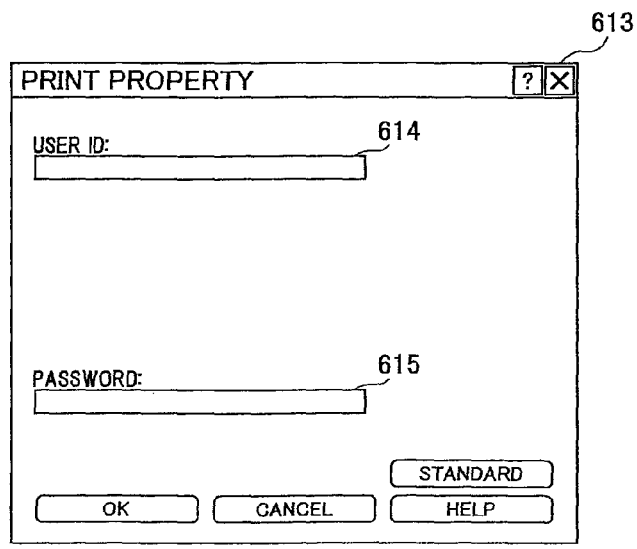
FIG. 38B is a diagram showing a screen example for setting the authentication information for the private print according to the embodiment of the present invention.

Screen examples in a case in that the private print is indicated as the requirement will be described with reference to FIG. 38A and FIG. 38B. FIG. 38A is a diagram showing a screen example in that the private print is set according to the embodiment of the present invention. FIG. 38B is a diagram showing a screen example for setting the authentication information for the private print according to the embodiment of the present invention.

In FIG. 38A, a screen 610 is a screen displayed when the private print is indicated as the requirement. In the screen 610, a selecting area 611 for selecting a print method is originally user for the user 62 to select one or more items. In a case in that the private print is processed as the requirement to execute the print request of the user 52, the requirement process conducted by the document viewer 53 compulsory selects the private print, display in gray, and also controls the selection not to change by the user 52.

Accordingly, the setting can be controlled so that the setting cannot be changed by the user 52. When the user 52 clicks a detail button in the setting area 611, a screen 613 is displayed as shown in FIG. 38B.

In FIG. 38B, the screen 613 is a screen for detail settings in the case in that the private print is indicated as the requirement. In the screen 613, input areas 614 and 615 are originally used for the user 52 to set the authentication information. The input area 614 is an area for the user 52 to input the user ID, and the input area 615 is an area for the user 52 to input the password. The user 52 can output a document being printed from the portable document 63 from the digital copier 70 by inputting, at the digital copier 70, the user ID and the password input at the screen 613.

The user 52 can know that the document is printed from the portable document 63 by the private print.

Figure 39:
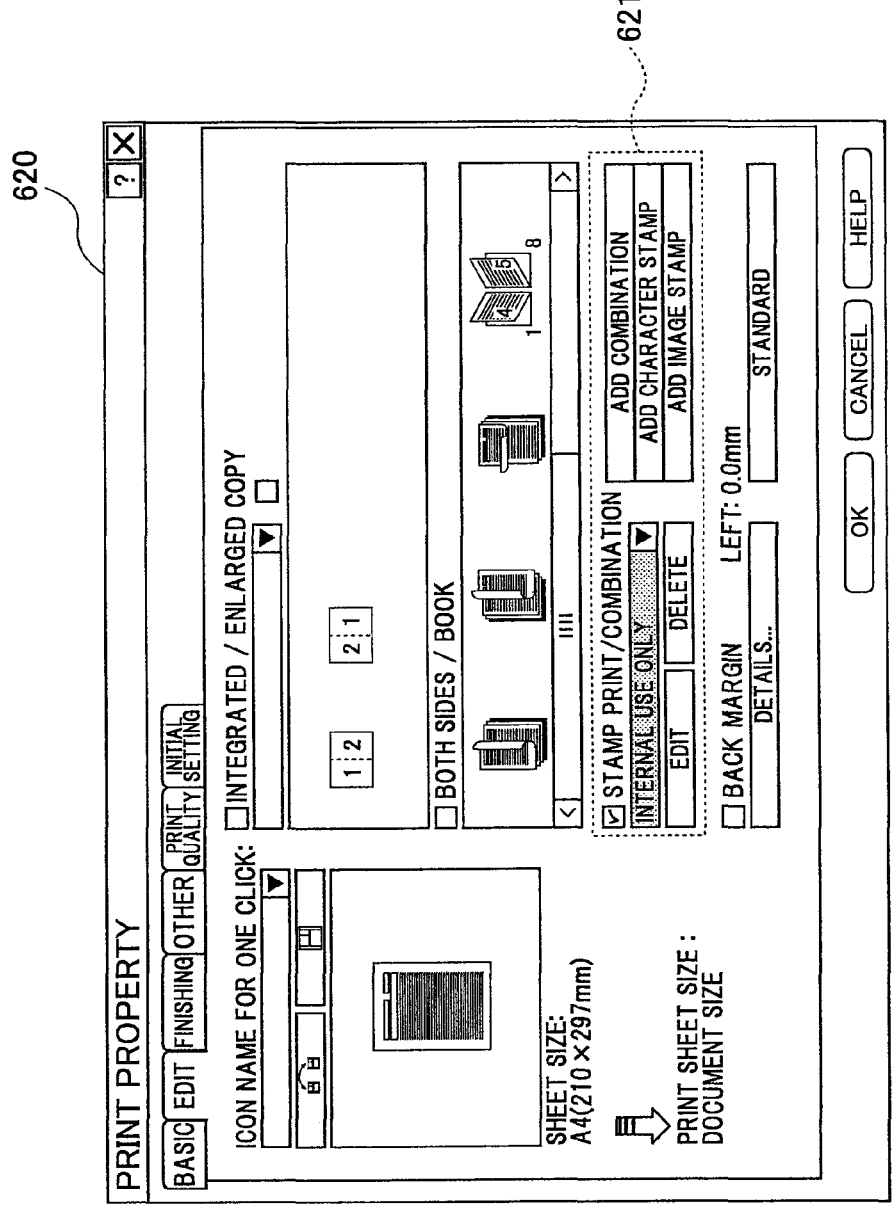
FIG. 39 is a diagram showing a screen example in a case in that a label is indicated to print as a stamp as the requirement according to the embodiment of the present invention.

FIG. 39 is a diagram showing a screen example in a case in that a label is indicated to print as a stamp as the requirement according to the embodiment of the present invention. In FIG. 39, a screen 620 is displayed when the label is indicated to print as the stamp as the requirement. In the screen 620, a setting area 621 is originally used for the user 52 to set the stamp. In case in that the label is printed as the stamp as the requirement to execute the print request of the user 62, the requirement process conducted by the document viewer 53 compulsory sets a stamp print, display in gray, and also controls the setting not to change by the user 52.

Accordingly, the user 52 is prohibited from changing the setting but can confirm that the stamp print is the requirement before the portable document 63 is printed out. By this confirmation, the user 52 can determines to actually print the portable document 63 or to cancel the print request.

Figure 40:
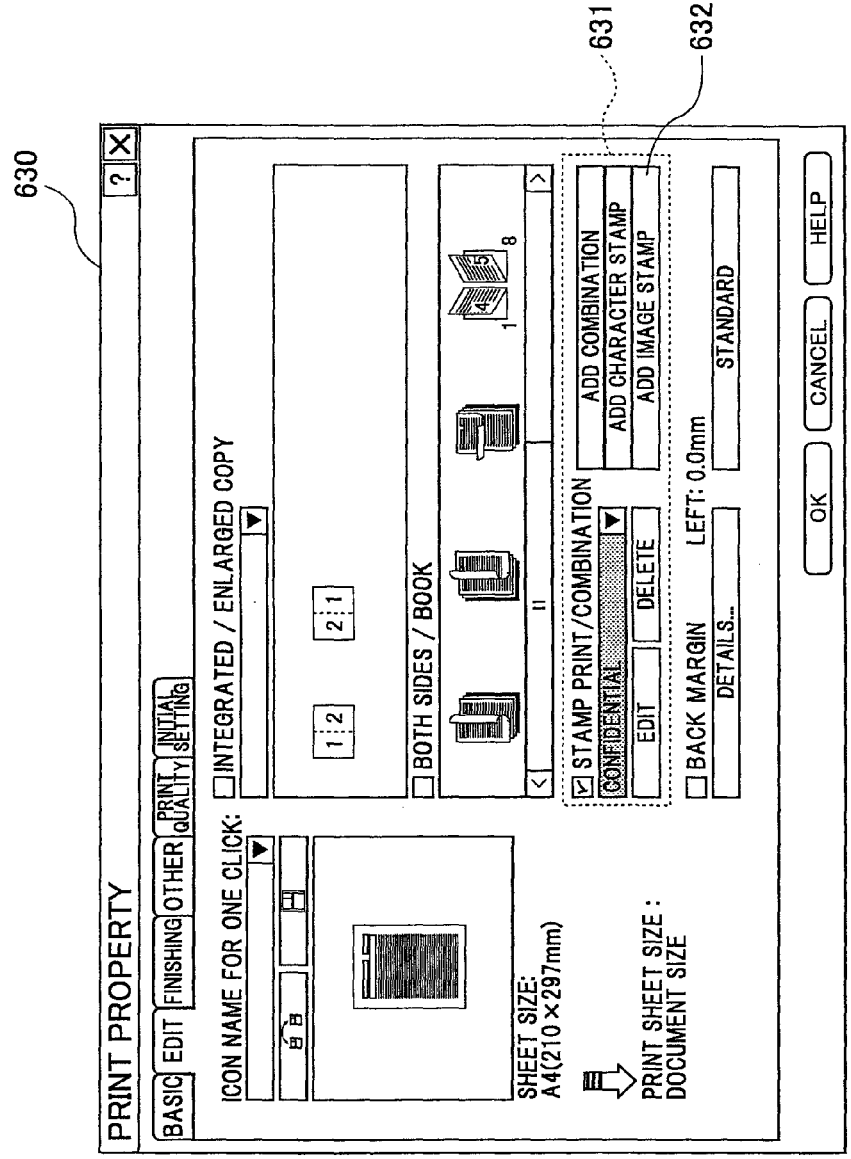
FIG. 40 is a diagram showing a screen example in a case in that the visible watermark letter print is indicated as the requirement according to the embodiment of the present invention.

FIG. 40 is a diagram showing a screen example in a case in that the visible watermark letter print is indicated as the requirement according to the embodiment of the present invention. In FIG. 40, a screen 630 is displayed when the visible watermark letter print is indicated as the requirement. In the screen 630, a setting area 631 is originally use for the user 52 to set the visible watermark letter print. In a case in that the visible watermark letter print is processed as requirement to execute the print request of the user 52, the requirement process conducted by the document viewer 53 compulsory sets the visible watermark letter print, display in gray, and also controls the setting not to change by the user 52.

Accordingly, the user 52 is prohibited from changing the setting but can confirm the visible watermark letter print is the requirement before the portable document 63 is printed out. By this confirmation, the user can determine to actually print out the portable document 63 or to cancel the print request.

Figure 41A:
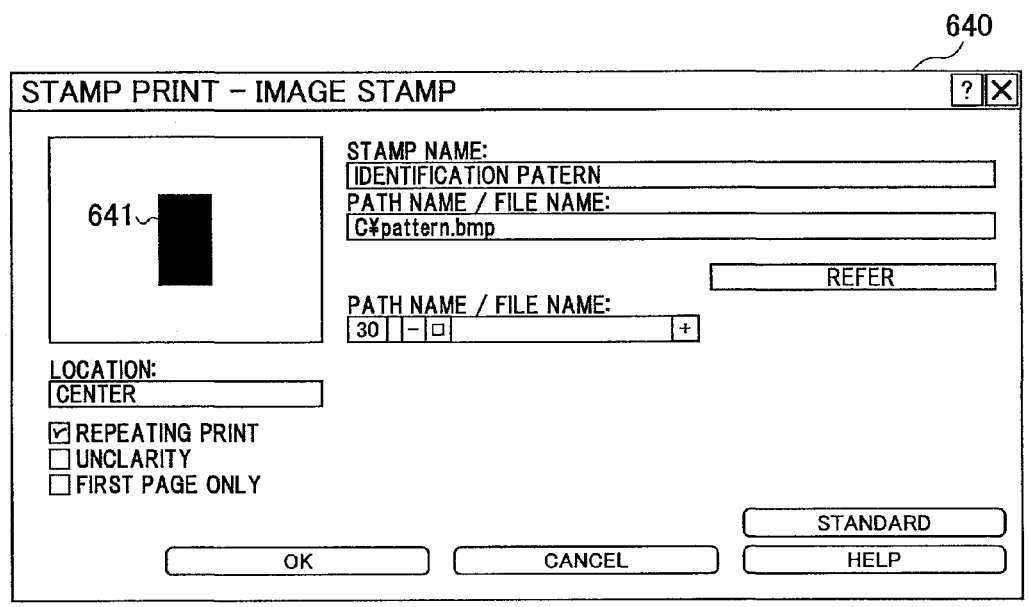
FIG. 41A is a diagram showing a screen example showing details in the case in an identification pattern print is indicated as the requirement.

When the user 52 clicks a button 632 showing "ADD IMAGE STAMP" in the setting area 631 of the screen 630 displayed at the client terminal 51, a screen is displayed as shown in FIG. 41A.

A screen example in a case in that the identification pattern print is indicated as the requirement will be described with reference to FIG. 41A. FIG. 41A is a diagram showing a screen example showing details in the case in the identification pattern print is indicated as the requirement.

In FIG. 41A, an image is displayed in a displaying area 641 of a screen 640 when the identification pattern print is indicated. The user 62 is prohibited from changing the setting at the screen 640 but can confirm that the identification print is indicated as the requirement before printing out the portable document 63. By this confirmation, the user 52 can determine to actually print out the portable document 63 or to cancel the print request.

Figure 41B:
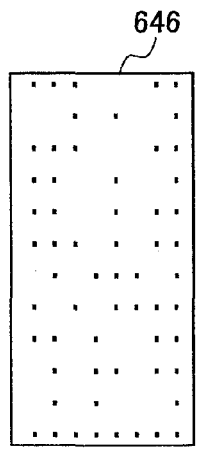
FIG. 41B is a diagram showing an example of magnifying the identification pattern according to the embodiment of the present invention.

For example, the identification pattern is printed by dots as shown in FIG. 41B. FIG. 41B is a diagram showing an example of magnifying the identification pattern according to the embodiment of the present invention. In FIG. 41B, for example, an identification pattern 646 may be drawn by identification image data 12 dots high, 8 dots wide, and 3 dots interval (that is, an image size is 48×32 pixels).

In order to identify a right, left, top, and bottom sides, for example, the entire of one right column and one bottom row may be dotted and code of 77 bits may be encoded at other 11×7=77 dots. The code can be realized by a simple rule such that a dot is printed when a bit value is "1" and a dot is not printed when the bit value is "0".

Figure 41C:
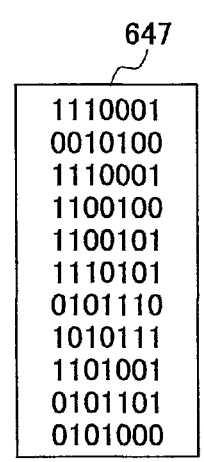
FIG. 41C is a diagram showing an encoding example of the identification pattern shown in FIG. 41B according to the embodiment of the present invention.

FIG. 41C is a diagram showing an encoding example of the identification pattern shown in FIG. 41B according to the embodiment of the present invention. In FIG. 41C, the identification pattern 646 shown in FIG. 41B can be encoded into a bit pattern 647 by using the above-described simple rule. Error correcting code may be printed since an identification error may occur when the dot pattern is disordered.

For example, in a case in that the user 52 uses a function serving as a printer at the digital copier 70 and prints out the portable document 63 from the document viewer 53, a sequence of the requirement process in S3019 in FIG. 29, which is conducted when the private print mode is indicated as the requirement, will be described in detail with reference to FIG. 42. FIG. 42 is a diagram showing a requirement process sequence in the private print mode according to the embodiment of the present invention.

In FIG. 42, when the user 52 conducts the print request for the portable document 63 displayed by the document viewer 53, the document viewer 53 requires the user 52 to input the password (S4001). When the user 52 inputs the password (S4002), the document viewer 53 sets the private print mode and the password to a printer driver 54 being installed into the client terminal 51 (S4003). Then, the document viewer 53 sends a print instruction to the printer driver 64 (S4004).

The printer driver 54 generates a PDL (Page Description Language) in response to the print instruction sent from the document viewer 53 (S4005), and sends information including the PDS (for example, RPCS or postscript), the private print mode, and the password, to the digital copier 70 (S4006). After that, the printer driver 54 sends a print end to the document viewer 53 (S4007).

On the other hand, the digital copier 70 temporarily stores the information including the PDL, the private print mode, and the password in an internal hard disk (S4008), and waits until the user 52 inputs the password.

The user 52 inputs the password to the digital copier 70 to output a document printed from the portable document 63 at the digital copier 70 (S4009).

The digital copier 70 compares the password input by the user 52 with the password received from the printer driver 54, and conducts the print process when both the passwords correspond each other (S4010). When both the passwords do not correspond each other, the digital copier 70 does not conduct the print process. By conducting the print process, the paper document 62 being printed from the portable document 63 is output from the digital copier 70 (S4011).

By this process sequence in the private print mode, it is possible to prevent a user other than the user 52 from seeing the paper document 62 output from the digital copier 70, and also, it is possible to prevent the user from taking along with the user.

Figure 43:
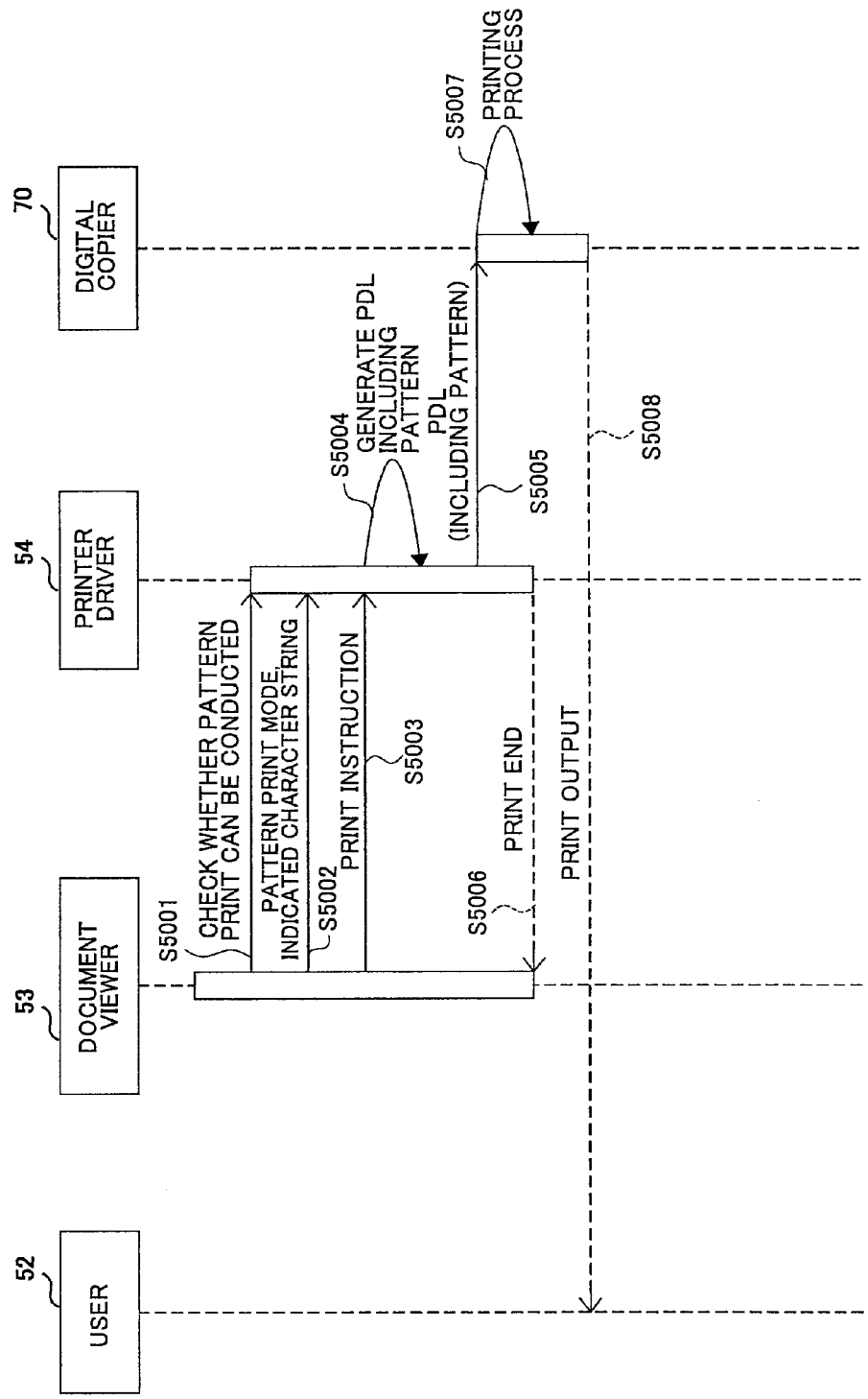
FIG. 43 is a diagram showing the requirement process sequence in the pattern print mode according to the present invention.

Moreover, in the case in that the user 52 uses the function serving as the printer at the digital copier 70 and prints out the portable document 63 from the document viewer 53, a sequence of the requirement process in S3019 in FIG. 29 in a case in that the pattern print mode is indicated as the requirement to print out the portable document 63 will be described in detail with reference to FIG. 43. FIG. 43 is a diagram showing a requirement process sequence in the pattern print mode according to the present invention.

In FIG. 43, the document viewer 53 determines whether or not the printer driver 54 installed into the client terminal 51 of the user 52 supports the pattern print (S5001). After the document viewer 53 confirms that the printer driver 54 supports the pattern print, the document viewer 53 sends information including the pattern print mode and an indicated character string to the printer driver 54 (S5002), and conducts a print instruction (S5003).

When the printer driver 64 receives the pattern print mode and the indicated character string and receives the print instruction from the document viewer 53, the print driver 54 generates a PDL (S5004). Then, the printer driver 54 sends the PDL including a pattern to the digital copier 70 (S5005).

In the following, an abstraction process for corresponding information provided from the application system 400 to the organizational security policy by the security server 200 will be described in detail.

[Abstraction Process by Security Server]

In order to explain the abstraction process conducted by the security server 200, it is assumed that each of tables 250 through 270 manage data as shown in FIG. 44 through FIG. 48.

FIG. 44 is a diagram showing a data example managed by the user security level table according to the embodiment of the present invention. In FIG. 44, the user security level table 250 manages data by a structure UserMap shown in FIG. 5. For example, in "GroupLeaders/Sales/Com" as "principalId", "entryType" is "group", and "levelId" is "manager". Other data are similarly shown.

For example, by describing in XML (extensible Markup Language), the user security level table 250 may manage data by a XML file as shown in FIG. 45. FIG. 45 is a diagram showing the XML file of the user security level table according to the embodiment of the present invention.

In FIG. 45, data managed by the user security level table 250 are described, in accordance with the data structure 251 shown in FIG. 5, by hierarchical data structure in that structure names and element names shown in the data structure 251 are shown by tags. For example, at a lower layer of a <UserMapList> tag data concerning a plurality of users are described by <principalId> tags in parallel. At each of the <UserMap> tags, data corresponding to respective elements are described by a <principalId> tag, a <EntryType> tag, and a <LevelId> tag.

FIG. 46 is a diagram showing a data example managed by the document profile management table according to the embodiment of the present invention. In FIG. 46, data managed by the document profile management table 260 are described, in accordance with the data structure 261 shown in FIG. 6, by a hierarchical data structure in that structure names and element names shown in the data structure 261 are shown by tags. For example, In "0000000001" as "docId", "docCategory" is "development", "docLevel" is "secret", "relatedPersons" is "Members/Dev/Com", "zones" is "ANY", "non-disclosure" is "2005/04/01", "retention" is "2010/04/01", and "validity" is empty. Other data are similarly shown.

As described above, the document profile management table 260 can be a XML file similar to the user security level table 250. However, in the document profile management table 260, since an entry is created for each document 60, the size of the table becomes bigger. Therefore, it is preferable to use a database for the document profile management table 260.

FIG. 47 is a diagram showing a data example managed by the zone management table according to the embodiment of the present invention. In FIG. 47, data managed by the zone management table 270 are described, in accordance with the data structure 271 shown in FIG. 7, by a hierarchical structure in that structure names and element names shown in the data structure 271 are shown by tags. For example, in "id" as "saleszone01", "name" is "sales (Yokohama)", "address" of "addressInfo" is "192.207.138.1", "addressType" of "addressesInfo" is "IP", "netmask" of "addressesInfo" is "255.255.255.0". In addition, since a plurality of "addressInfo" items are managed for one "id", in "saleszone01", "address" of "addressInfo" is "192.207.139.1", "addressType" of "addressesInfo" is "IP", "netmask" of "addressesInfo" is "255.255.255.0". Other data are similarly shown.

For example, the zone management table 270 may manage data in a XML file shown in FIG. 48 by describing in XML. FIG. 48 is a diagram showing a XML file of the zone management table according to the embodiment of the present invention.

In FIG. 48, data of the zone management table 270 are described, in accordance with the data structure 271 shown in FIG. 7, by a hierarchical structure in that structure names and element names shown in the data structure 271 are shown by tags. For example, in a lower layer of a <ZoneInfoTable> tag, data concerning a plurality of zones by a <ZoneInfo> tag in parallel. In a lower layer of each <ZoneInfo> tag, data corresponding to respective elements are described by a <Id> tag, a <Name>, and a <AddressInfo>. The <AddressInfo> tag further includes a lower layer and data corresponding to respective elements are described by a <Address> tag, a <AddressType>, and a <Netmask> tag. The <AddressInfo> tag may have a plurality of the <AddressInfo> tags at a lower layer.

For example, in the policy file 240, the access control rule is described as shown in FIG. 49 and FIG. 50. FIG. 49 and FIG. 50 are diagrams showing the access control rule described in the policy file according to the embodiment of the present invention.

In FIG. 49 and FIG. 50, in the policy file 240, the access control rule is regulated for each document 60 from a description 701 showing a <Policy> tag to a description 702 showing a </Plicy> tag. For example, in the policy file 240, a rule 1 corresponding to a document attribute is shown from a description 703 showing a <Rule> tag from a description 704 showing a </Rule> tag, and other rule 2 and rule 3 corresponding to other document attributes are shown from other <Rule> tags to other </Rule> tags, respectively.

The rule 1 will be described in detail. The rule 2 and rule 3 are described in the same method as the rule 1, and explanation thereof will be omitted.

In the rule 1, a description 705 for <DocCategory>sales</DocCategory> and <DocLevel>topsecret</DocLevel> shows that the access control rule corresponding to the document attribute, in which the document category is "sales (sales department)" and the document level shows "topsecret (top secret)", is regulated. Next, In the document attribute by the description 705, a plurality of the access control rules corresponding to user attributes are regulated by descriptions 710 and 720 from an <Ace> tag to a </Ace> tag.

In the description 710, a description 711 of <UserCategory>RELATED_PERSON</UserCategory>, <UserLevel>manager</UserLevel> and <Zone>RESTRICTED</Zone> describes the access control rule for the user attribute in that the user category is "RELATED_PERSON", the user level is "manager", and the zone is "RESTRICTED". Moreover, in the description 720, a description 721 of <UserCategory>RELATED_PERSON</UserCategory> and <UserLevel>ANY</UserLevel> describes the access control rule for the user attribute in that the user category is "RELATED_PERSON", and the user level is "ANY". The description 721 does not indicate the zone. As described above, the access control rule is described for each of a plurality of user attributes with respect to one document attribute.

In the description 710, descriptions 712 and 713 from an <Operation> tag to a </Operation> tag indicate operations in which the access control rule is applied.

In the description 712, by a description of <id>read</id>, for a document 60 belonging to the document category and the document level indicated by the description 705, the user 52 belonging to the user category, the user level, and the zone indicated by the description 711 is allowed to read the document 60.

In addition, in the description 713, by a description of <id>print</id>, for the document 60 belonging to as described by the description 705, the user 52 belonging to as described by the description 711 is allowed to print out the document 60 in a condition in that requirements described as follows are processed.

In the description 713, three requirements are indicated to print out the document 60. By a description 714 of <Requirement>, <id>private_access</id>, and </Requirement>, "private_access (private print mode)" is indicated as the requirement to print out the document 60.

Moreover, by a description 715 of <Requirement>, <id>print_alarm</id>, and <Supplement>"Printed by % u"</Supplement>, it is indicated to conduct "print_alarm (alarm print)" by using a alarm character string in a character string format indicated "Printed by % u" as the requirement to print out the document 60.

Furthermore, by a description 716 of <id>identifiable_bg_pattern</id> and <Supplement>dynamic_image</Supplement>, it is indicated to conduct "identifiable_bg_pattern (identification pattern print)" by using a pattern character string shown by an identification pattern image indicated by "dynamic_image".

In these assumptions described above, for example, in a case in that "Taro Yamada", leader of a "Marketing" group in a "Sales" department of a "Comn" company, prints out a document 60 identified by the document ID "0000000003", the authentication result information as shown in FIG. 51 is provided by the user management server 300 to the application system 400. FIG. 51 is a diagram showing an example of the authentication result information.

In FIG. 51, for example, in accordance with the data structure 501 shown in FIG. 12, the authentication result information (AuthInfo) shows "Taro Yamada/Sales/Com" as "userId", "Taro Yamada" as "userName", and "Members/Sales/Com", "Marketing/Sales/Com", "Employee/Com", and "GroupLeaders/Sales/Com" as "groups".

Accordingly, "Taro Yamda" is specified by this authentication result information and the security server 200 executes the decision process. In the security server 200, the user security level mapping part 232 searches for "Taro Yamda" shown in the authentication result information from the user security level table 250 shown in FIG. 44. At first, "GroupLeaders/Sales/Com" in "userId" or "groups" corresponds to "Taro Yamda" and mapped to "manager" ((1) in FIG. 4).

Subsequently, the user category mapping part 233 searches "Members/Sales/Com" of "relatedPersons" of the document 60 identified by the document ID "0000000003" from the document profile management table 260 shown in FIG. 46, and determines whether or not the user "Taro Yamada" is allowed for related persons. The user category mapping part 233 determines that the user "Taro Yamada" is a related person since the user "Taro Yamada" belongs to "Members/Sales/Com" ((2) in FIG. 4).

The access type shows "print" ((3) in FIG. 4).

For example, the zone mapping part 234 receives context information as shown in FIG. 52. FIG. 52 is a diagram showing an example of the context information according to the embodiment of the present invention. In FIG. 52, "192.207.138.64" as "ipAddress" and "02-36-55-22-78-01" as "macAddress" are indicated in the context information.

The zone mapping part 234 obtains "saleszone01" and "saleszone02" as "zones" of the document 60 identified by the document ID "0000000003" by referring to the document profile management table 260. Moreover, the zone mapping part 234 obtains a list of an IP address and a MAC address included in the zones "saleszone01" and "saleszone02". Since an IP address "192.207.138.64" of the context information shown in FIG. 52 is included in the zone "saleszone01", the zone mapping @art 234 determines that the IP address "192.207.138.64" is inside the zone ((4) in FIG. 4).

For example, the document security attribute mapping part 235 receives document identification information as shown in FIG. 53. FIG. 53 is a diagram showing an example of the document identification information according to the embodiment of the present invention. In FIG. 53, "0000000003" as "docId" is indicated in the document identification information.

The document security attribute mapping part 235 determines by referring to the document profile management table 260 that the document category of the document 60 identified by the document ID "0000000003" is "sales" and the sensitivity level is "topsecret" ((%) in FIG. 4).

By mapping processes conducted by the user security level mapping part 232 and the zone mapping part 234, it is possible to abstract parameters such as "manager" as the user security level, "related person" as the user category, "print" as the access type, "inside zone" as the zonecategory, "sales" as the document category, and "topsecret" as the sensitivity level.

Based on these abstract parameters, the policy base access control decision part 241 determines to allow or prohibit in accordance with the access control rule (policy) described in the policy file 240 shown in FIG. 49. As a result, by the descriptions 711 and 713, the document 60 belonging to "sales" and "topsecret" is allowed for related persons in "manager" class to "print". However, since "private_access (private print mode)", "print_alarm (alarm print)", and "identifiable_bg_pattern (identification pattern print)" are regulated as the requirements, the access control decision result as shown in FIG. 54 is returned.

FIG. 54 is a diagram showing an example of the decision result information according to the embodiment of the present invention. In FIG. 54, in the decision result information, "true (allowed)" is indicated as an "allowed" item, "private_access (private print mode)" is indicated as the "requirement" in "requirements", and "supplements (supplement information)", "data", and "alternatives" are not indicated for this "requirement". Moreover, "print_alarm (alarm print)" is indicated as another "requirement", and "data" and "alternatives" are not indicated. Furthermore, "identifiable_bg_pattern (identification pattern print)" is indicated as a further "requirement", "dynamic_image (dynamic image)" as "supplements (supplement information)" and binary image data (actual dynamic image being binary data) as "data" for this "requirement", and "alternatives" is not indicated.

In the access control rule in the policy file 240, "Printed by % u" is described. % u is variable and is replaced with Taro Yamada by the compensating process.

In addition, in the access control rule in the policy file 240, in a case in that "dynamic_image" is described and the access type is "print", an entry for a new print profile is created in the print profile management table 280 as shown in FIG. 55. FIG. 55 is a diagram showing an example of the print profile management table according to the embodiment of the present invention. In FIG. 66, by creating the entry for the new print profile, a value of "printId" is obtained. Then, the value of "printId" is encoded to create identification image data, and the identification image data is stored in "data" as the binary image data.

Figure 56:
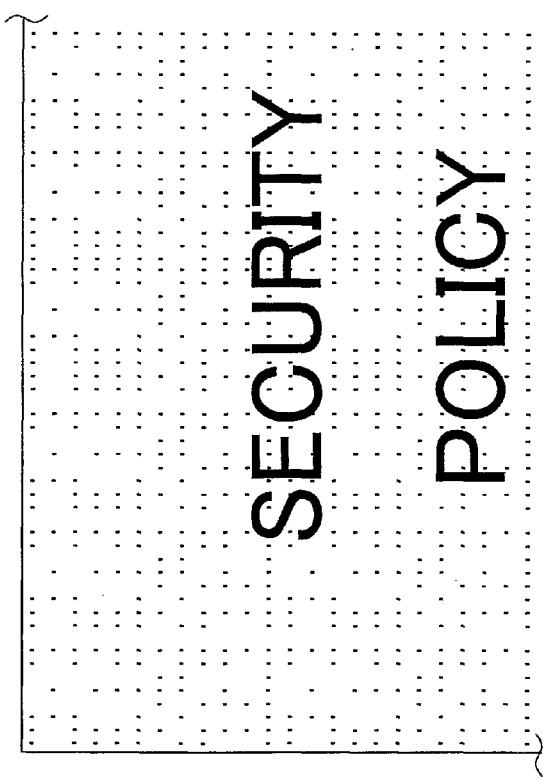
FIG. 56 is a diagram showing an example of the identification pattern being printed according to the embodiment of the present invention.

For example, the identification image data are overlaid and printed on a sheet when the document 60 is printed out, so that the identification image data can be utilized to identify or trace the document 60. FIG. 56 is a diagram showing an example of the identification pattern being printed according to the embodiment of the present invention. For example, as shown in FIG. 66, the identification pattern 646 shown in FIG. 41B is overlaid.

A case, in which another user 52 conducts the print request for the same document 60 from the same client terminal 51 and is specified as "Hanako Satoh" by the authentication result information as shown in FIG. 57, will be described. FIG. 57 is a diagram showing another example of the authentication result information according to the embodiment of the present invention.

In FIG. 57, for example, the authentication result information shows in accordance with the data structure 501 shown in FIG. 12 in that "Hanako Satoh/Sales/Com" is indicated as "userId", "Hanako Satoh" is indicated as "userName", and "Members/Sales/Com", "Marketing/Sales/Com", and "Employee/Com" are indicated as "groups".

The user "Hanako Satoh" is specified by this authentication result information, and then, the security server 200 executes the decision process. By executing the decision process, since the user security level indicates "regular", the user category indicates "related person", the access type indicates "print", the zone category indicates "inside zone", the document category indicates "sales", and the sensitivity level is "topsecret", the security server 200 determines in accordance with the access control rule (policy) described in the policy file 240. As a result, the access control decision result shows that the user "Hanako Satoh" is not allowed to print out the document 60.

Moreover, in a case in that the user "Taro Yamada" attempts to read a document 60 specified by the document ID "0000000001", the access control rule (policy) does not regulates this access "read" for the document 60. As a result, the access control decision result indicates that the user "Taro Yamada" is not allowed to read the document 60.

Furthermore, in a case in that a paper document 62 to which the document 60 is copied by the user "Taro Yamada" is copied by the digital copier 70, the digital copier 70 sends the access decision request to the securing server 200 based on image data generated by scanning the paper document 62.

The security server 200 receives document identification information as shown in FIG. 58A or FIG. 58B from the digital copier 70.

The document identification information will be described with reference to FIG. 58A and FIG. 58B. FIG. 58A is a diagram showing an example of the document identification information in a case in that image data itself is actually sent to the security server according to the embodiment of the present invention. In FIG. 58A, "docId" and "printId" are not indicated, and the image data is stored in binary in "image" (as binary image data).

FIG. 58B is a diagram showing another example of the document identification information in a case in that the image data is decoded and sent to the security server according to the embodiment of the present invention. In FIG. 58B, "docId" and "image" are not indicated, and the image data being encoded by the digital copier 70 and binary are stored in "printId".

When the security server 200 receives the image data in binary as shown in FIG. 58A from the digital copier 70, the security server 200 obtains "p000000001" as "printId". Based on "printId", the security server 200 refers to the print profile and obtains "0000000003" as "docId". Then, the security server 200 conducts the access control decision in accordance with the access control rule (policy) regulating a case in that the access type indicates "copy", similarly to a case or "print" by "Taro Yamada".

According to the present invention, for example, in a description of a policy requiring a print of a name of the user 52, when the user 52 prints out the portable document 63, that is, when the portable document 63 is output as the paper document 62 outside a control of the document viewer 53 by conducting an operation for printing out the portable document 63, the policy can regulate so as to improve a suppression effect for a leak of information with respect to the user 52 attempting to print out the portable document 63. Therefore, it is possible to maintain a security of the portable document 63.

Moreover, in the description of the policy, since it is possible to regulate the requirement to print the user name of the user 52 attempting to print out a regular paper document when the regular paper document is printed out, it is possible to maintain a security of the paper document 62 that copies the regular paper document and is output from the digital copier 70, by printing the user name of the user 52 to the paper document 62.

Furthermore, in the description of the policy, since it is possible to regulate the requirement to record a log when the server document 61 is read out from the document management system 100, it is possible to keep the log showing that the server document 61 is read out. Accordingly, it is possible to prevent the user 52 who read out the server document 61 from leaking information and maintain a security of the server document 61.

In the description of the policy, since the requirement to allow an operation can be regulated so as to conduct a process for maintaining the security after the operation, it is possible to consistently maintain the security of the document 60 before and after the operation.

In a conventional security for the document 60, the security of the document 60 cannot be maintained after the operation is conducted.

However, according to the present invention, it is possible to consistently maintain the security of the document 60 even after the operation is conducted for the document 60.

In the following, the operations, the requirements, the supplement information in the access control rule regulated in the policy file 240 will be described in detail.

[Details Concerning Operations, Requirements, and Supplement Information]

[1 Details of Operations]

Since there are operations having the same name for the server document 61, the paper document 62, and the portable document 63, the following prefixes are additionally provided at the beginning of an operation identification to distinguish each other.

| operation for the server document 61 | sdOpe_xxxx |
| operation for the paper document 62 | ppOpe_xxxx |
| operation for the portable document 63 | pdOpe_xxxx | xxxx shows an English word for an operation. In the following, a title of each section shows the operation identification.

[1-1 sdOpe_store]

For example, this is an operation to request storing the document 60 to the document management server 00. This operation is used to store the document 60 to a repository (storage unit) such as the document management system 100, the digital copier 70, or the like in that a security management can be conducted for a document file (this operation may be called new creation or new registration).

As adaptable requirements, record_audit_data, explicit_authorization, encryption, integrity_protection, and show_alarm can be indicated. Each of these requirements will be described later.

[1-2 sdOpe_prop_read]

For example, this is an operation to request to refer to a property of the document 60 stored in the document management system 100. Instead of referring to (obtaining) contents of the document 60, attribute information such as a file size, a created date and time, and an owner of the document 60 is referred to by this operation. When this operation is not allowed, an existence of the document 60 cannot be recognized.

As adaptable requirements, record_audit_data, explicit_authorization, multi_authentication, and show_alarm can be indicated. Each of these requirements will be described later.

[1-3 sdOpe_read]

For example, this is an operation to request to refer to (read out) the document 60 stored in the document management system 100 and to refer to (download) contents of the document 60 in the document management system 100. A protected document file is downloaded.

As adaptable requirements, record_audit_data, explicit_authorization, multi_authentication, and show_alarm can be indicated. Each of these requirements will be described later.

The following explanation will be additionally provided for this operation.

The document file being downloaded is called portable document 63. Since an access to the portable document 63 is required to be controlled, the portable document 63 to be downloaded by the operation sdOpe_read is protected (protected document file).

[1-4 sdOpe_get_org]

For example, this is an operation to refer to (read out) an original file of the document 60 stored in the document management system 100. The operation sdOpe_read conducts to download the document file without any protection and this operation sdOpe_get_org conducts to download the original document file without any protection.

As adaptable requirements, record_audit_data, explicit_authorization, multi_authentication, and show_alarm can be indicated. Each of these requirements will be described later.

[1-5 sdOpe_revise]

For example, this is an operation to request to revise the document 60 stored in the document management system 100. This operation is used to open, edit, and revise the document 60 stored in the document management system 100 by an editor or replace (resave) the document 60 stored in the document management system 100.

As adaptable requirements, record_audit_data, explicit_authorization, multi_authentication, versioning, and show_alarm can be indicated. Each of these requirements will be described later.

[1-6 sdOpe_delete]

For example, this is an operation to request to delete the document 60 stored in the document management system 100. The document 60 stored in the document management system 100 is deleted by this operation.

As adaptable requirements, record_audit_data, explicit_authorization, multi_authentication, complete_deletion, and show_alarm can be indicated. Each of these requirements will be described later.

[1-7 pdOpe_read]

This is an operation to request to refer to (open) the portable document 63. A file of the portable document 63 is open by this operation.

As adaptable requirements, record_audit_data, explicit_authorization, multi_authentication, and show_alarm can be indicated. Each of these requirements will be described later.

[1-8 pdOpe_print]

This is an operation to request to print out the portable document 63. Contents in a file is printed out by this operation.

As adaptable requirements, record_audit_data, explicit_authorization, private_access, record_image_data, embed_trace_info, show_label, visible_watermark, anti_copy_watermark, trusted_bg_pattern, identifiable_bg_pattern, and show_alarm can be indicated. Each of these requirements will be described later.

[1-9 pdOpe_send_fax]

This is an operation to request to send the portable document by fax. The contents of the file are directly transmitted by fax by this operation. This operation corresponds to a process for printing out by a printer object corresponding to the fax.

As adaptable requirements, record_audit_data, explicit_authorization, address_restriction, private_send, record_image_data, show_label, visible_watermark, show_alarm, and print_alarmcan be indicated. Each of these requirements will be described later.

[1-10 ppOpe_copy]

This is an operation to request to copy the paper document 60. The document 60 being papers is copied by this operation.

As adaptable requirements, record_audit_data, explicit_authorization, show_label, show_operator, owner_only, record_image_data, show_alarm, and print_alarmcan be indicated. Each of these requirements will be described later.

[1-11 ppOpe_send_fax]

This is an operation to request to transmit the paper document 62 by fax. The document 60 being papers is transmitted by fax by this operation.

As adaptable requirements, record_audit_data, explicit_authorization, address_restriction, private_send, record_image_data, show_label, visible_watermark, show_alarm, and print_alarmcan be indicated. Each of these requirements will be described later.

[1-12 ppOpe_scan]

This is an operation to request to scan the paper document 62. The document 60 being papers is read out by scanner and digitalized to be a digital file by this operation.

As adaptable requirements, record_audit_data, explicit_authorization, record_image_data, digital_watermark be indicated. Each of these requirements will be described later.

[2 Details of Requirement]

In the following, each requirement is explained. A title of each section shows an identification of the requirement. Each requirement is differently processed. A process for the requirement is conducted by the application system 400.

[2-1 record_audit_data]

This requirement requires recording a log. For example, a log may be recorded for each page when the document 60 is copied by the digital copier 70. Alternatively, a log is recorded for the document 60 being copied by grouping by each security ID.

There is no supplement information necessary for this requirement.

There is no requirement that cannot be indicated simultaneously (conflicting requirement).

[2-2 explicit_authorization]

This requirement requires allowing by a document management administrator. In a case in that this requirement is regulated in the policy, when it is not explicitly indicated to the security server 200 that an operation requiring this requirement is allowed, the operation is not allowed. When the security server 200 recognizes result that this requirement is regulated, by a determination obtained in the decision process, the security server 200 checks whether or not a permit is issued. When the permit is issued, requirements showing "allowed=true" and excluding explicit_authorization are sent to the application system 400 as the determination result by the decision process. When the permit is not issued, "allowed=false" as the determination result is sent to the application system 400.

There is no supplement information necessary for this requirement.

There is no requirement that cannot be indicated simultaneously (conflicting requirement).

[2-3 Encryption]

This requirement requires encrypting a digital document. When this requirement is regulated by the policy, a server administrator is not wanted to read contents of the digital document. Accordingly, the application system 400 is required to encrypt the digital document so that even the server administrator cannot read it. That is, it is required to store a decryption key for decrypting this encryption so that the server administrator of the application system 400 cannot use the decryption key.

There is no supplement information necessary for this requirement.

There is no requirement that cannot be indicated simultaneously (conflicting requirement).

[2-4 integrity_protection]

This requirement requires securing integrity of the digital document (integrity of an original). When this requirement is regulated in the policy, the application system 400 protects the original of the digital document from being tampered. The application system 400 may store the digital document to a document protection area by itself. Alternatively, the application system 400 may request the security server 200 to store the original to the document protection area.

The security server 200 stores the original document (file before converting into PDF) received from the application system 400 and a secured PDF file being converted to the document protection area. An original document ID of the original document stored in the document protection area is recorded as application data of the document profile management table 260.

In a case in that the document protection area is not setup in the security server 200, storing to the document protection area causes an error. The security server 200 records a log having a higher security level even if a serious error occurs.

There is no supplement information necessary for this requirement.

There is no requirement that cannot be indicated simultaneously (conflicting requirement).

In the requirement process, the application system 400 requests storing to the document protection area to the security server 200. The security server 200 stores to the document protection area when receiving the request.

[2-5 multi_authentication]

This requirement requires the multiple authentication for an access to the digital document. When this requirement is regulated in the policy, for example, the application system 400 is required to conduct the multiple authentication such as a finger print recognition or an iris-recognition in addition to a regular user authentication. The application system 400 can determine to use which authentication method. The access may not be allowed when a further authentication is conducted successively after the regular user authentication and is failed. Alternatively, the further authentication may be conducted after being requested to the user 52 when this requirement is returned.

There is no supplement information necessary for this requirement.

There is no requirement that cannot be indicated simultaneously (conflicting requirement).

[2-6 Versioning]

This requirement requires conducting a version management of the digital document.

In a case in that this requirement is regulated in the policy, instead of saving a revised digital document to the original, the application system 400 is required to conduct the version management. When the application system 400 does not support a function of the version management, the application system 400 must not revise the digital document since the requirement is not satisfied.

There is no supplement information necessary for this requirement.

There is no requirement that cannot be indicated simultaneously (conflicting requirement).

[2-7 complete_deletion]

This requirement requires conducting a perfect deletion of the digital document. In a case in that this requirement is regulated in the policy, the application system 400 not only delete an entry of the digital document simply but also conduct a perfect deleting process by writing random data on a disk area where the digital document was stored.

There is no supplement information necessary for this requirement.

There is no requirement that cannot be indicated simultaneously (conflicting requirement).

[2-8 private_access]

This requirement requires using the private print mode. In order for other persons not to take printed paper sheets away, the printed paper sheets are output when the user 52 printing the digital document is confirmed by using an operation panel of a printer. In a case in that this requirement is regulated in the policy, the application system 400 is required to print out the digital document by using the private print mode. If the print does not support the private print mode, the application system 400 does not allow for the user 52 to print out the digital document. However, if the print does not support the private print mode but an environment of the printer has less possibility in that other persons take the printed paper sheets away, the user 52 probably wants to print out the digital document at the printer. In this case, show_alarm is indicated as the alternative requirement of this requirement private_access in the policy, so that an alarm is displayed and the user 52 is allowed to print out the digital document.

There is no supplement information necessary for this requirement.

There is no requirement that cannot be indicated simultaneously (conflicting requirement).

[2-9 record_image_data]

This requirement requires recording an image log. A print image and a copy image themselves are recorded and maintained. In a case in that this requirement is regulated in the policy, the application system 400 indicates an image data record to a printer adapter of a printer to print out the digital document with a print instruction. When this requirement is regulated as the requirement of a copy, an image copying an original paper document is stored in a hard disk (document box) in the digital copier 70.

There is no supplement information necessary for this requirement.

There is no requirement that cannot be indicated simultaneously (conflicting requirement).

[2-10 embed_trace_info]

This requirement requires embedding trace information to print out the digital document. When the digital document is printed out, identification information identifying the digital document is embedded to a paper sheet and the printed paper sheet is output. As the trace information, a two dimensional barcode is used.

In a case in that this requirement is regulated in the policy, in the decision process, the security server 200 sends this requirement embed_trace_info and also the supplement information showing to dynamically generate the trace information. That is, the security server 200 sends the supplement information (supplement) indicating dynamic_image. When the security server 200 recognizes that the policy regulates the supplement information (supplement) of dynamic_image, the security server 200 obtains an embedding image from the document profile management table 260, and sends the requirement embed_trace_info and also the embedding image as the supplement information (supplement) as a returned value of the decision process of the security server 200 (refer to a section of the supplement information dynamic_image). The application system 400 embeds the embedding image received from the security server 200 to the paper sheet to be printed.

There is no supplement information necessary for this requirement.

There is no requirement that cannot be indicated simultaneously (conflicting requirement).

In the requirement process, the security server 200 obtains the embedding image from the document profile management table 260, and the application system 400 actually embeds the embedding image while printing.

[2-11 show_label]

This requirement requires printing a label such as "secret" as a stamp. In a case in that this requirement is regulated in the policy, the security server 200 sends a bitmap data of a label stamp as the supplement information (supplement) with this requirement show_label by a returned value of the decision process. Information showing that which stamp is printed for what kind of the document 60 is set to the security server 200 beforehand. In the policy, information concerning an ID of the label stamp and a location to stamp a label is regulated. A bitmap file corresponding to the ID is stored in a local hard disk of the security server 200. The security server 200 read out the bitmap file and sends the supplement information (supplement) shown by a byte array to an upper layer.

If the bitmap file corresponding to the ID of the label stamp regulated in the policy, only the ID of the label stamp is included in the supplement information (supplement), and the requirement is sent without the bitmap data (refer to a section of static_image).

A stamp image is not assumed to dynamically generate. The security server 200 sends the requirement and the supplement information (supplement) themselves to the application system 400. The application system 400 overlays and print out the received stamp image.

There is no supplement information necessary for this requirement.

There is no requirement that cannot be indicated simultaneously (conflicting requirement).

In the requirement process, the security server 200 provides the stamp image, and the application system 400 (digital copier 70) stamps the label stamp to the paper sheets.

[2-12 visible_watermark]

This requirement requires printing the visible watermark letter on a background of a paper sheet. In a case in that this requirement is regulated in the policy, the security server 200 sends a character string format for printing as a watermark as the supplement information (supplement) with this requirement visible_watermark by a returned value of the decision process. As the supplement information (supplement) of this requirement, information showing that what kind of the document 60 requires which character string format in the policy. The security server 200 sends this requirement and the supplement information (supplement) themselves to the application system 400. The application system 400 generates a watermark character string in accordance with the character string format received from the security server 200 (refer to a section of string_format).

There is no supplement information necessary for this requirement.

As the requirement that cannot be indicated simultaneously (conflicting requirement), there are anti_copy_watermark, trusted_bg_pattern, and identifiable_bg_pattern.

In the requirement process, the security server 200 provides the character string format and the application system 400 (digital copier 70) prints out the character string to the paper sheet.

[2-13 anti_copy_watermark]

This requirement requires printing an embossed watermark letter. The embossed watermark letter is embossed when a paper sheet having this embossed watermark letter is copied. In a case in that this requirement is regulated in the policy, the security server 200 sends a character string format for printing a watermark as the supplement information (supplement) with this requirement anti_copy_watermark by a returned value of the decision process. Information showing that what kind of the document 60 requires which character string format is regulated as the supplement information (supplement) of this requirement in the policy. The security server 200 sends the requirement and the supplement information themselves to the application system 400. The application system 400 generates and print out a watermark letter in accordance with the character string format received form the security server 200 (refer to a section of the supplement information string_format).

As the supplement information necessary for this requirement, there is string_format, color.

As the requirement that cannot be indicated simultaneously (conflicting requirement), there are visible_watermark, trusted_bg_pattern, identifiable_bg_pattern.

In the requirement process, the security server 200 provides a character string format, and the application system 400 prints a character string on a paper sheet.

[2-14 trusted_bg_pattern]

This requirement requires printing a background pattern for a tamper-detection.

[2-15 identifiable_bg_pattern]

In a case in that this requirement is regulated in the policy, the security server 200 sent information showing that this requirement identifiable_bg_pattern and the supplement information is required to dynamically generate, as a returned value in the decision process. When the security server 200 recognizes that a dynamic image generation (supplement information dynamic_image) is indicated, the security server 200 obtains an identification pattern from the document profile management 260, sends this requirement identifiable_bg- _pattern and the supplement information by the returned value of the decision process (refer to a section of supplement information dynamic_image).

The application system 400 prints the identification pattern received from the security server 200 on the background of the paper sheet to be printed out.

As the necessary supplement information, there is dynamic_image.

As the requirement that cannot be indicated simultaneously (conflicting requirement), there are visible_watermark, anti_copy_watermark, trusted_bg_pattern.

In the requirement process, the security server 200 obtains the identification pattern from the document profile management table 260, and the application system 400 actually prints the identification pattern on the background of the paper sheet.

[2-16 show_alarm]

This requirement requires displaying an alarm. An alarm such as "Give attention to handle top secret" is displayed to warn the user 52. This requirement aims to display the alarm at a display or an operation panel. Another requirement print_alarm is used when the alarm is required to print to a paper sheet. Information showing that what kind of the document 60 is required to display which character string is regulated as the supplement information (supplement) of the requirement in the policy. The security server 200 sends the requirement and the supplement information themselves to the application 400. The application system 400 generates and displays the character string in accordance with the character string format received from the security server 200.

As the necessary supplement information, there is string_format.

There is no requirement that cannot be indicated simultaneously (conflicting requirement).

In the requirement process, the security server 200 provides the character string format to display, and the application system 400 display the alarm in the character string format.

[2-17 print_alarm]

This requirement requires printing an alarm. An alarm such as "RRR Internal Use Only" is printed to warn the user 52. This requirement aims to print the alarm on a paper sheet. Another requirement show_alarm is used to display the alarm at a display or an operation panel.

Information showing that which character string is printed for what kind of the document 60 is regulated as the supplement information of this requirement in the policy. The security server 200 provides a character string format to display the alarm, and the application system 400 displays the alarm. The security server 200 sends this requirement and the supplement information (supplement) themselves to the application system 400. The application system 300 generates and prints the character string in accordance with the character string format received from the security server 200.

As the necessary supplement information, there is string_format and string_position. There is no requirement that cannot be indicated simultaneously (conflicting requirement).

In the requirement process, the security server 200 provides the character string format to print, and the application system 400 prints the alarm in the character string format.

[2-18 private_send]

This requirement requires using the confidential transmission mode. The confidential transmission mode is used so that other persons cannot take a paper sheet transmitted by fax away. A fax transmission process is not conducted for a fax which does not support the confidential transmission mode.

If the fax does not support the confidential transmission mode but an environment of the fax has less possibility in that other persons take the faxed paper sheets away, the user 52 probably wants to fax. In this case, show_alarm is indicated as the alternative requirement of this requirement private_receive in the policy, so that an alarm is displayed and the user 52 is allowed to fax.

There is no supplement information necessary for this requirement.

There is no requirement that cannot be indicated simultaneously (conflicting requirement).

[2-19 address_restriction]

This requirement requires controlling a destination to fax.

[2-20 show_operator]

This requirement requires printing a user name printing. In a case in that this requirement is regulated in the policy, the security server 200 sends a character string format to print with this requirement show_operator by a returned value of the decision process. Information showing that which character string is printed for what kind of the document 60 is regulated as the supplement information (supplement) of the requirement in the policy.

The security server 200 sends the requirement and the supplement information (supplement) themselves. The application system 400 generates the character string in accordance with the character string format received from the security server 200 and prints the character string on a printed paper sheet.

As the necessary supplement information, there is string_format.

There is no requirement that cannot be indicated simultaneously (conflicting requirement).

In the requirement process, the security server 200 provides the character string format to print that is regulated in the policy, and the application system 400 prints the character string in accordance with the character string format when the document 60 is printed.

[2-21 owner_only]

This requirement requires only for the user 52 printing the document 60 to copy. In a case in that this requirement is regulated in the policy, the security server 200 sends the requirement owner_only by a returned value of the decision process. When the security server 200 recognizes this requirement, the security server 200 obtains the user ID of the user printing a copied document from the document profile management table 260, and compares a user attempting to copy and a user who printed the document 60. When both the users are the same person, the security server 200 sends a result of the decision process expect for this requirement owner_only. when both the users are not the same person, the security server 200 sends the result of the decision process showing "allowed=false".

There is no necessary supplement information.

There is no requirement that cannot be indicated simultaneously (conflicting requirement).

In the requirement process, the security server 200 sends "not allowed" when the both users are not the same person.

[2-22 unreadable_mask]

This requirement requires masking not to read the document 60. When the document 60 is copied, in order to warn the user 52 that the document 60 is not allowed to copy, this requirement masks the document 60 by printing the entire of the document 60 in gray so that the document 60 cannot be read.

There is no necessary supplement information.

There is no requirement that cannot be indicated simultaneously (conflicting requirement). Even if the conflicting requirement such as show_label is indicated, this requirement ends up being meaningless.

[2-23 digital_watermark]

This requirement requires embedding a digital watermark in image data. In a case in that this requirement is regulated in the policy, the security server 200 sends a character string format to embed as the digital watermark with this requirement digital_watermark by a returned value of the decision process. Information showing that which character string format is used for what kind of the document 60 is regulated as the supplement information of this requirement in the policy. The security server 200 sends the supplement information (supplement) itself to the application system 400. The application system 400 generates an embedding character string in accordance with the character string format received from the security server 200 and embeds as the digital watermark to the image data of the document 60 (refer to a sections of the supplement information string_format and watermark_type).

As the necessary supplement information, there are string_format and watermark_type.

As the requirement that cannot be indicated simultaneously (conflicting requirement), there are anti_copy_watermark, trusted_bg_pattern, and identifiable_bg_pattern.

In the requirement process, the security server 200 provides the character string format, and the application system 400 embeds the digital watermark in accordance with the character string format received from the security server 200.

[3 Details of Supplement Information]

The requirement may require the supplement information. A method for indicating the supplement information is defined as follows. A title of each section shows an identification of the supplement information.

[3-1 static_image]

This supplement information is used to indicate fixed image data. As the fixed image data, for example, there is a stamp image to use for the requirement of the label display (show_label). Since the fixed image data are not stored in the policy file 240, an identification label identifying a fixed image data file is indicated in the policy file 240. At the beginning of the identification label, "ref" is provided to indicate the identification label.

A supplement information format is ref: [file_id]

For example, the supplement information is indicated in the policy file as follows:

```
<Ace>
    <Operation>
        <Id>pd_print</Id>
        <Requirement>
            <Id>show_label</Id>
            <Supplement>
                <Id>static_image</Id>
                <Data>ref:STAMP_IMAGE_01</Data>
            </Supplement>
```

In a case in that this supplement information is indicated in the policy file 240 as described above, when the a policy decision result is returned in an decision process method of the security server 200, the policy decision result is returned as follows:

```
DecisionInfo.requirements[x].requirement = "show_label";
DecisionInfo.requirements[x].supplements[y].name = "static_image";
DecisionInfo.requirements[x].supplements[y].value = "z";
DecisionInfo.requirements[x].dataz = image data (binary) corresponding to STAMP_IMAGE_01;
``` where x, y, and z are numbers.

As described above, when "ref" is indicated as the supplement information, the security server 200 reads out a file corresponding to the identification label and conducts an including process for including the file as binary data as the supplement information.

[3-2 dynamic_image]

This supplement information is used to indicate dynamic image data. As the dynamic image data, for example, there are a barcode image used for the requirement of the tracing information embedding ("embed_trace_info") and an identification pattern image used for the requirement of the identification pattern ("identifiable_bg_pattern").

Since these image data are dynamically generate by the document 60, a description for the image data cannot be included in the policy file 240. The policy file 240 indicates a type of information dynamically generated as the supplement information (for example, type of information such as the document ID and the user ID).

A format of this supplement information is dyn: [info_type]. Only a section ID "SecId" can be indicated in info_type.

For example, this supplement information is indicated in the policy file 240 as follows:

```
<Ace>
    <Operation>
        <Id>pd_print</Id>
        <Requirement>
            <Id>embed_trace_info</Id>
            <Supplement>
                <Id>dynamic_image</Id>
                <Data>dyn:SecId</Data>
            </Supplement>
```

In a case in that this supplement information is indicated in the policy file 240 as described above, when the policy decision result is returned in the decision process method of the security server 200, the security server 200 do not conduct any process but the policy decision result is returned as follows:

```
DecisionInfo.requirements[x].requirement = "embed_trace_info";
DecisionInfo.requirements[x].supplements[y].name = "dynamic_image";
DecisionInfo.requirements[x].supplements[y].value = "dyn:SecId";
``` where x and y are numbers.

Then, the security server 200 receiving decision result information dynamically generates necessary image data, and sends the following as a result of the decision process.

```
DecisionInfo.requirements[x].requirement     =
   "embed_trace_info";
DecisionInfo.requirements[x].supplements[y].name  =
   "dynamic_image";
DecisionInfo.requirements[x].supplements[y].value = "z";
DecisionInfo.requirements[x].dataz = image data dynamically
   generated (binary) - 4);
``` where x, y, and z are numbers.

[3-3 image_position]

This supplement information is sued to indicate an embedding location of an image. In a case of embedding partially, instead of embedding the image to the entire of a page, this supplement information is indicated by an embedding requirement (such as "show_label"). In a case of embedding the entire of the page (embedding a tile), a different requirement ("identifiable_bg_pattern" or the like) is used.

The embedding location is indicated by the identification label in the policy file 240.

A format of this supplement information is [position_id]. position_id selectively indicates one of five location: upper_right, lower_right, upper_left, lower_left, and center.

For example, the embedding location is indicated in the policy file 240 as follows:

```
<Ace>
   <Operation>
      <Id>pd_print</ Id>
      <Requirement>
         <Id>show_label</Id>
         <Supplement>
            <Id>image_position</Id>
            <Data>upper_right</Data>
         </Supplement>
```

The security server 200 sets the supplement information in the decision result information to send back to a request originator.

[3-4 string_format]

This supplement information is used to indicate a character string format. The character string format is indicated for the requirement such as the watermark ("visible_watermark"). A format of this supplement information is ["format_string"]. The character string format is indicated in the policy file 240 as follows: format_string indicates a combination of the followings and any character string.

"% da" IP address (decimal notation such as 133.139.208.69 or a like)

"% ha" IP address (hexadecimal notation such as BEAC143F or a like)

"%8u" user name (account name), possible to indicate digits by a number (not necessary to indicate)

"% d1" date (YYMMDD)

"% d2" date and time (YYMMDD HH:mm)

"% d3" date and time (YYMMDD HH:mm:ss)

"% id" document ID

"% lv" sensitivity level ID

"% ca" document category ID

For example, the supplement information is indicated in the policy file 240 as follows:

```
<Ace>
   <Operation>
```

```
      <Id>pd_print</Id>
      <Requirement>
         <Id>visible_watermark</Id>
         <Supplement>
            <Id>string_format</Id>
            <Data>%8u %d2 DO NOT COPY</Data>
         </Supplement>
```

The security server 200 sets this supplement information to the decision result information to send back to a request originator. The requirement may have a limitation of a maximum character number (for example, 32 characters for the requirement visible_watermark). Characters over the maximum character number are not used.

[3-5 string_position]

This supplement information is used to indicate an embedding location of a character string. This supplement information is used for the embedding requirement embedding partially ("print_alarm" or a like) but not embedding the character string on a background. In a case of embedding the character string on the background, a different requirement ("visible_watermark" or a like). The embedding location is indicated by the identification label in the policy file 240.

A format of this supplement information is [position_id]. position_id is selectively set from six positions; upper_right, lower_right, upper_left, lower_left, upper_center, lower_center, and upper_lower_center.

For example, this supplement information is indicated in the policy file 240 as follows:

```
<Ace>
   <Operation>
      <Id>pd_print</Id>
      <Requirement>
         <Id>print_alarm</Id>
         <Supplement>
            <Id>string_position</Id>
            <Data>upper_lower_center</Data>
         </Supplement>
```

The security server 200 sets this supplement information in the decision result information to send back to a request originator.

[3-6 Color]

This supplement information is used to indicate a color. This supplement information is indicated for the requirement of a copy suppression pattern ("anti_copy_watermark").

This supplement information is indicated in the policy file 240 as follows;

A format of the supplement information is [color_id]. color_id indicates either one of cyan and magenta.

For example, the supplement information is indicated in the policy file 240 as follows:

```
<Ace>
   <Operation>
      <Id>pd_print</Id>
      <Requirement>
         <Id>anti_copy_watermark</Id>
         <Supplement>
            <Id>color</Id>
            <Data>cyan</Data>
         </Supplement>
```

The security server 200 sets this supplement information to the decision result information to send back to a request originator.

[3-7 watermark_type]

This supplement information is used to indicate a watermark type. This supplement information is indicated by the requirement of a digital watermark ("digital_watermark").

This supplement information is indicated in the policy file 240 as follows:

A format of this supplement information is [watermark_type_id]. watermark_type_id indicates traceability, integrity, and steganography. traceability indicates the digital watermark for a tracing purpose, integrity indicates the digital watermark for a tamper-detection purpose, and steganography indicates the digital watermark for an information transmission purpose.

For example, this supplement information is indicated in the policy file 240 as follows:

```
<DspAce>
    <DspOperation>
        <Id>pp_scan</Id>
        <DspRequirement>
            <Id>digital_watermark</Id>
            <DspSupplement>
                <Id>string_format</Id>
                <Data>%u %d</Data>
            </DspSupplement>
            <DspSupplement>
                <Id>watermark_type</Id>
                <Data>traceability</Data>
            </DspSupplement>
```

The security server 200 sets this supplement information to the decision result information to send back to a request originator.

As described above, according to the present invention, it is possible for the security server 200 to abstract information provided from the application system 400 in order to correspond to the organizational security policy. That is, it is possible to convert information, which provided from the application system 400 and has a lower abstraction, into different information having a higher abstraction degree that the information received from the application system 400 in order to correspond to the security policy having a higher abstraction degree. Accordingly, it is possible to secure the security of both digital document and paper document in accordance with the organizational security policy.

The document management system 100 and the document viewer 53 conduct the access control for the digital document such as the server document 61 and the portable document 63, and the security process for securing the portable document 63 is conducted in accordance with the policy when the portable document 63 is printed from the document viewer 53. Therefore, the user 52 printing the portable document 63 is required to properly handle the paper document 62 to which the portable document 63 is printed, in accordance with the policy.

In addition, when the paper document 62 to which the portable document 63 is printed is copied by the digital copier 70, the copying process can be controlled in accordance with the policy.

Therefore, in a general office, it is possible to sufficiently maintain the security of the paper document 62 and the digital document such as the server document 61 and the portable document 63.

The present invention is not limited to the specifically disclosed embodiments, and variations and modifications may be made without departing from the scope of the present invention.

The present application is based on the Japanese Priority Applications No. 2003-178033 filed on Jun. 23, 2003, No. 2003-315921 filed on Sep. 8, 2003, and No. 2002-315996 filed on Sep. 8, 2003, the entire contents of which are hereby incorporated by reference.

What is claimed is:

1. An access control enforcing system, comprising:

a storing part configured to store a security policy that regulates an access permit to subject information, a requirement enforced when access is allowed, and supplement information indicating character information or image information used by an access request originator to perform the requirement when the requirement is enforced;

an abstraction processing part configured to acquire a first attribute associated with a first identification information for identifying the access request originator who requests the access to the subject information, and a second attribute associated with a second identification information for identifying the subject information to be accessed, the second attribute corresponding to a category of the subject information;

an access control decision part configured to determine an access control for the subject information based on access control information that indicates a control of the access to the subject information, the access control information determined based on information regulated in the security policy, and a combination of the first attribute associated with the first identification information and the second attribute associated with the second identification information; and a decision result sending part configured to send a decision result information indicating the access control with respect to the subject information by the access control decision part, to the access request originator which conducts an access decision request, wherein said access control decision part further includes a requirement capability determining part determining whether or not the requirement to execute the access can be executed, the requirement indicated by the access control information, the access request originator, which conducts the access decision request, is required to perform the requirement including an image process using the supplemental information, based on the decision result information, and at least one of the storing part, the abstraction processing part, and the access control decision part is implemented as hardware or as a hardware/software combination.

2. The access control enforcing system as claimed in claim 1, wherein said access control decision part further includes an access prohibiting part prohibiting the access to the subject information when the determination result by the requirement capability determining part indicates that the access cannot be executed to satisfy the requirement.

3. The access control enforcing system as claimed in claim 2, wherein said access control decision part enforces an alternative requirement indicated in the access control information when the determination result by the requirement capability determining part indicates that the access cannot be executed to satisfy the requirement.

4. The access control enforcing system as claimed in claim 3, wherein said access control decision part further includes an alternative requirement capability determining part determining that the alternative requirement indicated in the access control information can be executed when the determination result by said requirement capability determining part indicates that the access cannot be executed to satisfy the requirement.

5. The access control enforcing system as claimed in claim 3, wherein said access control decision part determines the access control to the subject information to satisfy the requirement, by using the supplement information indicated in the access control information when the determination result by said requirement capability determining part indicates that the access can be executed to satisfy the requirement.

6. The access control enforcing system as claimed in claim 1, wherein an alarm display is executable as the requirement.

7. The access control enforcing system as claimed in claim 1, wherein at least one of a label print, an operator print, an alarm display, an alarm print, a watermark print, and a digital watermark is executable as the requirement.

8. The access control enforcing system as claimed in claim 1, wherein at least one of an alarm display, an identification information print, a label print, a watermark print, a copy suppression pattern print, an identification background pattern, and an alarm print is executable as the requirement.

9. The access control enforcing system as claimed in claim 1, further comprising:
an access decision requesting part configured to request an access control decision from an access control decision system, which determines the access control in accordance with the security policy being abstractly regulated in response to an access request to the subject information; and
an access control receiving part configured to receive access control information sent from the access control decision system corresponding to the access control decision request,
wherein said access control decision part determines the access control to the subject information based on the access control information received by said access control receiving part.

10. The access control enforcing system as claimed in claim 1, wherein the access control information further indicates the control of the access to the subject information in accordance with a user security level, a user category, a zone category, and a sensitivity level category.

11. The access control enforcing system as claimed in claim 10, wherein the user security level includes a predetermined security level based on user identification, the user category indicates a category a user belongs to, the zone category includes a zone corresponding to at least one of an IP address and a MAC address, and the sensitivity level category indicates identification information of the category and a sensitivity level used by the security policy.

12. The access control enforcing system as claimed in claim 1, wherein
the abstracting processing part is configured
to receive the first identification information and acquire the corresponding first attribute associated with the first identification information from a user security level table,
to receive the second identification information and acquire the corresponding second attribute associated with the second identification information from a subject information profile management table, and
to receive address information and acquire a corresponding third attribute associated with the address information from the subject information profile management table and from a zone management table,
the user security level table, the subject information profile management table, and the zone management table are different from each other, and
the storing part is further configured to store the user security level table, the subject information profile management table, and the zone management table.

13. An access control enforcing method, comprising the steps of:
storing a security policy that regulates an access permit to subject information, a requirement enforced when access is allowed, and supplement information indicating character information or image information used by an access request originator to perform the requirement when the requirement is enforced;
acquiring a first attribute associated with a first identification information for identifying the access request originator who requests the access to the subject information, and a second attribute associated with a second identification information for identifying the subject information to be accessed, the second attribute corresponding to a category of the subject information;
determining a requirement to execute an access indicated in access control information, when an access control is determined for the subject information based on access control information that indicates a control of the access to the subject information, the access control information determined based on information regulated in the security policy, and a combination of the first attribute associated with the first identification information and the second attribute associated with the second identification information; and
sending a decision result information indicating the access control with respect to the subject information, to the access request originator which conducts an access decision request, the access request originator being required to perform the requirement including an image process using the supplemental information, based on the decision result information.

14. The access control enforcing method as claimed in claim 13, wherein the access control information further indicates the control of the access to the subject information in accordance with a user security level, a user category, a zone category, and a sensitivity level category.

15. The access control enforcing method as claimed in claim 14, wherein the user security level includes a predetermined security level based on user identification, the user category indicates a category a user belongs to, the zone category includes a zone corresponding to at least one of an IP address and a MAC address, and the sensitivity level category indicates identification information of the category and a sensitivity level used by the security policy.

16. A non-transitory computer-readable storage medium including computer executable instructions, wherein the instructions, when executed by a computer, cause the computer to perform an access control enforcing method, the method comprising:
storing a security policy that regulates an access permit to subject information, a requirement enforced when access is allowed, and supplement information indicating character information or image information used by an access request originator to perform the requirement when the requirement is enforced;
acquiring a first attribute associated with a first identification information for identifying the access request originator who requests the access to the subject information, and a second attribute associated with a second identification information for identifying the subject information to be accessed, the second attribute corresponding to a category of the subject information;

determining a requirement to execute an access indicated in access control information, when an access control is determined for the subject information based on access control information that indicates a control of the access to the subject information, the access control information determined based on information regulated in the security policy, and a combination of the first attribute associated with the first identification information and the second attribute associated with the second identification information; and sending a decision result information indicating the access control with respect to the subject information, to the access request originator which conducts an access decision request, the access request originator being required to perform the requirement including an image process using the supplemental information, based on the decision result information.

* * * * *